(12) United States Patent
Circlaeys et al.

(10) Patent No.: US 10,922,354 B2
(45) Date of Patent: Feb. 16, 2021

(54) REDUCTION OF UNVERIFIED ENTITY IDENTITIES IN A MEDIA LIBRARY

(71) Applicant: Apple Inc., Cupertino, CA (US)

(72) Inventors: Eric Circlaeys, Los Gatos, CA (US); Kevin Aujoulet, San Francisco, CA (US); Kevin Bessiere, Cupertino, CA (US); Killian Huyghe, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 245 days.

(21) Appl. No.: 15/844,366

(22) Filed: Dec. 15, 2017

(65) Prior Publication Data

US 2018/0349416 A1   Dec. 6, 2018

Related U.S. Application Data

(60) Provisional application No. 62/514,896, filed on Jun. 4, 2017.

(51) Int. Cl.
*G06F 7/02* (2006.01)
*G06F 16/00* (2019.01)
*G06F 16/56* (2019.01)
*G06K 9/00* (2006.01)
*G06F 16/41* (2019.01)
*G06F 16/335* (2019.01)
*G06F 16/487* (2019.01)
*G06F 16/48* (2019.01)
*G06F 40/106* (2020.01)

(52) U.S. Cl.
CPC ............ *G06F 16/56* (2019.01); *G06F 16/335* (2019.01); *G06F 16/41* (2019.01); *G06F 16/48* (2019.01); *G06F 16/487* (2019.01); *G06K 9/00288* (2013.01); *G06K 9/00677* (2013.01); *G06F 16/489* (2019.01); *G06F 40/106* (2020.01); *G06K 9/00624* (2013.01); *G06K 2009/00328* (2013.01)

(58) Field of Classification Search
CPC .......... G06K 9/00288; G06K 9/00677; G06K 9/00624; G06K 2009/00328; G06K 9/0026; G06K 9/00302; G06F 16/48; G06F 16/41; G06F 16/335; G06F 16/487; G06F 16/489; G06F 16/56; G06F 17/212
See application file for complete search history.

(56) References Cited

U.S. PATENT DOCUMENTS

| 8,918,463 | B2 | 12/2014 | Garcia et al. | |
|---|---|---|---|---|
| 9,195,679 | B1 | 11/2015 | Svendsen | |
| 9,639,740 | B2 | 5/2017 | Ganong et al. | |
| 2010/0066822 | A1* | 3/2010 | Steinberg | G06K 9/00208 348/77 |
| 2011/0026849 | A1* | 2/2011 | Kameyama | G06K 9/00308 382/260 |
| 2013/0142402 | A1* | 6/2013 | Myers | G06K 9/00288 382/118 |

(Continued)

FOREIGN PATENT DOCUMENTS

| WO | 2012/061824 | 5/2012 |
|---|---|---|
| WO | 2015/200120 | 12/2015 |

*Primary Examiner* — Bruce M Moser
(74) *Attorney, Agent, or Firm* — Blank Rome LLP

(57) ABSTRACT

Systems, methods, and computer-readable media for reducing a number of unverified persons detected in media content are provided.

16 Claims, 12 Drawing Sheets

(56) References Cited

U.S. PATENT DOCUMENTS

| | | | |
|---|---|---|---|
| 2016/0048756 A1* | 2/2016 | Hall | G06F 16/248 |
| | | | 706/20 |
| 2016/0132720 A1* | 5/2016 | Klare | G06K 9/6247 |
| | | | 382/118 |
| 2017/0091154 A1 | 3/2017 | Eppolito et al. | |
| 2017/0357644 A1 | 12/2017 | Circlaeys et al. | |
| 2017/0357672 A1 | 12/2017 | Circlaeys et al. | |
| 2017/0359236 A1 | 12/2017 | Circlaeys et al. | |
| 2018/0285646 A1* | 10/2018 | Jalan | G06F 16/583 |
| 2019/0394276 A1* | 12/2019 | Dachille | H04L 67/1097 |

* cited by examiner

```
┌─────────────────────────────────────────────────────────────────────┐
│ OBTAIN, AT AN ELECTRONIC DEVICE, CLUSTER DATA THAT INCLUDES FIRST   │
│ CLUSTER DATA INDICATIVE OF A FIRST FEATURE VECTOR CLUSTER           │
│ INCLUDING A PLURALITY OF FIRST FEATURE VECTORS DETERMINED TO BE     │
│ SIMILAR TO ONE ANOTHER; AND SECOND CLUSTER DATA INDICATIVE OF A     │
│ SECOND FEATURE VECTOR CLUSTER INCLUDING A PLURALITY OF SECOND       │
│ FEATURE VECTORS DETERMINED TO BE SIMILAR TO ONE ANOTHER, WHEREIN    │
│ EACH FEATURE VECTOR OF EACH ONE OF THE PLURALITY OF FIRST FEATURE   │
│ VECTORS AND THE PLURALITY OF SECOND FEATURE VECTORS IS              │
│ REPRESENTATIVE OF A FACE OF A DIGITAL ASSET OF A PLURALITY OF       │
│ DIGITAL ASSETS                                                      │
└─────────────────────────────────────────────────────────────────────┘
                                  │
                                  ▼                           ⎯ 802
┌─────────────────────────────────────────────────────────────────────┐
│ IDENTIFY, AT THE ELECTRONIC DEVICE, A FIRST COLLECTION OF DIGITAL   │
│ ASSETS OF THE PLURALITY OF DIGITAL ASSETS, WHEREIN THE FIRST        │
│ COLLECTION OF DIGITAL ASSETS INCLUDES EACH DIGITAL ASSET OF THE     │
│ PLURALITY OF DIGITAL ASSETS THAT IS ASSOCIATED WITH AT LEAST ONE    │
│ OF GEOGRAPHICAL METADATA INDICATIVE OF A GEOGRAPHIC LOCATION        │
│ WITHIN A FIRST GEOGRAPHIC RANGE AND TEMPORAL METADATA               │
│ INDICATIVE OF A TIME WITHIN A FIRST TIME RANGE                      │
└─────────────────────────────────────────────────────────────────────┘
                                  │
                                  ▼                           ⎯ 804
┌─────────────────────────────────────────────────────────────────────┐
│ ANALYZE, AT THE ELECTRONIC DEVICE, THE FIRST COLLECTION OF DIGITAL  │
│ ASSETS, WHEREIN THE ANALYZING THE FIRST COLLECTION OF DIGITAL       │
│ ASSETS INCLUDES (I) DETERMINING THAT EACH ONE OF A NUMBER OF FIRST  │
│ FEATURE VECTORS OF THE PLURALITY OF FIRST FEATURE VECTORS IS        │
│ REPRESENTATIVE OF A FACE OF A DIGITAL ASSET OF THE FIRST            │
│ COLLECTION OF DIGITAL ASSETS, (II) DETERMINING THAT EACH ONE OF A   │
│ NUMBER OF SECOND FEATURE VECTORS OF THE PLURALITY OF SECOND         │
│ FEATURE VECTORS IS REPRESENTATIVE OF A FACE OF A DIGITAL ASSET OF   │
│ THE FIRST COLLECTION OF DIGITAL ASSETS, AND (III) DETERMINING THAT  │
│ A DISTANCE BETWEEN A CENTROID OF THE NUMBER OF FIRST FEATURE        │
│ VECTORS OF THE PLURALITY OF FIRST FEATURE VECTORS AND A CENTROID    │
│ OF THE NUMBER OF SECOND FEATURE VECTORS OF THE PLURALITY OF         │
│ SECOND FEATURE VECTORS IS NOT GREATER THAN A CONFIDENCE             │
│ THRESHOLD DISTANCE                                                  │
└─────────────────────────────────────────────────────────────────────┘
                                  │
                                  ▼                           ⎯ 806
┌─────────────────────────────────────────────────────────────────────┐
│ GROUP, AT THE ELECTRONIC DEVICE, THE PLURALITY OF FIRST FEATURE     │
│ VECTORS AND THE PLURALITY OF SECOND FEATURE VECTORS IN A BUNDLE     │
│ OF FEATURE VECTORS BASED ON THE ANALYZING THE FIRST COLLECTION      │
│ OF DIGITAL ASSETS                                                   │
└─────────────────────────────────────────────────────────────────────┘
                                                              ⎯ 808
```

```
┌─────────────────────────────────────────────────────────────────────┐
│ OBTAIN, AT THE ELECTRONIC DEVICE, CLUSTER DATA THAT INCLUDES FIRST  │
│ CLUSTER DATA INDICATIVE OF A FIRST FEATURE VECTOR CLUSTER INCLUDING │
│ A PLURALITY OF FIRST FEATURE VECTORS DETERMINED TO BE SIMILAR TO    │
│ ONE ANOTHER, AND SECOND CLUSTER DATA INDICATIVE OF A SECOND FEATURE │
│ VECTOR CLUSTER INCLUDING A PLURALITY OF SECOND FEATURE VECTORS      │
│ DETERMINED TO BE SIMILAR TO ONE ANOTHER, WHEREIN EACH FEATURE       │
│ VECTOR OF EACH ONE OF THE PLURALITY OF FIRST FEATURE VECTORS AND    │
│ THE PLURALITY OF SECOND FEATURE VECTORS IS REPRESENTATIVE OF A FACE │
│ OF A DIGITAL ASSET OF A PLURALITY OF DIGITAL ASSETS                 │
└─────────────────────────────────────────────────────────────────────┘
                                  │  ⟵ 902
                                  ▼
┌─────────────────────────────────────────────────────────────────────┐
│ OBTAIN, AT THE ELECTRONIC DEVICE, A METADATA NETWORK ASSOCIATED     │
│ WITH THE PLURALITY OF DIGITAL ASSETS, WHEREIN THE METADATA NETWORK  │
│ INCLUDES A PLURALITY OF METADATA ASSETS, EACH METADATA ASSET OF THE │
│ PLURALITY OF METADATA ASSETS DESCRIBES A CHARACTERISTIC ASSOCIATED  │
│ WITH AT LEAST ONE DIGITAL ASSET OF THE PLURALITY OF DIGITAL ASSETS, │
│ AND TWO METADATA ASSETS OF THE PLURALITY OF METADATA ASSETS ARE     │
│ CORRELATED WHEN A CORRELATION BETWEEN THE TWO METADATA ASSETS       │
│ COMPRISES A CORRELATION WEIGHT GREATER THAN A CORRELATION WEIGHT    │
│ THRESHOLD                                                           │
└─────────────────────────────────────────────────────────────────────┘
                                  │  ⟵ 904
                                  ▼
┌─────────────────────────────────────────────────────────────────────┐
│ ANALYZE, AT THE ELECTRONIC DEVICE, THE OBTAINED METADATA NETWORK,   │
│ WHEREIN THE ANALYZING THE OBTAINED METADATA NETWORK INCLUDES (I)    │
│ DETERMINING THAT A FIRST METADATA ASSET OF THE PLURALITY OF         │
│ METADATA ASSETS DESCRIBES A FIRST MOMENT ASSOCIATED WITH EACH       │
│ DIGITAL ASSET OF A FIRST SUBSET OF DIGITAL ASSETS OF THE PLURALITY  │
│ OF DIGITAL ASSETS, WHEREIN THE FIRST MOMENT DESCRIBES A FIRST TIME  │
│ RANGE, (II) DETERMINING THAT A SECOND METADATA ASSET OF THE         │
│ PLURALITY OF METADATA ASSETS DESCRIBES A SECOND MOMENT ASSOCIATED   │
│ WITH EACH DIGITAL ASSET OF A SECOND SUBSET OF DIGITAL ASSETS OF THE │
│ PLURALITY OF DIGITAL ASSETS, WHEREIN THE SECOND MOMENT DESCRIBES A  │
│ SECOND TIME RANGE DISTINCT FROM THE FIRST TIME RANGE, AND (III)     │
│ DETERMINING THAT A THIRD METADATA ASSET OF THE PLURALITY OF         │
│ METADATA ASSETS IS CORRELATED WITH EACH ONE OF THE FIRST METADATA   │
│ ASSET AND THE SECOND METADATA ASSET, WHEREIN THE THIRD METADATA     │
│ ASSET DESCRIBES A SOCIAL GROUP INCLUDING A FIRST PERSON ASSOCIATED  │
│ WITH THE FIRST FEATURE VECTOR CLUSTER AND A SECOND PERSON           │
│ ASSOCIATED WITH THE SECOND FEATURE VECTOR CLUSTER                   │
└─────────────────────────────────────────────────────────────────────┘
                                  │  ⟵ 906
                                  ▼
┌─────────────────────────────────────────────────────────────────────┐
│ GROUP, AT THE ELECTRONIC DEVICE, THE PLURALITY OF FIRST FEATURE     │
│ VECTORS AND THE PLURALITY OF SECOND FEATURE VECTORS IN A BUNDLE OF  │
│ FEATURE VECTORS BASED ON THE ANALYZING THE OBTAINED METADATA        │
│ NETWORK                                                             │
└─────────────────────────────────────────────────────────────────────┘
                                     ⟵ 908
```

```
┌─────────────────────────────────────────────────────────────────────────┐
│ OBTAIN, AT THE ELECTRONIC DEVICE, CLUSTER DATA THAT INCLUDES FIRST       │
│ CLUSTER DATA INDICATIVE OF A FIRST FEATURE VECTOR CLUSTER INCLUDING A   │
│ PLURALITY OF FIRST FEATURE VECTORS DETERMINED TO BE SIMILAR TO ONE      │
│ ANOTHER, SECOND CLUSTER DATA INDICATIVE OF A SECOND FEATURE VECTOR      │
│ CLUSTER INCLUDING A PLURALITY OF SECOND FEATURE VECTORS DETERMINED TO   │
│ BE SIMILAR TO ONE ANOTHER, AND THIRD CLUSTER DATA INDICATIVE OF A THIRD │
│ FEATURE VECTOR CLUSTER INCLUDING A PLURALITY OF THIRD FEATURE VECTORS   │
│ DETERMINED TO BE SIMILAR TO ONE ANOTHER, WHEREIN EACH FEATURE VECTOR    │
│ OF EACH ONE OF THE PLURALITY OF FIRST FEATURE VECTORS AND THE PLURALITY │
│ OF SECOND FEATURE VECTORS AND THE PLURALITY OF THIRD FEATURE VECTORS IS │
│ REPRESENTATIVE OF A FACE OF A DIGITAL ASSET OF A PLURALITY OF DIGITAL   │
│ ASSETS                                                                   │
└─────────────────────────────────────────────────────────────────────────┘
                                    │ ⎣1002
                                    ▼
┌─────────────────────────────────────────────────────────────────────────┐
│ OBTAIN, AT THE ELECTRONIC DEVICE, A METADATA NETWORK ASSOCIATED WITH     │
│ THE PLURALITY OF DIGITAL ASSETS, WHEREIN THE METADATA NETWORK INCLUDES  │
│ A PLURALITY OF METADATA ASSETS, EACH METADATA ASSET OF THE PLURALITY    │
│ OF METADATA ASSETS DESCRIBES A CHARACTERISTIC ASSOCIATED WITH AT LEAST  │
│ ONE DIGITAL ASSET OF THE PLURALITY OF DIGITAL ASSETS, AND TWO METADATA  │
│ ASSETS OF THE PLURALITY OF METADATA ASSETS ARE CORRELATED WHEN A        │
│ CORRELATION BETWEEN THE TWO METADATA ASSETS COMPRISES A CORRELATION    │
│ WEIGHT GREATER THAN A CORRELATION WEIGHT THRESHOLD                      │
└─────────────────────────────────────────────────────────────────────────┘
                                    │ ⎣1004
                                    ▼
┌─────────────────────────────────────────────────────────────────────────┐
│ ANALYZE, AT THE ELECTRONIC DEVICE, THE OBTAINED METADATA NETWORK,        │
│ WHEREIN THE ANALYZING INCLUDES (I) DETERMINING THAT A FIRST METADATA    │
│ ASSET OF THE PLURALITY OF METADATA ASSETS DESCRIBES A FIRST MOMENT      │
│ ASSOCIATED WITH EACH DIGITAL ASSET OF A FIRST SUBSET OF DIGITAL ASSETS  │
│ OF THE PLURALITY OF DIGITAL ASSETS, WHEREIN THE FIRST MOMENT DESCRIBES  │
│ A FIRST TIME RANGE WITHIN A FIRST TIME SPAN, (II) DETERMINING THAT A    │
│ SECOND METADATA ASSET OF THE PLURALITY OF METADATA ASSETS DESCRIBES A   │
│ SECOND MOMENT ASSOCIATED WITH EACH DIGITAL ASSET OF A SECOND SUBSET OF  │
│ DIGITAL ASSETS OF THE PLURALITY OF DIGITAL ASSETS, WHEREIN THE SECOND   │
│ MOMENT DESCRIBES A SECOND TIME RANGE WITHIN THE FIRST TIME SPAN BUT     │
│ DISTINCT FROM THE FIRST TIME RANGE, (III) DETERMINING THAT A THIRD      │
│ METADATA ASSET OF THE PLURALITY OF METADATA ASSETS DESCRIBES A THIRD    │
│ MOMENT ASSOCIATED WITH EACH DIGITAL ASSET OF A THIRD SUBSET OF DIGITAL  │
│ ASSETS OF THE PLURALITY OF DIGITAL ASSETS, WHEREIN THE THIRD MOMENT     │
│ DESCRIBES A THIRD TIME RANGE WITHIN A SECOND TIME SPAN DISTINCT FROM    │
│ THE FIRST TIME SPAN, (IV) DETERMINING THAT A FOURTH METADATA ASSET OF   │
│ THE PLURALITY OF METADATA ASSETS DESCRIBES A FOURTH MOMENT ASSOCIATED   │
│ WITH EACH DIGITAL ASSET OF A FOURTH SUBSET OF DIGITAL ASSETS OF THE     │
│ PLURALITY OF DIGITAL ASSETS, WHEREIN THE FOURTH MOMENT DESCRIBES A      │
│ FOURTH TIME RANGE WITHIN THE SECOND TIME SPAN BUT DISTINCT FROM THE     │
│ THIRD TIME RANGE, (V) DETERMINING THAT A FIFTH METADATA ASSET OF THE    │
│ PLURALITY OF METADATA ASSETS IS CORRELATED WITH EACH ONE OF THE FIRST   │
│ METADATA ASSET AND THE SECOND METADATA ASSET, WHEREIN THE FIFTH         │
│ METADATA ASSET DESCRIBES A FIRST SOCIAL GROUP INCLUDING A FIRST PERSON  │
│ ASSOCIATED WITH THE FIRST FEATURE VECTOR CLUSTER AND A SECOND PERSON    │
│ ASSOCIATED WITH THE SECOND FEATURE VECTOR CLUSTER, AND (VI)             │
│ DETERMINING THAT A SIXTH METADATA ASSET OF THE PLURALITY OF METADATA    │
│ ASSETS IS CORRELATED WITH EACH ONE OF THE THIRD METADATA ASSET AND      │
│ THE FOURTH METADATA ASSET, WHEREIN THE SIXTH METADATA ASSET DESCRIBES   │
│ A SECOND SOCIAL GROUP INCLUDES THE FIRST PERSON ASSOCIATED WITH THE     │
│ FIRST FEATURE VECTOR CLUSTER AND A THIRD PERSON ASSOCIATED WITH THE     │
│ THIRD FEATURE VECTOR CLUSTER                                             │
└─────────────────────────────────────────────────────────────────────────┘
                                    │ ⎣1006
                                    ▼
┌─────────────────────────────────────────────────────────────────────────┐
│ GROUP, AT THE ELECTRONIC DEVICE, THE PLURALITY OF SECOND FEATURE        │
│ VECTORS AND THE PLURALITY OF THIRD FEATURE VECTORS IN A BUNDLE OF       │
│ FEATURE VECTORS BASED ON THE ANALYZING THE OBTAINED METADATA NETWORK    │
└─────────────────────────────────────────────────────────────────────────┘
                                                                    ⎣1008
                                   1000
                                  FIG. 10
```

REDUCTION OF UNVERIFIED ENTITY IDENTITIES IN A MEDIA LIBRARY

CROSS-REFERENCE TO RELATED APPLICATION(S)

This application claims the benefit of prior filed U.S. Provisional Patent Application No. 62/514,896, filed Jun. 4, 2017, which is hereby incorporated by reference herein in its entirety.

TECHNICAL FIELD

This disclosure relates to reducing a number of unverified entity identities in a media library with an electronic device.

BACKGROUND OF THE DISCLOSURE

A system may be provided for managing a library of media items. Often, however, management of such a library may result in an unmanageable number of unverified identities being detected in the media items of the library.

SUMMARY OF THE DISCLOSURE

This document describes systems, methods, and computer-readable media for reducing a number of unverified entity identities in a media library with an electronic device.

For example, a method for combining feature vector clusters on an electronic device may be provided that includes obtaining, at the electronic device, cluster data, wherein the cluster data includes first cluster data indicative of a first feature vector cluster including a plurality of first feature vectors determined to be similar to one another and second cluster data indicative of a second feature vector cluster including a plurality of second feature vectors determined to be similar to one another, wherein each feature vector of each one of the plurality of first feature vectors and the plurality of second feature vectors is representative of a face of a digital asset of a plurality of digital assets. The method may also include identifying, at the electronic device, a first collection of digital assets of the plurality of digital assets, wherein the first collection of digital assets includes each digital asset of the plurality of digital assets that is associated with at least one of geographical metadata indicative of a geographic location within a first geographic range and temporal metadata indicative of a time within a first time range. The method may also include analyzing, at the electronic device, the first collection of digital assets, wherein the analyzing the first collection of digital assets includes (i) determining that each one of a number of first feature vectors of the plurality of first feature vectors is representative of a face of a digital asset of the first collection of digital assets, (ii) determining that each one of a positive number of second feature vectors of the plurality of second feature vectors is representative of a face of a digital asset of the first collection of digital assets, and (iii) determining that a distance between a centroid of the positive number of first feature vectors of the plurality of first feature vectors and a centroid of the positive number of second feature vectors of the plurality of second feature vectors is not greater than a confidence threshold distance. The method may also include grouping, at the electronic device, the plurality of first feature vectors and the plurality of second feature vectors in a bundle of feature vectors based on the analyzing the first collection of digital assets.

As another example, a method for combining feature vector clusters on an electronic device may be provided that includes obtaining, at the electronic device, cluster data, wherein the cluster data includes first cluster data indicative of a first feature vector cluster including a plurality of first feature vectors determined to be similar to one another and second cluster data indicative of a second feature vector cluster including a plurality of second feature vectors determined to be similar to one another, wherein each feature vector of each one of the plurality of first feature vectors and the plurality of second feature vectors is representative of a face of a digital asset of a plurality of digital assets. The method may also include obtaining, at the electronic device, a metadata network associated with the plurality of digital assets, wherein the metadata network includes a plurality of metadata assets, each metadata asset of the plurality of metadata assets describes a characteristic associated with at least one digital asset of the plurality of digital assets, and two metadata assets of the plurality of metadata assets are correlated when a correlation between the two metadata assets includes a correlation weight greater than a correlation weight threshold. The method may also include analyzing, at the electronic device, the obtained metadata network, wherein the analyzing the obtained metadata network includes (i) determining that a first metadata asset of the plurality of metadata assets describes a first moment associated with each digital asset of a first subset of digital assets of the plurality of digital assets, wherein the first moment describes a first time range, (ii) determining that a second metadata asset of the plurality of metadata assets describes a second moment associated with each digital asset of a second subset of digital assets of the plurality of digital assets, wherein the second moment describes a second time range distinct from the first time range, and (iii) determining that a third metadata asset of the plurality of metadata assets is correlated with each one of the first metadata asset and the second metadata asset, wherein the third metadata asset describes a social group including a first person associated with the first feature vector cluster and a second person associated with the second feature vector cluster. The method may also include grouping, at the electronic device, the plurality of first feature vectors and the plurality of second feature vectors in a bundle of feature vectors based on the analyzing the obtained metadata network.

As yet another example, a method for combining feature vector clusters on an electronic device may be provided that includes obtaining, at the electronic device, cluster data, wherein the cluster data includes first cluster data indicative of a first feature vector cluster including a plurality of first feature vectors determined to be similar to one another, second cluster data indicative of a second feature vector cluster including a plurality of second feature vectors determined to be similar to one another, and third cluster data indicative of a third feature vector cluster including a plurality of third feature vectors determined to be similar to one another, wherein each feature vector of each one of the plurality of first feature vectors and the plurality of second feature vectors and the plurality of third feature vectors is representative of a face of a digital asset of a plurality of digital assets. The method may also include obtaining, at the electronic device, a metadata network associated with the plurality of digital assets, wherein the metadata network includes a plurality of metadata assets, each metadata asset of the plurality of metadata assets describes a characteristic associated with at least one digital asset of the plurality of digital assets, and two metadata assets of the plurality of metadata assets are correlated when a correlation between the two metadata assets includes a correlation weight greater than a correlation weight threshold. The method may also include analyzing, at the electronic device, the obtained metadata network, wherein the analyzing the obtained metadata network includes (i) determining that a first metadata asset of the plurality of metadata assets describes a first moment associated with each digital asset of a first subset of digital assets of the plurality of digital assets, wherein the first moment describes a first time range within a first time span, (ii) determining that a second metadata asset of the plurality of metadata assets describes a second moment associated with each digital asset of a second subset of digital assets of the plurality of digital assets, wherein the second moment describes a second time range within the first time span but distinct from the first time range, (iii) determining that a third metadata asset of the plurality of metadata assets describes a third moment associated with each digital asset of a third subset of digital assets of the plurality of digital assets, wherein the third moment describes a third time range within a second time span distinct from the first time span, (iv) determining that a fourth metadata asset of the plurality of metadata assets describes a fourth moment associated with each digital asset of a fourth subset of digital assets of the plurality of digital assets, wherein the fourth moment describes a fourth time range within the second time span but distinct from the third time range, (v) determining that a fifth metadata asset of the plurality of metadata assets is correlated with each one of the first metadata asset and the second metadata asset, wherein the fifth metadata asset describes a first social group including a first person associated with the first feature vector cluster and a second person associated with the second feature vector cluster, and (vi) determining that a sixth metadata asset of the plurality of metadata assets is correlated with each one of the third metadata asset and the fourth metadata asset, wherein the sixth metadata asset describes a second social group including the first person associated with the first feature vector cluster and a third person associated with the third feature vector cluster. The method may also include grouping, at the electronic device, the plurality of second feature vectors and the plurality of third feature vectors in a bundle of feature vectors based on the analyzing the obtained metadata network.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIGS. 7-10 are flowcharts of illustrative processes for operating an electronic device for reducing a number of unverified entity identities in a media library.

DETAILED DESCRIPTION OF THE DISCLOSURE

Systems, methods, and computer-readable media may be provided to reduce a number of unverified entity identities in a media library. For example, faces may be detected in various items of media content of a media library and each detected face may be defined by a unique feature vector before similar feature vectors may be grouped into a cluster using a clustering threshold distance, where each cluster of similar feature vectors may be initially associated with a different unverified identity that may eventually be updated to be associated with a verified identity (e.g., through user verification). Metadata associated with the media content of the media library (e.g., as may be captured with the media content and/or explicitly defined by a user and/or inferred or derived by other metadata and/or any suitable contextual data) may be used to correlate different items of media content in various ways (e.g., in a knowledge graph metadata network). Different types of correlations between different media content items (e.g., location-based correlations, moment-based correlations, and/or social group-based correlations) may be used to isolate two different clusters, and then one or more confidence threshold distances more liberal than the clustering threshold distance may be used to determine whether the two different identities of the two different clusters should be merged together as a single identity. Reduction of the number of unverified identities may reduce the cognitive burden on a user and/or avoid any tedious classification of media by a user, thereby creating a more efficient human-machine interface.

Figure 1:
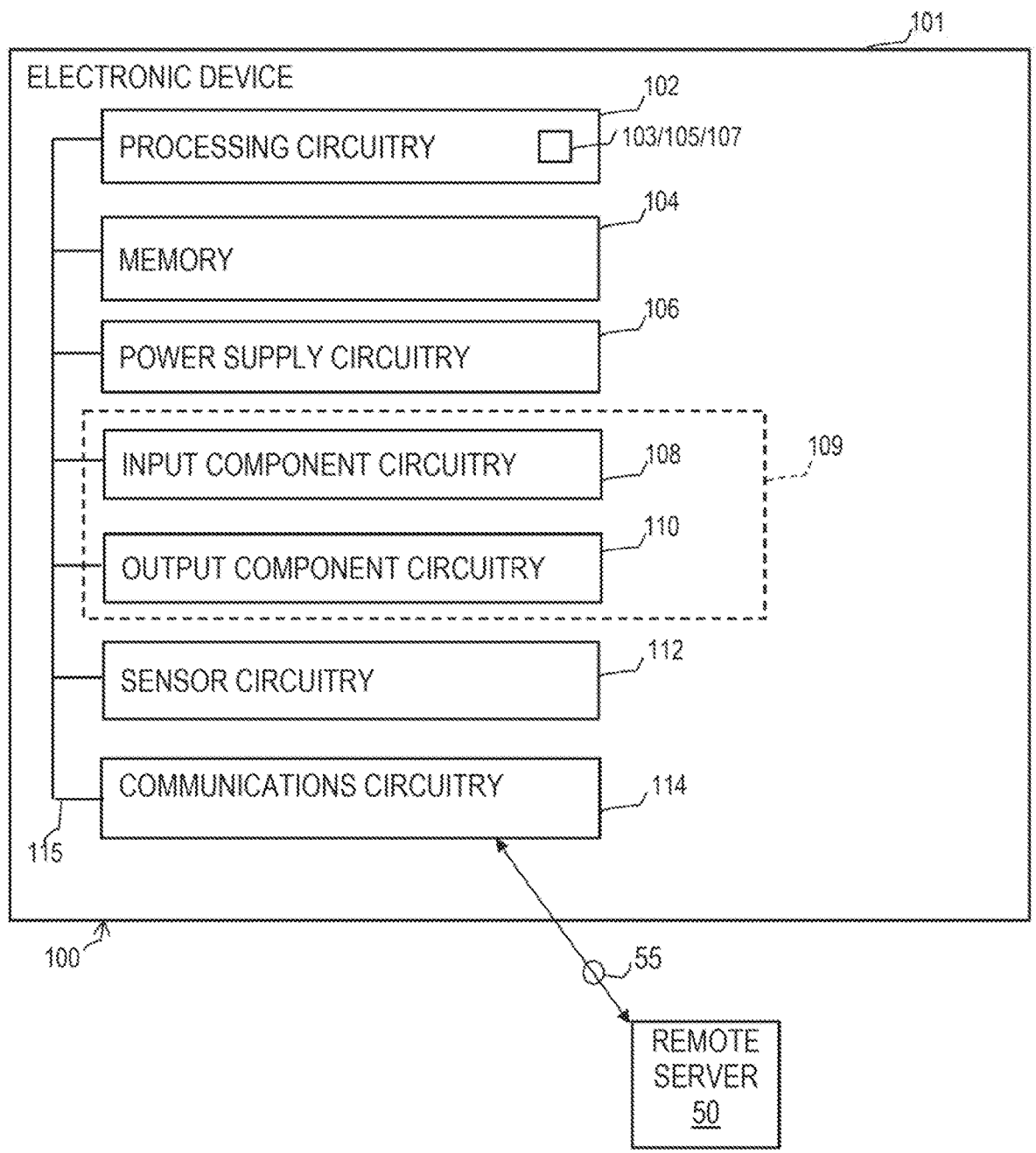
FIG. 1 is a schematic view of an illustrative system for reducing a number of unverified entity identities in a media library.

FIG. 1 is a schematic view of an illustrative system 1 that may include at least one of electronic device 100 and remote server 50 for reducing a number of unverified entity identities in a media library in accordance with some embodiments. Electronic device 100 can include, but is not limited to, a media player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, watch, biometric monitor, or any combination thereof. In some embodiments, electronic device 100 may perform a single function (e.g., a device dedicated to reducing a number of unverified entity identities in a media library) and, in other embodiments, electronic device 100 may perform multiple functions (e.g., a device that manages a media library, plays music, and receives and transmits telephone calls). Electronic device 100 may be any portable, mobile, hand-held, or miniature electronic device that may be configured to reduce a number of unverified entity identities in a media library wherever a user travels. Some miniature electronic devices may have a form factor that is smaller than that of hand-held electronic devices, such as an iPod™. Illustrative miniature electronic devices can be integrated into various objects that may include, but are not limited to, watches (e.g., an Apple Watch™ available by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 1, for example, electronic device 100 may include processing circuitry 102, memory 104, power supply circuitry 106, input component circuitry 108, output component circuitry 110, sensor circuitry 112, and communications circuitry 114. Electronic device 100 may also include a bus 115 that may provide one or more wired or wireless communication links or paths for transferring data and/or power to, from, or between various other components of device 100. In some embodiments, one or more components of electronic device 100 may be combined or omitted. Moreover, electronic device 100 may include any other suitable components not combined or included in FIG. 1 and/or several instances of the components shown in FIG. 1. For the sake of simplicity, only one of each of the components is shown in FIG. 1.

Memory 104 may include one or more storage mediums, including, for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated onto one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, media information (e.g., media content and/or associated metadata), preference information (e.g., media playback preferences), lifestyle information (e.g., food preferences), exercise information (e.g., information obtained by exercise monitoring equipment or any suitable sensor circuitry), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, pass information (e.g., transportation boarding passes, event tickets, coupons, store cards, financial payment cards, etc.), any other suitable data, or any combination thereof.

Power supply circuitry 106 can include any suitable circuitry for receiving and/or generating power, and for providing such power to one or more of the other components of electronic device 100. For example, power supply circuitry 106 can be coupled to a power grid (e.g., when device 100 is not acting as a portable device or when a battery of the device is being charged at an electrical outlet with power generated by an electrical power plant). As another example, power supply circuitry 106 can be configured to generate power from a natural source (e.g., solar power using solar cells). As another example, power supply circuitry 106 can include one or more batteries for providing power (e.g., when device 100 is acting as a portable device). For example, power supply circuitry 106 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply circuitry 106 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply circuitry 106 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 108 may be provided to permit a user to interact or interface with device 100. For example, input component circuitry 108 can take a variety of forms, including, but not limited to, a touch pad, dial, click wheel, scroll wheel, touch screen, one or more buttons (e.g., a keyboard), mouse, joy stick, track ball, microphone, still image camera, video camera, scanner (e.g., a bar code scanner or any other suitable scanner that may obtain product identifying information from a code, such as a bar code, or the like), proximity sensor, light detector, biometric sensor (e.g., a fingerprint reader or other feature recognition sensor, which may operate in conjunction with a feature-processing application that may be accessible to electronic device 100 for authenticating a user), line-in connector for data and/or power, and combinations thereof. Each input component 108 can be configured to provide one or more dedicated control functions for making selections or issuing commands associated with operating device 100.

Electronic device 100 may also include one or more output components 110 that may present information (e.g., graphical, audible, and/or tactile information) to a user of device 100. For example, output component circuitry 110 of electronic device 100 may take various forms, including, but not limited to, audio speakers, headphones, line-out connectors for data and/or power, visual displays, infrared ports, tactile/haptic outputs (e.g., rumblers, vibrators, etc.), and combinations thereof. As a particular example, electronic device 100 may include a display output component as output component 110, where such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O circuitry or I/O interface (e.g., input component 108 and output component 110 as I/O component or I/O interface 109). For example, input component 108 and output component 110 may sometimes be a single I/O component 109, such as a touch screen, that may receive input information through a user's touch (e.g., multi-touch) of a display screen and that may also provide visual information to a user via that same display screen.

Sensor circuitry 112 may include any suitable sensor or any suitable combination of sensors operative to detect movements of electronic device 100 and/or any other characteristics of device 100 or its environment (e.g., physical activity or other characteristics of a user of device 100). For example, sensor circuitry 112 may include one or more three-axis acceleration motion sensors (e.g., an accelerometer) that may be operative to detect linear acceleration in three directions (i.e., the x- or left/right direction, the y- or up/down direction, and the z- or forward/backward direction). As another example, sensor circuitry 112 may include one or more single-axis or two-axis acceleration motion sensors that may be operative to detect linear acceleration only along each of the x- or left/right direction and the y- or up/down direction, or along any other pair of directions. In some embodiments, sensor circuitry 112 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezo-resistance type accelerometer, and/or any other suitable accelerometer (e.g., which may provide a pedometer or other suitable function). In some embodiments, sensor circuitry 112 may be operative to directly or indirectly detect rotation, rotational movement, angular displacement, tilt, position, orientation, motion along a non-linear (e.g., arcuate) path, or any other non-linear motions. Additionally or alternatively, sensor circuitry 112 may include one or more angular rate, inertial, and/or gyro-motion sensors or gyroscopes for detecting rotational movement. For example, sensor circuitry 112 may include one or more rotating or vibrating elements, optical gyroscopes, vibrating gyroscopes, gas rate gyroscopes, ring gyroscopes, magnetometers (e.g., scalar or vector magnetometers), compasses, and/or the like. Any other suitable sensors may also or alternatively be provided by sensor circuitry 112 for detecting motion on device 100, such as any suitable pressure sensors, altimeters, or the like. Using sensor circuitry 112, electronic device 100 may be configured to determine a velocity, acceleration, orientation, and/or any other suitable motion attribute of electronic device 100.

Sensor circuitry 112 may include any suitable sensor(s), including, but not limited to, one or more of a GPS sensor, accelerometer, directional sensor (e.g., compass), gyroscope, motion sensor, pedometer, passive infrared sensor, ultrasonic sensor, microwave sensor, a tomographic motion detector, a camera, a biometric sensor, a light sensor, a timer, or the like. In some examples, a biometric sensor may include, but is not limited to, one or more health-related optical sensors, capacitive sensors, thermal sensors, electric field ("eField") sensors, and/or ultrasound sensors, such as photoplethysmogram ("PPG") sensors, electrocardiography ("ECG") sensors, galvanic skin response ("GSR") sensors, posture sensors, stress sensors, photoplethysmogram sensors, and/or the like. These sensors can generate data providing health-related information associated with the user. For example, PPG sensors can provide information regarding a user's respiratory rate, blood pressure, and/or oxygen saturation. ECG sensors can provide information regarding a user's heartbeats. GSR sensors can provide information regarding a user's skin moisture, which may be indicative of sweating and can prioritize a thermostat application to determine a user's body temperature. In some examples, each sensor can be a separate device, while, in other examples, any combination of two or more of the sensors can be included within a single device. For example, a gyroscope, accelerometer, photoplethysmogram, galvanic skin response sensor, and temperature sensor can be included within a wearable electronic device, such as a smart watch, while a scale, blood pressure cuff, blood glucose monitor, SpO2 sensor, respiration sensor, posture sensor, stress sensor, and asthma inhaler can each be separate devices. While specific examples are provided, it should be appreciated that other sensors can be used and other combinations of sensors can be combined into a single device. Using one or more of these sensors, device 100 can determine physiological characteristics of the user while performing a detected activity, such as a heart rate of a user associated with the detected activity, average body temperature of a user detected during the detected activity, any normal or abnormal physical conditions associated with the detected activity, or the like. In some examples, a GPS sensor or any other suitable location detection component(s) of device 100 can be used to determine a user's location and movement, as well as a displacement of the user's motion. An accelerometer, directional sensor, and/or gyroscope can further generate activity data that can be used to determine whether a user of device 100 is engaging in an activity, is inactive, or is performing a gesture. Device 100 can further include a timer that can be used, for example, to add time dimensions to various attributes of the detected physical activity, such as a duration of a user's physical activity or inactivity, time(s) of a day when the activity is detected or not detected, and/or the like. One or more sensors of sensor circuitry or component 112 may be embedded in a body (e.g., housing 101) of device 100, such as a long a bottom surface that may be operative to contact a user, or can be positioned at any other desirable location. In some examples, different sensors can be placed in different locations inside or on the surfaces of device 100 (e.g., some located inside housing 101) and some attached to an attachment mechanism (e.g., a wrist band coupled to a housing of a wearable device), or the like. In other examples, one or more sensors can be worn by a user separately from device 100. In such cases, the sensors can be configured to communicate with device 100 using a wired and/or wireless technology (e.g., via communications circuitry 114). In some examples, sensors can be configured to communicate with each other and/or share data collected from one or more sensors. In some other examples, device 100 can be waterproof such that the sensors can detect a user's activity in water.

Communications circuitry 114 may be provided to allow device 100 to communicate with one or more other electronic devices or servers using any suitable communications protocol. For example, communications circuitry 114 may support Wi-Fi™ (e.g., an 802.11 protocol), ZigBee™ (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multiband, etc.), any communications protocol that may be used by a low power Wireless Personal Area Network ("6LoWPAN") module, Near Field Communication ("NFC"), any other communications protocol, or any combination thereof. Communications circuitry 114 may also include or be electrically coupled to any suitable transceiver circuitry that can enable device 100 to be communicatively coupled to another device (e.g., a host computer or an accessory device) and communicate with that other device wirelessly, or via a wired connection (e.g., using a connector port). Communications circuitry 114 may be configured to determine a geographical position of electronic device 100. For example, communications circuitry 114 may utilize the global positioning system ("GPS") or a regional or site-wide positioning system that may use cell tower positioning technology or Wi-Fi™ technology.

Processing circuitry 102 of electronic device 100 may include any processing circuitry that may be operative to control the operations and performance of one or more components of electronic device 100. For example, processor 102 may receive input signals from any input component 108 and/or sensor circuitry 112 and/or communications circuitry 114 and/or drive output signals through any output component 110 and/or communications circuitry 114. As shown in FIG. 1, processor 102 may be used to run at least one application 103. Application 103 may include, but is not limited to, one or more operating system applications, firmware applications, software applications, algorithmic modules, media analysis applications, media playback applications, media editing applications, communications applications, pass applications, calendar applications, social media applications, state determination applications, biometric feature-processing applications, activity monitoring applications, activity motivating applications, and/or any other suitable applications. For example, processor 102 may load application 103 as a user interface program to determine how instructions or data received via an input component 108 and/or any other component of device 100 may manipulate the one or more ways in which information may be stored and/or provided to the user via an output component 110 and/or any other component of device 100. Any application 103 may be accessed by any processing circuitry 102 from any suitable source, such as from memory 104 (e.g., via bus 115) and/or from another device or server (e.g., remote server 50) (e.g., via communications circuitry 114). Processor 102 may include a single processor or multiple processors. For example, processor 102 may include at least one "general purpose" microprocessor, a combination of general and special purpose microprocessors, instruction set processors, graphics processors, video processors, communications processors, motion processors, biometric processors, application processors, and/or related chips sets, and/or special purpose microprocessors. Processor 102 also may include on board memory for caching purposes.

Processor 102 may be configured to capture (e.g., with an input component 108) or otherwise access (e.g., from memory 104 and/or communications circuitry 114) and process any suitable library 105 of any suitable amount of media content pieces (e.g., any media content and/or associated metadata) for managing the media content pieces in an effective and user-friendly manner. Media content pieces ("MCPs") may include any suitable type of asset or item of media content, such as image content (e.g., pixel values for one or more photographs or video frames) and/or audio content (e.g., one or more audio tracks that may or may not be associated with video frames as audio/visual video content) and/or text content (e.g., an E-book, etc.) and/or haptic content (e.g., vibrations or motions that may be provided in connection with other media, such as a video), where examples of different types of visual media content of an MCP may include, but are not limited to, a still photo, a video clip, a burst-mode photo sequence, a panoramic photo, a time lapse video, a slow motion video, a short video that may be captured alongside a photograph (e.g., a Live Photo™ available by Apple Inc.), and/or the like. An MCP may also include any suitable amount of any suitable type(s) of metadata assets or metadata content (metadata) that may describe one or more characteristics of and be associated with the media content (e.g., an image, a video, etc.) of the MCP, including, but not limited to, captured metadata, post-capture metadata, derived metadata, explicit user-assigned metadata, and/or the like. Additionally, processor 102 may be configured to generate or otherwise access (e.g., from memory 104 and/or communications circuitry 114) an MCP management system 107 (e.g., a database (e.g., a relational database (e.g., a tabular database, etc.), a distributed database that can be dispersed or replicated among different points in a network, an object-oriented programming database that can be congruent with the data defined in object classes and subclasses, etc.) and/or a knowledge graph metadata network) that may be operative to be used by processor 102 (e.g., along with or as a portion of any suitable application 103) to manage, store, ingest, organize, and/or retrieve the various MCPs of library 105. In some examples where device 100 may collect and/or process a relatively large MCP library 105 and/or use relatively large MCP management systems 107, device 100 may not have enough memory capacity to collect and process and store all of the data for such a library and/or management system and can instead be configured to offload some or all of the data on an external device that may be remote from device 100 (e.g., server 50, which, although not shown, may be configured to include, one, some, each, and/or multiple ones of the components of device 100). The external device can be configured to communicate with a plurality of devices 100, and store data collected from these devices. The external device can be further configured to execute computer instructions on the data and communicate the result with one or more of these devices 100.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 108 may be an independent keyboard or mouse within its own housing that may wirelessly or through a wire communicate with processor 102, which may be provided within its own housing).

Figure 2:
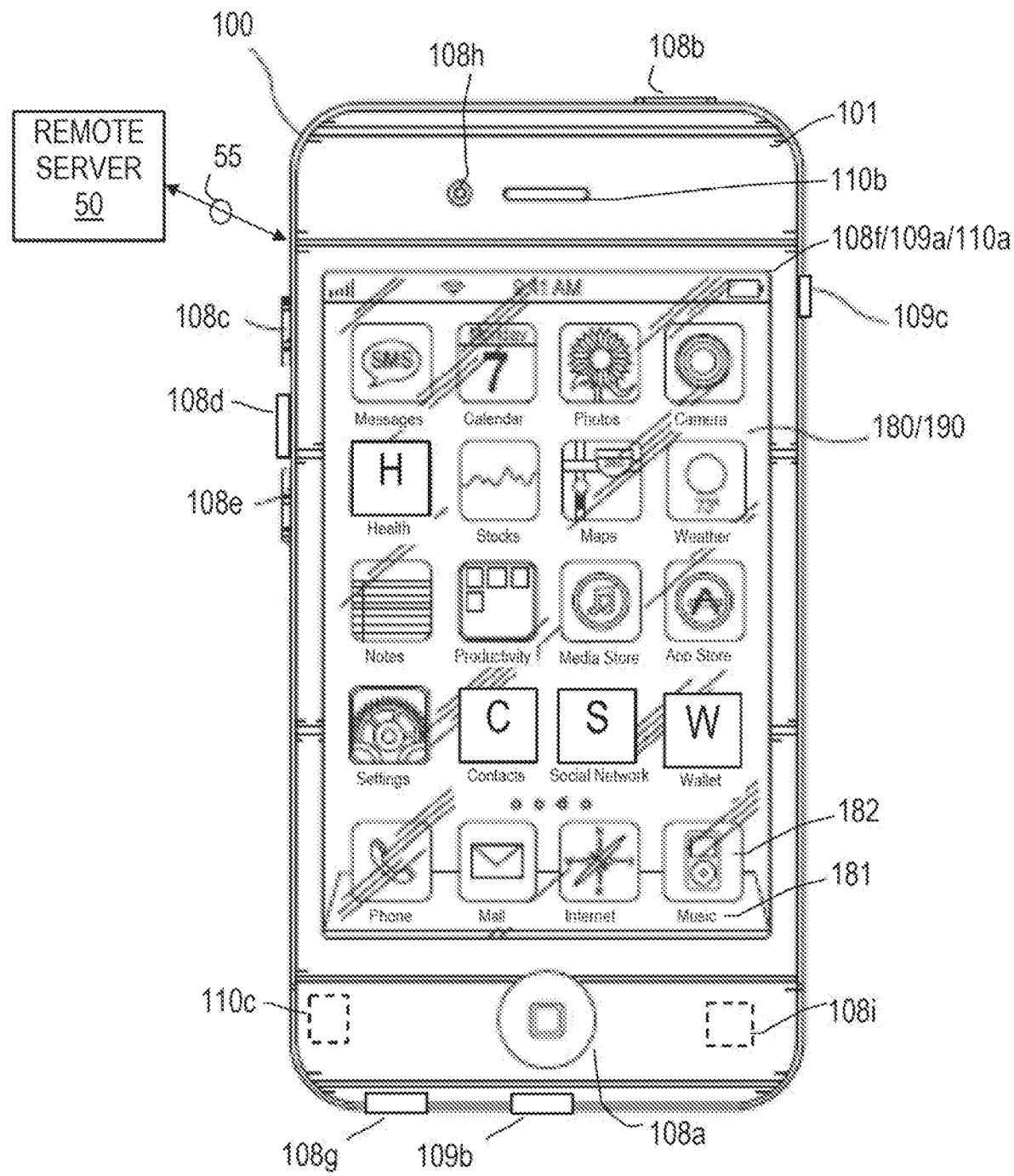
FIG. 2 is a front view of an illustrative example of an electronic device in the system of FIG. 1.

As shown in FIG. 2, one specific example of electronic device 100 may be an electronic device, such as an iPhone™, where housing 101 may allow access to various input components 108a-108i, various output components 110a-110c, and various I/O components 109a-109c through which device 100 and a user and/or an ambient environment may interface with each other. Input component 108a may include a button that, when pressed, may cause a "home" screen or menu of a currently running application to be displayed by device 100. Input component 108b may be a button for toggling electronic device 100 between a sleep mode and a wake mode or between any other suitable modes. Input component 108c may include a two-position slider that may disable one or more output components 112 in certain modes of electronic device 100. Input components 108d and 108e may include buttons for increasing and decreasing the volume output or any other characteristic output of an output component 110 of electronic device 100. Each one of input components 108a-108e may be a mechanical input component, such as a button supported by a dome switch, a sliding switch, a control pad, a key, a knob, a scroll wheel, or any other suitable form.

An output component 110a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103) that may be displayed in all or some of the areas of display output component 110a. One or more of user input components 108a-108i may be used to navigate through GUI 180. For example, one user input component 108 may include a scroll wheel that may allow a user to select one or more graphical elements or icons 182 of GUI 180. Icons 182 may also be selected via a touch screen I/O component 109a that may include display output component 110a and an associated touch input component 108f. Such a touch screen I/O component 109a may employ any suitable type of touch screen input technology, such as, but not limited to, resistive, capacitive, infrared, surface acoustic wave, electromagnetic, or near field imaging. Furthermore, touch screen I/O component 109a may employ single point or multi-point (e.g., multi-touch) input sensing.

Icons 182 may represent various applications, layers, windows, screens, templates, elements, and/or other components that may be displayed in some or all of the areas of display component 110a upon selection by the user. Furthermore, selection of a specific icon 182 may lead to a hierarchical navigation process. For example, selection of a specific icon 182 may lead from screen 190 of FIG. 2 to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon labeled with a "Photos" textual indicator is selected, device 100 may launch or otherwise access a media management and editing application (e.g., Photos™ available by Apple Inc.) that may provide user access to one or more collections of MCPs (e.g., photos and/or videos) and may display screens of a specific user interface that may include one or more tools or features for interacting with media content. As another example, when the specific icon labeled with a "Calendar" textual indicator is selected, device 100 may launch or otherwise access a specific calendar or reminder application and may display screens of a specific user interface that may include one or more tools or features for interacting with one or more events or other reminders that may be time-sensitive in a specific manner. As another example, when the specific icon labeled with a "Wallet" textual indicator is selected, device 100 may launch or otherwise access a specific pass or wallet application and may display screens of a specific user interface that may include one or more tools or features for interacting with one or more passes or other credentials (e.g., payment credentials of an NFC component) in a specific manner. As another example, when the specific icon labeled with a "Contacts" textual indicator is selected, device 100 may launch or otherwise access a specific contacts or address book application and may display screens of a specific user interface that may include one or more tools or features for interacting with one or more contacts of one or more persons or businesses or other entities in a specific manner. As another example, when the specific icon labeled with a "Social Media" textual indicator is selected, device 100 may launch or otherwise access a specific social media application or site and may display screens of a specific user interface that may include one or more tools or features for interacting with one or more social media networks with which a user may or may not have an account in a specific manner. As another example, when the specific icon labeled with a "Weather" textual indicator is selected, device 100 may launch or otherwise access a specific weather application or site and may display screens of a specific user interface that may include one or more tools or features for determining or presenting the current and/or past and/or future weather and/or other environmental conditions local to and/or distant from device 100 in a specific manner (e.g., as may be detected by any suitable sensors of device 100 and/or of remote server 50). As another example, when the specific icon labeled with a "Health" textual indicator is selected, device 100 may launch or otherwise access a specific health application or site and may display screens of a specific user interface that may include one or more tools or features for determining or presenting the current and/or past health activities and/or biometric characteristics of a user (e.g., as may be detected by any suitable sensors of device 100 and/or of remote server 50) in a specific manner. For each application, screens may be displayed on display output component 110a and may include various user interface elements. Additionally or alternatively, for each application, various other types of non-visual information may be provided to a user via various other output components 110 of device 100.

Electronic device 100 also may include various other I/O components 109 that may allow for communication between device 100 and other devices, such as a connection port 109b that may be configured for transmitting and receiving data files, such as media files or customer order files, and/or any suitable information (e.g., audio signals) from a remote data source and/or power from an external power source. For example, I/O component 109b may be any suitable port (e.g., a Lightning™ connector or a 30-pin dock connector available by Apple Inc.). I/O component 109c may be a connection slot for receiving a SIM card or any other type of removable component. Electronic device 100 may also include at least one audio input component 110g, such as a microphone, and at least one audio output component 110b, such as an audio speaker. Electronic device 100 may also include at least one tactile output component 110c (e.g., a rumbler, vibrator, haptic and/or taptic component, etc.), a camera and/or scanner input component 108h (e.g., a video or still camera, and/or a bar code scanner or any other suitable scanner that may obtain product identifying information from a code, such as a bar code, or the like), and a biometric input component 108i (e.g., a fingerprint reader or other feature recognition sensor, which may operate in conjunction with a feature-processing application that may be accessible to electronic device 100 for authenticating a user).

Figure 3:
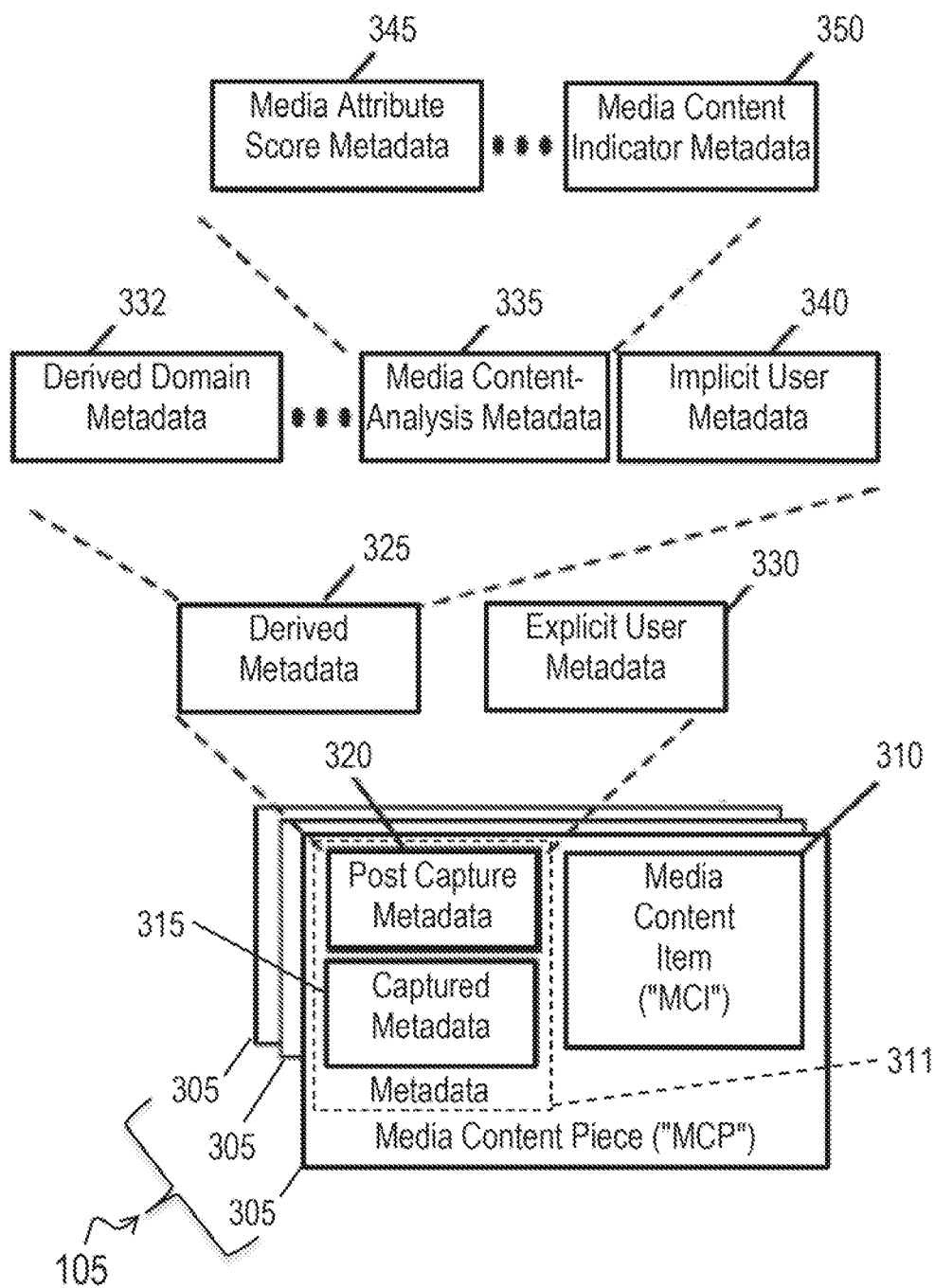
FIG. 3 is an exemplary block diagram of at least a portion of a library of media content pieces of the system of FIGS. 1 and 2.

FIG. 3 is an illustrative schematic of MCP library 105, which may include any suitable number of MCPs 305 of any suitable type. Library 105 may at least partially reside on device 100 (e.g., in memory 104) and/or may at least partially reside on a remote server (e.g., server 50) that may be accessible to device 100. As shown in FIG. 3, for example, at least one, some, or each MCP 305 may include an asset or item of MCP media content or an MCP media content item ("MCI") 310 (e.g., an image, a video, etc.) and associated MCP metadata content 311. MCP metadata content 311 may include any suitable number of metadata assets of any suitable type(s) of metadata, including, but not limited to, captured metadata 315 and post-capture metadata 320. Captured metadata 315 may include any suitable metadata that may be generated by or associated with characteristics of the capture device that captured the associated media content 310 (e.g., by camera input component 108h and/or any other suitable component(s) of device 100 or by any suitable component(s) of any other suitable media capture device (e.g., server 50)) at the time that such media content is captured. Examples of capture metadata 315 may include, but are not limited to, date and time of media content capture (e.g., based on a clock of device 100), location of media content capture (e.g., based on GPS or any other location service of device 100), one or media capture device settings of media content capture (e.g., any suitable settings of camera input component 108h, such as exposure, flash, white point, etc.), and/or the like.

Post-capture metadata 320 may include any suitable type (s) of metadata that may be defined for the media content after the media content has been capture. As shown, for example, two exemplary types of post-capture metadata 320 may include derived metadata 325 and explicit user-assigned metadata 330. Explicit user-assigned metadata 330 may include any suitable keywords (e.g., birthday, vacation, anniversary, etc.) or other suitable tags (e.g., like, dislike, favorite, verification of identity of one or more content indicators (e.g., faces or locations or scenes or clusters of features or indicators or otherwise) in the media content, etc.) that a user may assign to or otherwise associate with the media content and/or one or more user-specified associations for the MCP with respect to other MCPs (e.g., inclusion of the MCP in a user-specified album (e.g., photo album) or other collection type of MCPs). Such user-assignment of any suitable user-assigned metadata 330 may be accomplished via any suitable user interface application that may be presented by device 100 and/or server 50 to a user of system 1.

Derived metadata 325 of an MCP 305 may include any suitable types of metadata assets that may be derived or inferred by processor analysis (e.g., by an application 103 of processor 102) of media content 310, captured metadata 315, user-assigned metadata 330, and/or any user actions that may be associated with that MCP 305. One or more framework services (e.g., service(s) of device 100 and/or of server 50) may analyze one or more MCPs 305, their media content, their metadata, and/or any associated user actions to produce derived metadata 325 for one or more of the MCPs. Examples of such derived metadata 325 may include, but are not limited to, derived domain metadata 332, media content-analysis metadata 335 (e.g., image-analysis metadata for an image MCI 310), and/or implicit user metadata 340. Implicit user metadata 340 may be any suitable metadata that may be generated by monitoring any user actions with respect to the MCP (e.g., sharing the MCP with others, repeatedly viewing the MCP, etc.).

Media content-analysis metadata 335 may include any suitable type(s) of metadata attributes that may be determined by analyzing MCP media content 310. In some embodiments, such media content-analysis metadata 335 may include any suitable media attribute score metadata 345 and/or any suitable media content indicator metadata 350. Examples of media attribute score metadata 345 may include, but are not limited to, any suitable media attribute scores for quantifying focus, exposure, blur, sharpness, color attributes, pixel characteristics, pixel intensity values, luminance values, brightness values, and/or the like for any image MCI and/or for any frame(s) of any video MCI, and/or for quantifying volume, pitch, timbre, voice, source (e.g., detected sound is human voice, detected sound is fire truck, etc.) and/or the like for any audio MCI and/or the like for any other type of MCI. Media attribute score metadata 345 may be generated and/or otherwise obtained by one or more suitable services (e.g., framework services) of system 1 (e.g., of device 100 and/or of server 50). Examples of media content indicator metadata 350 may include, but are not limited to, any suitable media content indicators that may be indicative of the type of its associated MCI 310 and/or that may characterize its associated MCI 310 in any suitable manner. In an example when an MCI 310 is an image, one or more media content indicators of associated media content indicator metadata 350 may reference one or more types of particular content indicators that may be valid for that image. Additionally or alternatively, when an MCI 310 may be a video clip with multiple frames or images, one or more media content indicators of associated media content indicator metadata 350 may be expressed in terms of ranges that may define the range of images or frames over which a particular content indicator may be valid. Examples of particular types of content indicators of media content indicator metadata 350 may include, but are not limited to, face indicators (e.g., unique face vectors (or any other suitable statistical representations)), smile indicators, voice indicators, camera motion indicators, junk content indicators, scene indicators, image quality indicators, and/or the like. Any such content indicators 350 may be generated or obtained (e.g., as one or more feature vectors or feature indicators) by one or more suitable services (e.g., framework services) of system 1 (e.g., of device 100 and/or of server 50).

Derived domain metadata 332 may include any suitable data associated with any suitable domain type(s) that may be associated with the MCP by analyzing the metadata already associated with the MCP. For example, in some embodiments, a domain type may be a location domain and any captured location metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived location metadata 332 that may be indicative of one or more location regions and/or one or more location areas (e.g., areas of interest) and/or one or more location designations (e.g., home, residence, office, etc.) and/or the like that may enable the MCP to be grouped with other MCPs. As another example, a domain type may be a time domain and any captured time metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived time metadata 332 that may be indicative of one or more time quantifications (e.g., weekday, season, etc.) and/or one or more time event designations (e.g., holiday, Halloween, etc.) and/or the like that may enable the MCP to be grouped with other MCPs. As another example, a domain type may be a person domain and any captured person metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived person metadata 332 that may be indicative of one or more person quantifications (e.g., person names and/or person relationships, such as John Doe ("user"), Jane Doe ("user's wife"), Jenn Doe ("user's daughter"), unverified person (unknown relationship), Jim James ("user's co-worker"), etc.) and/or one or more person event designations (e.g., anniversary, birthday, etc.) and/or one or more person social group designations (e.g., co-worker social group of John Doe and Jim James, any social group collection of identities that may be identified to appear together often (e.g., in different moments, at different events, etc.), etc.) and/or the like that may enable the MCP to be grouped with other MCPs. As another example, a domain type may be a place domain and any captured place metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived place metadata 332 that may be indicative of one or more points of interest ("POIs") and/or regions of interest ("ROIs") (e.g., nature, water, mountain, urban, beach, nightlife, restaurant, entertainment, park, culture, travel, shopping, etc.) and/or the like that may enable the MCP to be grouped with other MCPs. As another example, a domain type may be a scene domain and any captured scene metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived scene metadata 332 that may be indicative of one or more scenes (e.g., animal (e.g., bird, reptile, dog, fish, etc.), outdoor (e.g., sky, sand, playground, etc.), celebration (e.g., wedding, birthday cake, jack-o-lantern, etc.), structure (e.g., fireplace, aquarium, etc.), vehicle (e.g., helicopter, bicycle, limousine, etc.), recreation (e.g., performance (e.g., orchestra, karaoke, rodeo, etc.), sport (e.g., rafting, surfing, scuba, etc.), etc.), plant (e.g., flower, tree, etc.), game (e.g., poker, foosball, etc.), fire, liquid (e.g., jacuzzi, river, etc.), art (e.g., origami, balloon, etc.), light (e.g., chandelier, candle, etc.), room (e.g., bar, museum, restaurant, etc.), people, etc.) and/or the like that may enable the MCP to be grouped with other MCPs. As another example, a domain type may be a moment domain and any captured moment metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived moment metadata 332 that may be indicative of a moment (e.g., a distinct range of times and a distinct location or distinct range of locations) and/or the like that may enable the MCP to be grouped with other MCPs. As described in more detail with respect to FIG. 4, for example, one or more applications or services (e.g., a framework services) of system 1 (e.g., of processor 102 and/or server 50) may be operative to generate and/or use an MCP management system 107 (e.g., a database and/or a knowledge graph metadata network (e.g., a hierarchical directed acyclic graph ("DAG") structure that may include nodes corresponding to different domain types and different specific sub-domains of each domain type of metadata 311, for example, where derived domain metadata 332 may be defined in terms of node identifiers in the graph structure, and all nodes of the structure may be correlated (e.g., by correlation weights (e.g., confidence weights and/or relevance weights))) to manage, store, ingest, organize, and/or retrieve the various MCPs 305 (e.g., metadata 311 and/or content 310) of library 105. Additional disclosure regarding suitable graph metadata networks can be found in co-pending, commonly-assigned U.S. Patent Application Publication No. 2017/0091154 (published on Mar. 30, 2017) and in co-pending, commonly-assigned U.S. patent application Ser. No. 15/391,269 (filed on Dec. 27, 2016), each of which is hereby incorporated by reference herein in its entirety.

Therefore, there may be various types of metadata assets 311 that may be associated with an MCI 310 of an MCP 305. A particular type of metadata asset may be a first metadata asset 311 of a first MCP 305 associated with a first MCI 310 and may also be a second metadata asset 311 of a second MCP 305 associated with a second MCI 310. In some embodiments, a type of metadata may be categorized as primitive metadata or inferred metadata, which may be determined based at least on primitive metadata. For example, as may be used herein, "primary primitive metadata" may refer to metadata that may describe one or more characteristics or attributes associated with one or more MCIs 310. Some types of primary primitive metadata include, but are not limited to, one or more of time metadata, geo-position metadata, geolocation metadata, people metadata, scene metadata, content metadata, object metadata, and/or sound metadata. Time metadata may refer to a time that may be associated with one or more media content items (e.g., a timestamp associated with a media content item, a time at which the media content item was captured or otherwise generated, a time at which the media content item was modified, a time at which the media content item was stored, a time at which the media content item was transmitted, a time at which the media content item was received, etc.), which may be captured metadata 315. Geo-position metadata may refer to geographic and/or spatial attributes that may be associated with one or more media content items using any suitable location sensing and/or geographic coordinate system (e.g., latitude, longitude, and/or altitude, etc.), which may be captured metadata 315. Geolocation metadata may refer to one or more meaningful locations rather than geographic coordinates that may be associated with one or more media content items, such as a beach (and its name), a street address, a country name, a region, a building, a landmark, and/or the like, which, for example, may be determined by processing geo-position metadata together with data from a map application and/or any other suitable data available to device 100 to determine that the geolocation for a scene in a group of images. People metadata may refer to at least one face that may be detected in at least one media content item (e.g., through any suitable facial recognition technique(s)), where the people metadata may be indicative of a particular identity (e.g., a tagged or otherwise known (e.g., verified) person) or an unknown identity (e.g., an unverified or unknown person), which may be metadata 330 and/or metadata 335. Scene metadata and/or object metadata may refer to an overall description of an activity or situation associated with one or more media content items based on any objects that may be detected therein (e.g., if a media content item includes a group of images, then scene metadata for the group of images may be determined using detected objects in one or more of the images (e.g., the detection of a large cake with candles and/or balloons in at least two images in the group can be used to associate "birthday" scene metadata with each of the images)), where such objects or scene indicators or content indicators may be any suitable objects (e.g., a detected animal, a detected company logo, a detected piece of furniture, a detected instrument, etc.) that may be able to be detected in a media content item using any suitable techniques (e.g., any suitable image processing techniques), which may be metadata 350. Content metadata may refer to any features of a media content item (e.g., pixel characteristics, pixel intensity values, luminance values, brightness values, loudness levels, etc., etc.), which may be metadata 345. Sound metadata may refer to one or more detected sounds associated with one or more media content items (e.g., a detected sound as a human's voice, a detected sound as a fire truck's siren, etc.), which may be metadata 335.

As used herein, "inferred metadata" may refer to metadata that may describe one or more characteristics or attributes associated with one or more MCIs 310 that is beyond the information that may be provided by primitive metadata. One difference between primitive metadata and inferred metadata may be that primitive metadata may represent an initial set of descriptions of one or more media content items while inferred metadata may provide one or more additional descriptions or characteristics of the one or more media content items based on processing one or more of the primitive metadata assets (e.g., in combination with any suitable contextual data that may be available to device 100). For example, primitive metadata may identify two detected persons in one or a group of images as John Doe and Jane Doe, while inferred metadata may identify John Doe and Jane Doe as a married couple based on processing at least a portion of the primitive metadata (e.g., in combination with any suitable contextual data). Inferred metadata may be determined from at least one of (i) processing of a combination of different types of primary primitive metadata, (ii) processing of a combination of different types of contextual information, and (iii) processing of a combination of primary primitive metadata and contextual information. As used herein, "context" and/or its variations may refer to any or all data that may be accessible to device 100, such as physical, logical, social, and/or other contextual information. As used herein, "contextual information" and/or contextual data and/or contextual metadata and/or its variations may refer to metadata or any other suitable information that may describe or define a user's context or a context of a user's device (e.g., device 100 with access to library 105 (e.g., as may be associated with a user)). Exemplary contextual information may include, but is not limited to, a predetermined time interval, a time event scheduled to occur in a predetermined time interval, a geolocation to be visited in a predetermined time interval, one or more identified persons associated with a predetermined time, an event scheduled for a predetermined time, a geolocation to be visited at predetermined time, weather metadata describing weather associated with a particular period in time (e.g., rain, snow, sun, temperature, etc.), season metadata describing a season associated with capture of a media content item, and/or the like. For example, such contextual information can be obtained from any suitable application data local to device 100 and/or any suitable application data that may be provided by external sources (e.g., a remote server (e.g., server 50 (e.g., via the internet))) from any suitable application or data source, such as a social networking application (e.g., information indicative of relationships between people, planned events with or without known attendees, birthdays, favorite hobbies and/or restaurants and/or media, etc.), a weather application (e.g., information indicative of weather or other environmental conditions at a certain place at a certain time), a calendar application (e.g., information indicative of a scheduled event, scheduled participants, etc.), a contact application (e.g., information indicative of a person's home address, etc.), a health application (e.g., information indicative of a user's heart rate, steps taken, speed, calories burned, food ingested, particular sport or hobby performed, etc.), a wallet application (e.g., information indicative of a scheduled or attended event, passes for an event, receipts for services and/or goods purchased, etc.), a messaging application or an e-mail application (e.g., information indicative of discussed events, communicating persons, etc.), a map application (e.g., information indicative of places visited, etc.), a photos application itself (e.g., information indicative of any tags or verified face identifications, likes, shares, groupings, albums, and/or the like based on a user's interaction (e.g., input data) with library 105), and/or any other type of application or data source that may be operative to provide information that may be processed (e.g., based on and/or in combination with any known metadata of library 105) to reveal additional characteristics to be associated with one or more media content items (e.g., as new metadata and/or correlations between known metadata (e.g., to define a new node and/or correlation between nodes of a metadata network (e.g., a knowledge graph)), as described in more detail with respect to FIG. 4). Therefore, one or metadata assets of library 105 may be indicative of a person's name, birthplace, birthday, gender, relationship status, identification of related persons, social groups and identities of members of social groups of any type (e.g., family, friends, co-workers, etc.), current and/or prior address(es) of residence and/or vacation and/or work, interests (e.g., hobbies (e.g., pets owned, instruments played, activities enjoyed, restaurants enjoyed, etc.)), places of interest (e.g., visited and/or interested in), etc.), religion, trips taken and associated travelers, events attended and associated attendees, physical activity (e.g., workouts or sports or hobbies or activities performed or enjoyed), and/or the like. The preceding examples are illustrative and not restrictive.

Two categories of inferred metadata may be referred to herein as primary inferred metadata and auxiliary inferred metadata. Primary inferred metadata may include time event metadata that may describe one or more time events associated with one or more media content items. For example, if a media content item or a collection of media content items is associated with primary primitive metadata indicative of a particular time or a particular range of times and/or a particular location, then associated primary inferred metadata may be determined to include time event metadata that may describe one or more time events or people events associated with such time and/or location information (e.g., a vacation, a birthday, a sporting event, a concert, a graduation ceremony, a dinner, a project, a work-out session, a traditional holiday, etc.), where such primary inferred metadata may, in some embodiments, be determined by analyzing such primary primitive metadata alone or in combination with any suitable contextual metadata (e.g., calendar data and/or social media data, etc.). Auxiliary inferred metadata may be any suitable metadata including, but not limited to, geolocation relationship metadata, person relationship metadata, object relationship metadata, and sound relationship metadata. Geolocation relationship metadata may refer to a relationship between one or more known persons associated with one or more media content items and one or more locations associated with the one or more media content items. For example, an analytics engine or data mining technique can be used to determine that a scene associated with one or more media content items of John Doe represents John Doe's home. Person relationship metadata may refer to a relationship between one or more known persons associated with one or more media content items and one or more other known persons associated with the one or more media content items. For example, an analytics engine or data mining technique can be used to determine that Jane Doe (who appears in one or more images with John Doe) is John Doe's wife. Object relationship metadata may refer to a relationship between one or more known persons associated with one or more media content items and one or more known objects associated with the one or more media content items. For example, an analytics engine or data mining technique can be used to determine that a boat appearing in one or more images with John Doe is owned by John Doe. Sound relationship metadata may refer to a relationship between one or more known sounds associated with one or more media content items and one or more known persons associated with the one or more media content items. For example, an analytics engine or data mining technique can be used to determine that a voice that appears in one or more videos with John Doe is John Doe's voice.

Inferred metadata may be determined or inferred from primitive metadata and/or contextual information by performing any suitable type(s) of processing, including, but not limited to, data mining primitive metadata and/or contextual information; analyzing primitive metadata and/or contextual information, applying logical rules to primitive metadata and/or to contextual information, and/or any other known methods that may be used to infer new information from provided or acquired information. In some embodiments, primitive metadata can be extracted from inferred metadata. For example, primary primitive metadata (e.g., time metadata, geolocation metadata, scene metadata, etc.) can be extracted from primary inferred metadata (e.g., time event metadata, etc.). Techniques for determining inferred metadata and/or extracting primitive metadata from inferred metadata can be iterative. For example, inferring metadata can trigger the inference of other metadata and so on. As another example, extracting primitive metadata from inferred metadata can trigger inference of additional inferred metadata or extraction of additional primitive metadata.

Figure 4:
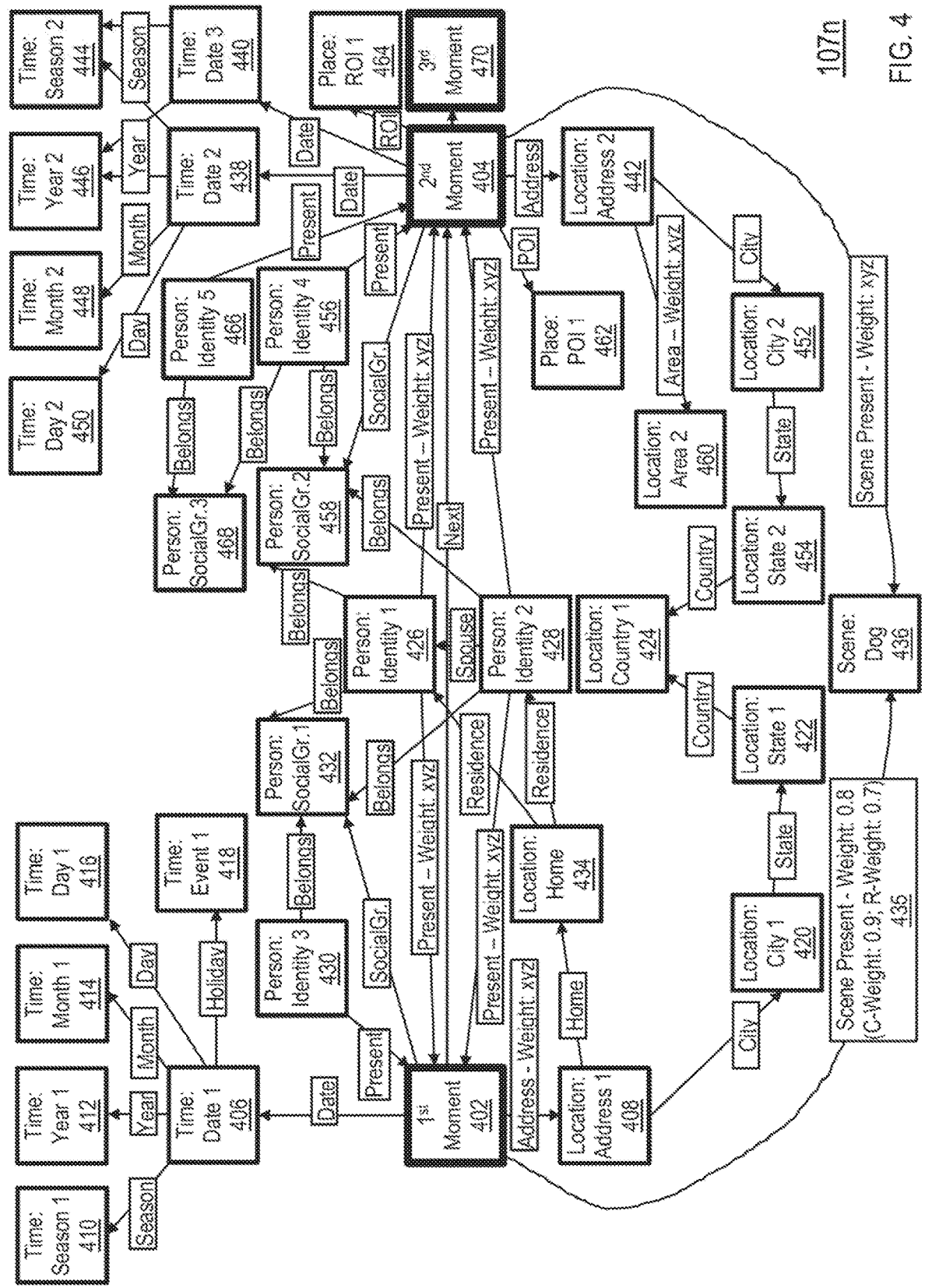
FIG. 4 is an exemplary block diagram of a portion of an illustrative metadata network of the system of FIGS. 1-3.

FIG. 4 shows, in block diagram form, an exemplary portion 107*n* of a type of MCP management system 107, which may be provided by any suitable graph structure, such as a DAG structure or otherwise, and may also be referred to herein as a knowledge graph metadata network or knowledge graph or metadata network 107*n*. While an MCP management system may, alternatively, be provided by any suitable database (e.g., a relational database, a distributed database, an object-oriented programming database, etc.), using such a database for management of a library of MCPs may be too resource-intensive (e.g., substantial computational resources may be needed to manage the MCPs (e.g., substantial processing power may be needed for performing queries or transactions, storage memory space for storing the necessary databases, etc.)) and/or may not be as easily implemented on a computing system with limited storage capacity (e.g., device 100), thereby requiring certain functionality of a remote subsystem (e.g., remote server 50). Instead, in some embodiments, MCP management system 107 may be at least partially provided as a metadata network 107*n*, at least an exemplary portion of which may be shown in FIG. 4, that may include correlated metadata assets that may describe characteristics associated with various MCIs 310 of MCPs 305 of library 105, where such a metadata network may be operative to manage library 105 locally on device 100 (e.g., with processing circuitry 102) without the need for any external data sources (e.g., remote server 50). Each metadata asset may be a type of metadata 311 that may be associated with and that may describe or otherwise be indicative of at least characteristic of one or more MCIs 310 of one or more MCPs 305 of library 105. As a non-limiting example, a metadata asset can describe a characteristic associated with multiple MCIs 310 (e.g., a metadata asset may be metadata 311 of two or more different MCPs 305) in library 105. Each metadata asset can be represented as a node in metadata network 107*n*. A metadata asset can be correlated with at least one other metadata asset. Each correlation between metadata assets can be represented as an edge in the metadata network that is between the nodes representing the correlated metadata assets.

Device 100 (e.g., processing circuitry 102) may include any suitable processing unit(s), such as one or more central processing units ("CPUs"), one or more graphics processing units ("GPUs"), other integrated circuits ("ICs"), memory, and/or other electronic circuitry. Such processing unit(s) may include any suitable MCP management logic/modules, which may be implemented as hardware (e.g., electronic circuitry associated with processing circuitry 102, dedicated logic, etc.), software (e.g., one or more instructions associated with a computer program (e.g., application 103) that may be executed by processing circuitry 102, software run on a general-purpose computer system or a dedicated machine, etc.), or a combination thereof, for generating and/or maintaining and/or otherwise operating MCP management system 107 by manipulating and/or otherwise processing any suitable data of library 105 and any other suitable data (e.g., contextual data) available to device 100 (e.g., social media application data, contact application data, weather application data, health application data, calendar application data, messaging application data, e-mail application data, and/or the like). Therefore, device 100 and/or any other portion(s) of system 1 (e.g., server 50) may be operative to generate and use a knowledge graph metadata network 107*n* as a multi-dimensional network, which may be a dynamically organized collection of metadata assets of metadata 311 of MCPs 305 of library 105 but which may not include any media content items 310 of such MCPs 305, and/or which may be used for deductive reasoning. For example, device 100 may be operative to (i) generate metadata network 107*n*, (ii) relate and/or present at least two MCIs 310 based on metadata network 107*n*, (iii) determine and/or present interesting MCIs 310 of library 105 based on metadata network 107*n* and predetermined criterion, (iv) select and/or present representative MCIs 310 to summarize a collection (e.g., a moment) of media content items based on input specifying the representative group's size, (v) use metadata network 107*n* to reduce a number of unverified persons detected in media content 310, (vi) use metadata network 107*n* to determine a mood of a collection (e.g., a moment) of media content items, and/or (vii) use metadata network 107*n* to identify a group of media content items associated with a particular type of scene that may be relevant to a user.

Metadata network 107*n* may enable deep connections between metadata using multiple dimensions in the metadata network, which can be traversed for additionally deduced correlations. Each dimension in the metadata network may be viewed as a grouping of metadata based on metadata type. For example, a grouping of metadata may be all time metadata assets in a metadata collection (e.g., all metadata 311 of library 105) and another grouping could be all geo-position metadata assets in the same metadata collection. Thus, in such an example, a time dimension may refer to all time metadata assets in the metadata collection and a geo-position dimension may refer to all geo-position metadata assets in the same metadata collection. Furthermore, the number of dimensions can vary based on constraints. Constraints may include, but are not limited to, a desired use for the metadata network, a desired level of detail, and/or the available metadata or computational resources that may be used to implement the metadata network. For example, the metadata network can include only a time dimension, the metadata network can include all types of primitive metadata dimensions, and/or the like. With regard to the desired level of detail, each dimension can be further refined based on specificity of the metadata. That is, each dimension in the metadata network may be a grouping of metadata based on metadata type and the granularity of information may be described by the metadata. For a first example, there may be two time dimensions in the metadata network, where a first time dimension may include all time metadata assets classified by week and a second time dimension may include all time metadata assets classified by month. For a second example, there may be two geolocation dimensions in the metadata network, where a first geolocation dimension may include all geolocation metadata assets classified by type of establishment (e.g., home, business, etc.) and a second geolocation dimension that may include all geolocation metadata assets classified by country. The preceding examples are merely illustrative and not restrictive. It is to be appreciated that the level of detail for dimensions can vary depending on designer choice, application, available metadata, and/or available computational resources.

Metadata network 107*n* may be a multi-dimensional network of MCP metadata 311. As used herein, a "multi-dimensional network" and its variations may refer to a graph (e.g., a complex graph) having multiple kinds of relationships. A multi-dimensional network generally may include multiple nodes and edges, where, in some embodiments, the nodes may represent metadata and the edges may represent relationships or correlations between the metadata. Exemplary multi-dimensional networks include, but are not limited to, edge-labeled multigraphs, multipartite edge-labeled multigraphs, DAGs, and multilayer networks. In some embodiments, the nodes in metadata network 107*n* may represent metadata assets of MCP metadata 311, for example, where each node may represent a particular metadata asset that may be associated with one or more MCIs 310 and MCPs 305 of library 105 (e.g., a first node may be a first metadata asset that may not only be a part of first metadata 311 associated with a first MCI 310 of a first MCP 305 of library 105 but that may also be a part of second metadata 311 associated with a second MCI 310 of a second MCP 305 of library 105. As another example, each node may represent a metadata asset that may be associated with a group of MCIs in a collection. As used herein, a "metadata asset" and its variations may refer to metadata (e.g., a single instance of metadata, a group of multiple instances of metadata, etc.) that may describe one or more characteristics of one or more MCIs in a library. As such, there may be a primitive metadata asset, an inferred metadata asset, and/or the like. For a first example, a primary primitive metadata asset may refer to a time metadata asset describing a time interval between Jun. 1, 2016 and Jun. 3, 2016 when one or more MCIs may have been captured. For a second example, a primary primitive metadata asset may refer to a geo-position metadata asset that may describe one or more latitudes and/or longitudes where one or more MCIs may have been captured. For a third example, an inferred metadata asset may refer to a time event metadata asset that may describe a holiday of Halloween.

Metadata network 107*n* may be configured to include two types of nodes, such as moment nodes and non-moments nodes. As used herein, a "moment" may refer to a single event (e.g., as may be described by an event or moment metadata asset) that may be associated with one or more MCIs. For example, a moment may refer to a vacation in Paris, France that lasted between Jun. 1, 2016 and Jun. 9, 2016 or to a Halloween party on Halloween afternoon at a person's home. For this example, the moment can be used to identify one or more MCIs 310 (e.g., one image, a group of images, a video, a group of videos, a song, a group of songs, etc.) that may be associated with the vacation in Paris, France that lasted between Jun. 1, 2016 and Jun. 9, 2016 or that may be associated with the afternoon Halloween party at a person's home. As used herein, a "moment node" may refer to a node in a multi-dimensional network, such as metadata network 107n, that may represent a moment. Thus, a moment node may refer to a metadata asset (e.g., a primary inferred metadata asset) that may represent a single event or moment that may be associated with one or more MCIs. As used herein, a "non-moment node" may refer to a node in a multi-dimensional, such as metadata network 107n, that may not represent a moment. Thus, a non-moment node may refer to at least one of a primary primitive metadata asset associated with one or more MCIs or an inferred metadata asset associated with one or more MCIs that is not a moment (i.e., not a moment metadata asset). As used herein, an "event" and its variations may refer to a situation or an activity that may be occurring at one or more locations during a specific time interval. An event may include, but is not limited to, one or more of a gathering of one or more persons to perform an activity (e.g., a holiday, a vacation, a birthday, a dinner, a project, a work-out session, etc.), a sporting event (e.g., an athletic competition, etc.), a ceremony (e.g., a ritual of cultural significance that is performed on a special occasion, etc.), a meeting (e.g., a gathering of individuals engaged in some common interest, etc.), a festival (e.g., a gathering to celebrate some aspect in a community, etc.), a concert (e.g., an artistic performance, etc.), a media event (e.g., an event created for publicity, etc.), a party (e.g., a large social or recreational gathering, etc.), and/or the like. While network 107n may be described with respect to moment nodes and non-moment nodes such that all nodes may be related via a moment dimension (e.g., a time dimension, as each moment node may be associated with a discrete duration/range of time), network 107n may alternatively be described with respect to "visit" nodes and non-visit nodes such that all nodes may be related via a visit dimension (e.g., a location dimension, where each visit node may be associated with a discrete geographic location/range of locations, not beholden to any particular time frame), or with respect to any other type of nod/dimension(s) delineation.

Edges in metadata network 107n between nodes may represent relationships or correlations between the nodes. For example, system 1 may update metadata network 107n as new metadata 311 is obtained. System 1 may be configured to manage MCIs 310 of library 105 using metadata network 107n, such as to relate multiple MCIs based on the correlations (e.g., the edges in metadata network 107n) between metadata assets associated with the MCIs (e.g., the nodes of metadata network 107n). For example, a first group of one or more MCIs 310 may be related to a second group of one or more MCIs based on the metadata assets that may be represented as moment nodes in metadata network 107n. As another example, metadata network 107n may be used to identify and present or otherwise utilize interesting groups of one or more MCIs 310 in library 105 based on certain correlations (e.g., certain edges in metadata network 105) between metadata assets associated with the MCIs (e.g., the nodes in metadata network 107n) and any suitable predetermined criterion, where the interesting groups of MCIs may be selected based on moment nodes in metadata network 107n and such predetermined criterion may refer to any suitable contextual information. It is to be appreciated that metadata network 107n of FIG. 4 is exemplary and that every node that can be generated by system 1 is not shown. For example, even though every possible node is not illustrated in FIG. 4, system 1 may be operative to generate a node to represent each metadata asset of library 105.

In metadata network 107n of FIG. 4, nodes representing metadata may be illustrated as boxes while edges representing correlations between metadata may be illustrated as labeled connections between boxes. Furthermore, moment nodes (e.g., a first moment node 402, a second moment node 404, and a third moment node 470) may be represented as boxes with thickened boundaries while other non-moment nodes (e.g., nodes 406-468) may lack such thickened boundaries. System 1 (e.g., processing circuitry 102) may be operative to define nodes based on metadata 311 associated with MCIs 310 of MCPs 305 of library 105, and, as additional metadata 311 is determined (e.g., as new metadata is captured, assigned, inferred, derived, and/or the like (e.g., as additional MCIs 310 are captured or added to library 105 and/or as additional explicit user actions are taken and/or as additional contextual data is made available to system 1), additional nodes and/or edges may be generated and added to metadata network 107n.

As shown, metadata network 107n may include a first moment metadata asset node 402 and a second moment metadata asset node 404. Any moment node may be generated for a particular moment that may be identified by system 1 based on library 105 in any suitable manner. For example, when at least a threshold amount of MCIs 310 are identified to be associated with time metadata within a particular time range and with location metadata within a particular location range, then those identified MCIs 310 may be associated with a moment metadata asset that is descriptive of that time range and location range (e.g., a moment that may be indicative of an interesting event that took place during that time range at that location(s) due to at least a threshold amount of MCIs being captured). Alternatively, a particular subset of MCIs 310 of library 105 may be associated with a particular moment metadata asset in any other suitable manner. As just one particular example, which may be referred to herein with respect to metadata network 107n of FIG. 4, first moment metadata asset node 402 may be defined to represent first moment metadata indicative of a first moment that may be based on a particular time range of 2:00 PM to 4:00 PM on Oct. 31, 2009 and for a particular location range (e.g., within 100 feet) of a particular geographic coordinate (e.g., a particular address), such as a user's home at 22 Skyline Drive in Wellesley, Mass., 02482, U.S.A., where such a first moment may be defined as a result of at least a certain number of MCIs 310 being identified in library 105 that are associated with time metadata 311 indicative of any time within that time range and with location metadata 311 indicative of any location within that location range (e.g., when many MCIs are captured at a Halloween party at a person's home), while second moment metadata asset node 404 may be defined to represent second moment metadata indicative of a second moment that may be based on a particular time range of Jun. 30, 2016 through Jul. 1, 2016 and for a particular location range (e.g., within the city limits of a particular city), such as within New York City, N.Y., U.S.A., where such a second moment may be defined as a result of at least a certain number of MCIs 310 being identified in library 105 that are associated with time metadata 311 indicative of any time within that time range and with location metadata 311 indicative of any location within that location range (e.g., when many MCIs are captured during a vacation to New York City), where each one of such MCIs associated with second moment 404 may be different than each one of such MCIs associated with first moment 402. Although only two moment nodes may be shown in FIG. 4, network 107n may include more than two moment nodes, each associated with a particular moment of a particular time range and a particular geographic range. Two moment nodes may be correlated by advancement of time (e.g., second moment metadata asset node 404 associated with the year 2016 may be after first moment metadata asset node 402 associated with the year 2009, as may be shown by the edge labelled "Next" between nodes 402 and 404).

Any suitable nodes may be associated with any suitable metadata assets and may be defined within network 107n and correlated with one or more moment nodes and/or one or more non-moment nodes. As shown, first moment metadata asset node 402 may be correlated (e.g., by date) with at least one time date metadata asset node 406 that may be defined to represent time date metadata indicative of a first date (e.g., Oct. 31, 2009) and/or may be correlated (e.g., by address) with at least one location address metadata asset node 408 that may be defined to represent location address metadata indicative of a first address (e.g., 22 Skyline Drive, Wellesley, Mass., 02482, U.S.A. or an associated geographic coordinate system (e.g., latitude, longitude, and/or altitude)). At least one MCI 310 of library 105 may be associated with first moment metadata represented by moment node 402 and time metadata represented by time node 406 and location metadata represented by location node 408. As shown, time date metadata asset node 406 (e.g., indicative of Oct. 31, 2009) may be correlated (e.g., by season) with a time season metadata asset node 410 that may be defined to represent time season metadata indicative of a first season (e.g., Fall) and/or may be correlated (e.g., by year) with a time year metadata asset node 412 that may be defined to represent time year metadata indicative of a first year (e.g., 2009) and/or may be correlated (e.g., by month) with a time month metadata asset node 414 that may be defined to represent time month metadata indicative of a first month (e.g., October) and/or may be correlated (e.g., by day) with a time day metadata asset node 416 that may be defined to represent time day metadata indicative of a first day (e.g., 31) and/or may be correlated (e.g., by holiday) with a time holiday metadata asset node 418 that may be defined to represent time holiday metadata indicative of a first holiday (e.g., Halloween), and, although not shown, it is to be understood that time date metadata asset node 406 may be correlated with any other suitable types of metadata asset nodes within network 107n, including, but not limited to, a time day of week metadata asset node that may be defined to represent time day of week metadata indicative of a day of week (e.g., Saturday) and/or the like. Additionally or alternatively, as shown, location address metadata asset node 408 (e.g., indicative of 22 Skyline Drive, Wellesley, Mass., 02482, U.S.A.) may be correlated (e.g., by city) with a location city metadata asset node 420 that may be defined to represent location city metadata indicative of a first city (e.g., Wellesley), which may be correlated (e.g., by state) with a location state metadata asset node 422 that may be defined to represent location state metadata indicative of a first state (e.g., Massachusetts), which may be correlated (e.g., by country) with a location country metadata asset node 424 that may be defined to represent location country metadata indicative of a first country (e.g., United States of America), and, although not shown, it is to be understood that location address metadata asset node 408 may be correlated (e.g., directly or via another node) with any other suitable types of metadata asset nodes within network 107n, including, but not limited to, a location ZIP code metadata asset node that may be defined to represent location ZIP code metadata indicative of a ZIP code and/or the like.

Additionally or alternatively, as shown, first moment metadata asset node 402 may be correlated (e.g., by presence) with at least one person identity metadata asset node, such as a person identity metadata asset node 426 that may be defined to represent person identity metadata indicative of a first identity (e.g., John Doe) and/or a person identity metadata asset node 428 that may be defined to represent person identity metadata indicative of a second identity (e.g., Jane Doe) and/or a person identity metadata asset node 430 that may be defined to represent person identity metadata indicative of a third identity (e.g., a first unknown person), while person identity metadata asset node 428 may be correlated (e.g., by spouse) with person identity metadata asset node 426 (e.g., when the first identity (e.g., John Doe) and the second identity (e.g., Jane Doe) are determined to be each other's spouse). At least one MCI 310 of library 105 may be associated with first moment metadata represented by moment node 402 and person metadata represented by person node 426, at least one MCI 310 of library 105 may be associated with first moment metadata represented by moment node 402 and person metadata represented by person node 428, and at least one MCI 310 of library 105 may be associated with first moment metadata represented by moment node 402 and person metadata represented by person node 430. Network 107n may also include a person social group metadata asset node 432 that may be defined to represent person social group metadata indicative of a first social group and that may be correlated (e.g., by social group) with moment node 402, and each one of person identity metadata asset node 426 and person identity metadata asset node 428 and person identity metadata asset node 430 may be correlated (e.g., by belonging) with person social group metadata asset node 432 (e.g., when the first identity (e.g., John Doe) and the second identity (e.g., Jane Doe) and the third identity (e.g., the first unknown person) are determined to be of a particular social group). Network 107n may also include a location home metadata asset node 434 that may be defined to represent location home metadata indicative of a first home or residence, and location address metadata asset node 408 may be correlated (e.g., by home) with location home metadata asset node 434 (e.g., when the first address (e.g., 22 Skyline Drive, Wellesley, Mass., 02482, U.S.A.) is determined to be a home or residence), while each one of person identity metadata asset node 426 and person identity metadata asset node 428 may be correlated (e.g., by residence) with location home metadata asset node 434 (e.g., when each one of the first identity (e.g., John Doe) and the second identity (e.g., Jane Doe) is determined to reside at the first home). Additionally or alternatively, as shown, first moment metadata asset node 402 may be correlated (e.g., by presence) with at least one scene metadata asset node, such as a scene metadata asset node 436 that may be defined to represent scene metadata indicative of a first scene (e.g., a dog). At least one MCI 310 of library 105 may be associated with first moment metadata represented by moment node 402 and scene metadata represented by scene node 436.

Second moment metadata asset node 404 may be correlated (e.g., by date) with at least one time date metadata asset node 438 that may be defined to represent time date metadata indicative of a second date (e.g., Jun. 30, 2016) and/or may be correlated (e.g., by date) with at least one other time date metadata asset node 440 that may be defined to represent time date metadata indicative of a third date (e.g., Jul. 1, 2016) and/or may be correlated (e.g., by address) with at least one location address metadata asset node 442 that may be defined to represent at least one location address metadata indicative of a second address (e.g., 350 5$^{th}$ Avenue, New York, N.Y. 10118, U.S.A. or an associated geographic coordinate system (e.g., latitude, longitude, and/or altitude)). At least one MCI 310 of library 105 may be associated with second moment metadata represented by moment node 404 and location metadata represented by location node 408 and at least one of time metadata represented by time node 438 and time metadata represented by time node 440. As shown, time date metadata asset node 438 (e.g., indicative of Jun. 30, 2016) may be correlated (e.g., by season) with a time season metadata asset node 444 that may be defined to represent time season metadata indicative of a second season (e.g., Summer) and/or may be correlated (e.g., by year) with a time year metadata asset node 446 that may be defined to represent time year metadata indicative of a second year (e.g., 2016) and/or may be correlated (e.g., by month) with a time month metadata asset node 448 that may be defined to represent time month metadata indicative of a second month (e.g., June) and/or may be correlated (e.g., by day) with a time day metadata asset node 450 that may be defined to represent time day metadata indicative of a second day (e.g., 30), and, although not shown, it is to be understood that time date metadata asset node 438 may be correlated with any other suitable types of metadata asset nodes within network 107*n*, including, but not limited to, a time day of week metadata asset node that may be defined to represent time day of week metadata indicative of a day of week (e.g., Thursday) and/or the like. Additionally or alternatively, as shown, time date metadata asset node 440 (e.g., indicative of Jul. 1, 2016) may be correlated (e.g., by season) with time season metadata asset node 444 that may be defined to represent time season metadata indicative of the second season (e.g., Summer) and/or may be correlated (e.g., by year) with a time year metadata asset node 446 that may be defined to represent time year metadata indicative of the second year (e.g., 2016) and/or may be correlated (e.g., by month) with a time month metadata asset node (not shown) that may be defined to represent time month metadata indicative of a third month (e.g., July) and/or may be correlated (e.g., by day) with a time day metadata asset node (not shown) that may be defined to represent time day metadata indicative of a third day (e.g., 1), and, although not shown, it is to be understood that time date metadata asset node 440 may be correlated with any other suitable types of metadata asset nodes within network 107*n*, including, but not limited to, a time day of week metadata asset node that may be defined to represent time day of week metadata indicative of a day of week (e.g., Friday) and/or the like. Additionally or alternatively, as shown, location address metadata asset node 442 (e.g., indicative of 350 5$^{th}$ Avenue, New York, N.Y. 10118, U.S.A.) may be correlated (e.g., by city) with a location city metadata asset node 452 that may be defined to represent location city metadata indicative of a second city (e.g., New York City), which may be correlated (e.g., by state) with a location state metadata asset node 454 that may be defined to represent location state metadata indicative of a second state (e.g., New York), which may be correlated (e.g., by country) with location country metadata asset node 424 that may be defined to represent location country metadata indicative of the first country (e.g., United States of America), and, although not shown, it is to be understood that location address metadata asset node 442 may be correlated (e.g., directly or via another node) with any other suitable types of metadata asset nodes within network 107*n*, including, but not limited to, a location ZIP code metadata asset node that may be defined to represent location ZIP code metadata indicative of a ZIP code and/or the like.

Additionally or alternatively, as shown, second moment metadata asset node 404 may be correlated (e.g., by presence) with at least one person identity metadata asset node, such as person identity metadata asset node 426 that may be defined to represent person identity metadata indicative of the first identity (e.g., John Doe) and/or person identity metadata asset node 428 that may be defined to represent person identity metadata indicative of the second identity (e.g., Jane Doe) and/or a person identity metadata asset node 456 that may be defined to represent person identity metadata indicative of a fourth identity (e.g., Jenn Doe) and/or a person identity metadata asset node 466 that may be defined to represent person identity metadata indicative of a fifth identity (e.g., a second unknown person). Although not shown, person identity metadata asset node 456 may be correlated (e.g., by offspring) with person identity metadata asset node 426 and with person identity metadata asset node 428 (e.g., when the fourth identity (e.g., Jenn Doe) is determined to be the offspring of the first identity (e.g., John Doe) and of the second identity (e.g., Jane Doe)). At least one MCI 310 of library 105 may be associated with second moment metadata represented by moment node 404 and person metadata represented by person node 426, at least one MCI 310 of library 105 may be associated with second moment metadata represented by moment node 404 and person metadata represented by person node 428, at least one MCI 310 of library 105 may be associated with second moment metadata represented by moment node 404 and person metadata represented by person node 456, and at least one MCI 310 of library 105 may be associated with second moment metadata represented by moment node 404 and person metadata represented by person node 466. Network 107*n* may also include a person social group metadata asset node 458 that may be defined to represent person social group metadata indicative of a second social group and that may be correlated (e.g., by social group) with moment node 404, and each one of person identity metadata asset node 426 and person identity metadata asset node 428 and person identity metadata asset node 456 may be correlated (e.g., by belonging) with person social group metadata asset node 458 (e.g., when the first identity (e.g., John Doe) and the second identity (e.g., Jane Doe) and the fourth identity (e.g., Jenn Doe) are determined to be of a particular social group (e.g., a family)), while it is to be noted that person identity metadata asset node 466 may not be correlated with person social group metadata asset node 458 (e.g., when the fifth identity (e.g., second unknown person) is determined not to be of a particular social group (e.g., a family)). However, network 107*n* may also include a person social group metadata asset node 468 that may be defined to represent person social group metadata indicative of a third social group and that may be correlated (e.g., by social group (not shown)) with moment node 402, and each one of person identity metadata asset node 456 and person identity metadata asset node 466 may be correlated (e.g., by belonging) with person social group metadata asset node 468 (e.g., when the fourth identity (e.g., Jenn Doe) and the fifth identity (e.g., second unknown person) are determined to be of a particular social group). Network 107*n* may also include a location area metadata asset node 460 that may be defined to represent location area metadata indicative of a first area (e.g., an area of interest), such as the Empire State Building, and location address metadata asset node 442 may be correlated (e.g., by area) with location area metadata asset node 460 (e.g., when the second address (e.g., 350 5$^{th}$ Avenue, New York, N.Y. 10118, U.S.A.) is determined to be a particular area (e.g., an area of interest)). Additionally or alternatively, as shown, second moment metadata asset node 404 may be correlated (e.g., by point of interest ("POI")) with at least one place POI metadata asset node, such as a place POI metadata asset node 462 that may be defined to represent place POI metadata indicative of a first POI (e.g., culture). At least one MCI 310 of library 105 may be associated with second moment metadata represented by moment node 404 and place POI metadata represented by place POI node 462. Additionally or alternatively, as shown, second moment metadata asset node 404 may be correlated (e.g., by region of interest ("ROI")) with at least one place ROI metadata asset node, such as a place ROI metadata asset node 464 that may be defined to represent place ROI metadata indicative of a first ROI (e.g., urban). At least one MCI 310 of library 105 may be associated with second moment metadata represented by moment node 404 and place ROI metadata represented by place ROI node 464. Additionally or alternatively, as shown, second moment metadata asset node 404 may be correlated (e.g., by presence) with at least one scene metadata asset node, such as scene metadata asset node 436 that may be defined to represent scene metadata indicative of the first scene (e.g., a dog). At least one MCI 310 of library 105 may be associated with second moment metadata represented by moment node 404 and scene metadata represented by scene node 436.

It is to be understood that FIG. 4 is just exemplary of what may only be a portion of one illustrative metadata network 107*n* of system 1. For example, any node of FIG. 4 may be correlated with one or more other nodes of network 107*n* not shown in FIG. 4. For example, person identity metadata node 426 may be correlated (not shown) with one or more additional moment metadata nodes of network 107*n* in addition to moment nodes 402 and 404 (e.g., a third moment node 470 that may be representative of third moment metadata indicative of a third moment after the second moment represented by moment node 404). Additionally or alternatively, location country metadata node 424 may be correlated with one or more additional location nodes of network 107*n* in addition to location nodes 422 and 454. Additionally or alternatively, moment node 404 may be correlated with one or more additional location nodes of network 107*n* in addition to location node 442 (e.g., one or more MCIs 310 of library 105 may be associated with second moment metadata represented by moment node 404 and location address metadata other than the location address represented by location address node 442 (e.g., another MCI 310 associated with moment node 404 may be associated with third location address metadata indicative of a third location address other than 350 5$^{th}$ Avenue, New York, N.Y. 10118, U.S.A. (e.g., an address associated with another area of interest other than the Empire State Building))). Network 107*n* may be further populated with one or more additional nodes and/or one or more additional edges between nodes when one or more new metadata assets may be determined and associated with one or more MCIs already associated with moment metadata represented by one of moment node 402 and moment 404 and/or when one or more new MCIs may be associated with moment metadata represented by one of moment node 402 and moment node 404 and/or when further processing is carried out by system 1 on any existing metadata and/or contextual data available to system 1. It is to be appreciated that certain metadata assets and their respective nodes may be associated with individual MCIs and/or with other nodes (e.g., moment nodes) that may be associated with individual MCIs or groups of MCIs. For example, a moment node may be associated with each MCI in a group of MCIs, where each MCI in the group of MCIs may be associated with time metadata indicative of a time within the time range of the moment and/or may be associated with location metadata indicative of a location within the location range of the moment. As another example, a scene node (e.g., scene metadata asset node 436 that may be defined to represent scene metadata indicative of a first scene (e.g., a dog)) may be correlated with moment node 402, which may be associated with each MCI that has time and/or location metadata related to the time and location constraints of the moment, while only one or some but not all of those MCIs may be associated with scene metadata indicative of the scene represented by the scene node. Therefore, a scene node may be correlated to a moment node that is associated with a group of MCIs, while the scene node may also be directly associated with only one or some (or maybe all) of the MCIs of that group.

System 1 may be configured to generate additional nodes based on moment nodes in any suitable manner, including, but not limited to, determining (e.g., detecting, receiving, inferring, deriving, or otherwise obtaining a new metadata asset associated with a moment node by cross-referencing the new metadata asset with other assets in network 107*n* and/or generating a node for each metadata asset of library 105. System 1 may be configured to refine one, some, or each metadata asset associated with a moment nodes in any suitable manner, such as based on a probability distribution (e.g., a discrete probability distribution, a continuous probability distribution, etc.). For example, a Gaussian distribution may be used to determine a distribution of at least some metadata assets, such as the primary primitive metadata assets. For this example, the distribution may be used to ascertain a mean, a median, a mode, a standard deviation, a variance, and/or any other suitable characteristic associated with the distribution of the primary primitive metadata assets. System 1 may be configured to use the Gaussian distribution to select or filter out a subset of the primary primitive metadata assets that may be within any suitable predetermined criterion (e.g., 1 standard deviation (e.g., 68%), 2 standard deviations (e.g., 95%), 3 standard deviations (e.g., 99.7%), etc.). Hence, such selection/filtering operation(s) may be operative to assist with identifying relevant primary primitive metadata assets for MCP management and/or with filtering out noise and/or unreliable primary primitive metadata assets. Consequently, other types of metadata (e.g., inferred metadata assets, etc.) that may be associated with, determined from, or inferred from the primary primitive metadata assets may also be relevant and relatively noise-free. As another example, a Gaussian distribution may be used to determine a distribution of one, some, or each moment nodes. For this example, the distribution may be used to ascertain a mean, a median, a mode, a standard deviation, a variance, and/or any other suitable characteristic associated with the distribution of the moments. System 1 may be operative to use the Gaussian distribution to select or filter out a subset of the moment nodes that may be within any suitable predetermined criterion (e.g., 1 standard deviation (e.g., 68%), 2 standard deviations (e.g., 95%), 3 standard deviations (e.g., 99.7%), etc.). Hence, such selection/filtering operation(s) may be operative to assist with identifying relevant moment nodes for MCP management and/or with filtering out noise and/or unreliable primary inferred metadata assets or otherwise. Consequently, other types of metadata (e.g., primary primitive metadata assets, auxiliary inferred metadata assets, etc.) that may be associated with, determined from, or extracted from the moment metadata assets may also be relevant and relatively noise-free. Noise may occur due to primary primitive metadata assets that may be associated with one or more irrelevant MCIs, where such MCIs may be determined based on the number of MCIs associated with a primary primitive metadata asset. For example, a primary primitive metadata asset associated with two or less MCIs may be designated as noise. This may be because such metadata assets (and their associated MCIs) may be irrelevant given the little information they provide. For example, the more important or significant an event is to a user, the higher the likelihood that the event is captured using a large number of MCIs (e.g., three or more, etc.). For this example, the probability distribution described above may enable selecting the primary primitive metadata asset associated with these MCIs. This may be because the number of MCIs associated with the event may suggest an importance or relevance of the primary primitive metadata asset. In contrast, insignificant events may have only one or two MCIs captured, and the corresponding primary primitive metadata asset may not add much to MCP management based on the use of a metadata network, for example. The immediately preceding examples may also be applicable to any types of metadata.

System 1 may be configured to determine a correlation weight (e.g., confidence weight and/or a relevance weight) for one, some, or each metadata asset and/or one, some, or each correlation between any two metadata nodes representative of any two metadata assets. As used herein, a "confidence weight" and its variations may refer to a value (e.g., an integer, etc.) that may be used to describe a certainty that a metadata asset correctly identifies a feature or characteristic of one or more MCIs (e.g., one or more MCIs associated with a moment). For example, a confidence weight of 0.6 (e.g., out of a maximum of 1.0) can be used to indicate a 60% confidence level that a feature (e.g., a scene) in one or more MCIs associated with a moment is a dog. As used herein, a "relevance weight" and its variations may refer to a value (e.g., an integer, etc.) that may be used to describe an importance assigned to a feature or characteristic of one or more MCIs (e.g., one or more MCIs associated with a moment) as identified by a metadata asset. For example, a first relevance weight of 0.85 (e.g., out of a maximum of 1.0) can be used to indicate that a first identified feature in an MCI (e.g., a person) is very important while a second relevance weight of 0.50 (e.g., out of a maximum of 1.0) can be used to indicate that a second identified feature in an MCI (e.g., a dog) is not as important.

As shown in FIG. 4, for example, system 1 may be operative to estimate that one or more metadata assets associated with one or more MCIs associated with moment node 402 describe a dog. For this example, a correlation weight of a correlation 435 between node 402 and node 436 may be assigned a value 0.8, which may be any suitable confidence weight, any suitable relevance weight, or any suitable combination of any suitable confidence weight and any suitable relevance weight (e.g., a confidence weight ("C-weight") may be determined to be a value of 0.9 to indicate a 90% confidence level that a scene dog metadata asset of scene dog metadata asset node 436 is or ought to be associated with moment node 402 (e.g., with one or more MCIs associated with the first moment represented by moment node 402) and a relevance weight ("R-weight") may be determined to be a value of 0.7 to indicate that a scene dog metadata asset of scene dog metadata asset node 436 is a relatively important feature of moment node 402 (e.g., of one or more MCIs associated with the first moment represented by moment node 402), such that a correlation weight ("weight") may be an average value of 0.8 (alternatively, a correlation weight may be based on a difference between a confidence weight and a relevance weight for a particular edge)). With specific regard to scene metadata assets and/or person identity metadata assets associated with any suitable image MCIs, correlation weights and/or confidence weights and/or relevance weights may be detected via any suitable feature detection techniques that may include analyzing such metadata associated with one or more MCIs. For example, system 1 may be configured to determine any suitable weight(s) using metadata associated with one or more MCIs by applying known feature detection techniques. Relevance can be statically defined in a metadata network from external constraints. For example, relevance can be based on information (e.g., contextual information) that may be acquired from any suitable sources, such as social network data, calendar data, and/or the like. Additionally or alternatively, relevance may be based on any suitable internal constraints, where, for example, as more detections of a metadata asset are made, its relevance can be increased. Relevance may also retard as fewer detections are made. For example, as more detections of the second identified person metadata associated with person metadata node 428 (e.g., Jane Doe) are made over a predetermined period of time (e.g., an hour, a day, a week, a year, etc.), that person's relevance may be increased to indicate that person's importance (e.g., to a user of system 1 (e.g., to John Doe)). Confidence can be dynamically generated based on the ingest of any suitable metadata in a metadata network. For instance, a detected person in an MCI may be linked with information (e.g., contextual information) about that person as may be obtained from a contacts application, a calendar application, a social networking application, and/or any other suitable source to determine a level of confidence that the detected person is correctly identified. For a further example, an overall description of a scene in an MCI may be linked with geo-position information that may be acquired from metadata associated with the MCI to determine the level of confidence. Many other examples are possible. In addition, confidence can be based on any suitable internal constraints, where, for example, as more detections of a metadata asset are made, its identification confidence may be increased. Confidence can also retard as fewer detections are made.

Figure 5:
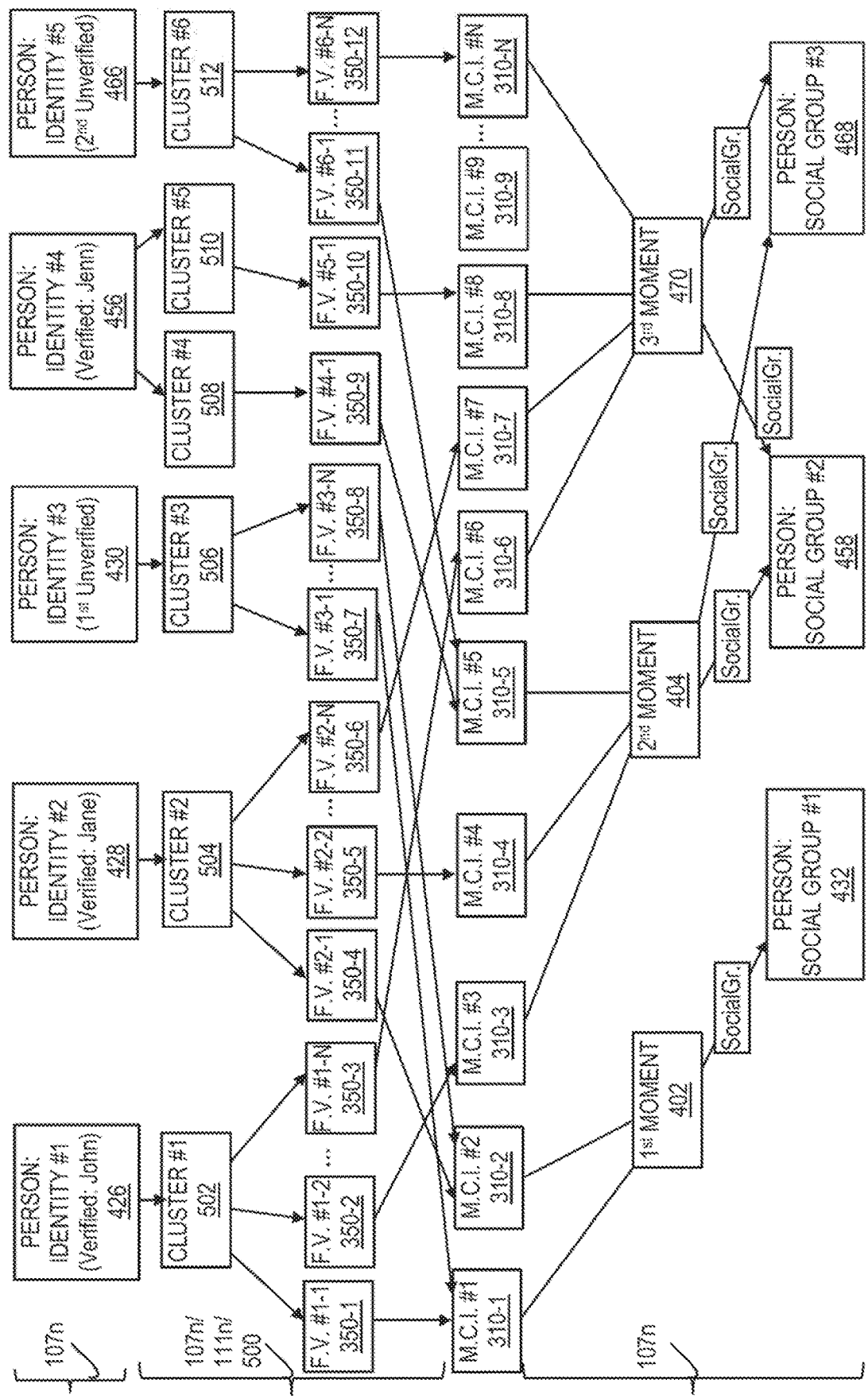
FIG. 5 is an exemplary block diagram of a portion of the metadata network of FIG. 4 in combination with at least a portion of an entity identity network for media content items associated with the metadata network.

FIG. 5 is an exemplary block diagram of a portion of metadata network 107n of FIG. 4 in combination with at least an exemplary portion of an entity identity network 111n as a type of an entity identity management system 111 for MCIs 310 associated with metadata network 107n, where entity identity network 111n may be used in combination with any suitable data of metadata network 107n and/or library 105 to reduce a number of unverified persons detected in media content 310. It is to be understood that, in some embodiments, the data of networks 107n and 111n may be combined into the same network. At least some MCIs 310 of library 105 may be associated with at least one instance of a type of media content indicator metadata 350 (e.g., an entity feature indicator or entity feature vector) that may be indicative of an entity detected in that MCI 310 (e.g., media content indicator metadata 350 that may be determined by a media content analysis module 630 of system 1 of FIG. 6). For example, as shown in FIG. 5, a first MCI 310-1 may be associated with (e.g., determined to include an entity that may be represented by) a first entity feature indicator or entity feature vector ("FV") 350-1 and a seventh FV 350-7, a second MCI 310-2 may be associated with a fourth FV 350-4 and an eighth FV 350-8, a third MCI 310-3 may be associated with a second FV 350-2, a fourth MCI 310-4 may be associated with a fifth FV 350-5, a fifth MCI 310-5 may be associated with a ninth FV 350-9 and an eleventh FV 350-11, a sixth MCI 310-6 may be associated with a third FV 350-3, a seventh MCI 310-7 may be associated with a sixth FV 350-6, an eighth MCI 310-8 may be associated with a tenth FV 350-10, a ninth MCI 310-9 may not be associated with any entity feature indictor, and an $N^{th}$ MCI 310-N may be associated with a twelfth FV 350-12.

Each FV 350 may be any suitable type of indicator or feature vector of any suitable size, such as a feature vector that includes 128 numeric values, each of which may be based on the result of one of 128 different measurements derived in any suitable way from a representation of an entity (e.g., a face or otherwise of a human or any other suitable entity) detected in an MCI 310 (e.g., an image media content item). Any suitable entity detection and processing techniques may be used (e.g., by media content analysis module 630 of system 1) to detect at least one entity within an MCI 310 and then derive an FV for each detected entity as at least a portion of media content indicator metadata 350 for that MCI 310. Moreover, any suitable clustering technique(s) may be used to cluster or otherwise arrange different FVs into two or more clusters in an attempt to recognize different FVs as being representative of the same entity (e.g., multiple FVs similar enough to one another may be grouped in a single cluster of FVs, where the single cluster is aimed to represent a single entity and where all FVs of the single cluster are aimed to be associated with representations of that single entity). For example, as also shown in FIG. 5, a first cluster 502 aimed to represent a first entity may be defined to include at least each one of FV's 350-1, 350-2, and 350-3, a second cluster 504 aimed to represent a second entity may be defined to include at least each one of FVs 350-4, 350-5, and 350-6, a third cluster 506 aimed to represent a third entity may be defined to include at least each one of FVs 350-7 and 350-8, a fourth cluster 508 aimed to represent a fourth entity may be defined to include at least FV 350-9, a fifth cluster 510 aimed to represent a fifth entity may be defined to include at least FV 350-10, and a sixth cluster 512 aimed to represent a sixth entity may be defined to include at least each one of FVs 350-11 and 350-12. As just one example, any suitable clustering technique may use any suitable algorithm(s) (e.g., hierarchical clustering, agglomerative clustering, divisive clustering, and/or the like) to cluster together in a single cluster each FV that is within a clustering threshold distance of a centroid of the cluster, where the centroid of a cluster may change as FVs are added to and/or removed from the cluster. Each cluster may be defined by media content analysis module 630 using the same clustering threshold distance. Alternatively, in some embodiments, certain types of MCIs may be clustered into a cluster using a shorter clustering threshold distance than used by other clusters of other types of MCIs. A distance between any two FVs and/or between an FV and a centroid and/or between any two centroids may be determined using any suitable technique (s), such as a cosine function for determining a cosine similarity.

Figure 6:
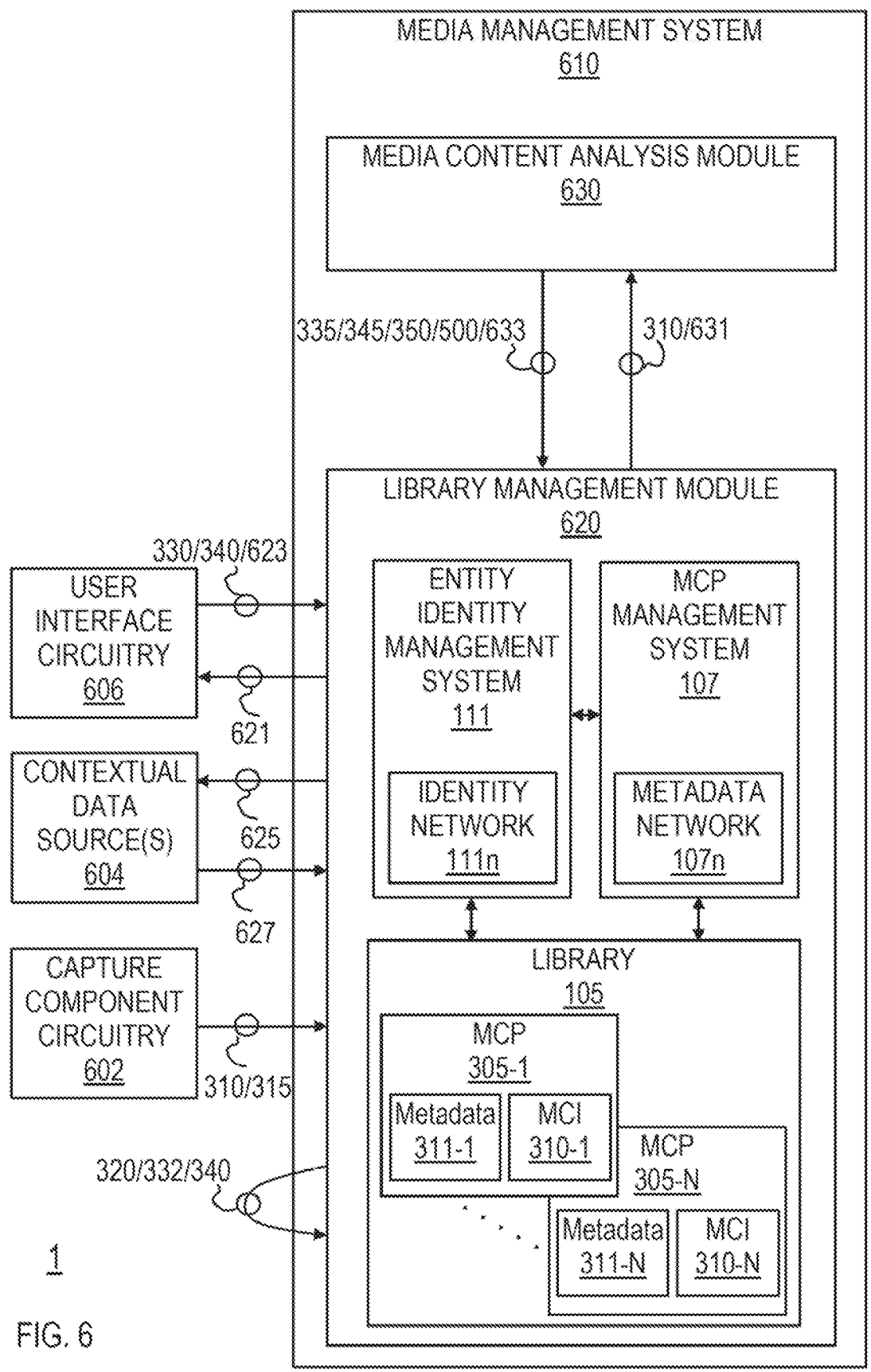
FIG. 6 is a schematic view of an illustrative portion of the system of FIGS. 1-5.

As shown in FIG. 6, media content analysis module 630 may be operative to receive one, some, or each MCI 310 of library 105 (e.g., via a library management module 620), and then media content analysis module 630 may be operative to process the received MCIs to determine any suitable media content analysis metadata 335 (e.g., any suitable media attribute score metadata 345 and/or any suitable media content indicator metadata 350) for the received MCIs, and then media content analysis module 630 may be operative to return such metadata 335, 345, and/or 350 for association (e.g., as metadata 311) with the appropriate MCIs of library 105 (e.g., via library management module 620), where such media content indicator metadata 350 may include any number of FVs (e.g., FVs 350-1 through 350-12 of FIG. 5). Media content analysis module 630 may also be operative to return any suitable cluster data 500 that may be associated with any returned FV media content indicator metadata 350. Such cluster data may include data indicative of each defined cluster, the FVs of each defined cluster, the clustering threshold distance associated with each defined cluster, the centroid of each defined cluster, and/or any other suitable data associated with one or more defined clusters. For example, cluster data 500 may include any suitable first cluster data that may be indicative of first feature vector cluster 502 and its associated FVs 350-1, 350-2, and 350-3 and/or its associated clustering threshold distance and/or its centroid, any suitable second cluster data that may be indicative of second feature vector cluster 504 and its associated FVs 350-4, 350-5, and 350-6 and/or its associated clustering threshold distance and/or its centroid, any suitable third cluster data that may be indicative of third feature vector cluster 506 and its associated FVs 350-7 and 350-8 and/or its associated clustering threshold distance and/or its centroid, any suitable fourth cluster data that may be indicative of fourth feature vector cluster 508 and its associated FV 350-9 and/or its associated clustering threshold distance and/or its centroid, any suitable fifth cluster data that may be indicative of fifth feature vector cluster 510 and its associated FV 350-10 and/or its associated clustering threshold distance and/or its centroid, and/or any suitable sixth cluster data that may be indicative of sixth feature vector cluster 512 and its associated FVs 350-11 and 350-12 and/or its associated clustering threshold distance and/or its centroid.

System 1 (e.g., entity identity management system 111 and/or MCP management system 107) may be operative to use such clustering data 500 to associate, at least initially, each defined cluster with its own person identity metadata asset node that may be defined to represent person identity metadata indicative of a unique identity. The unique identity represented by the person identity metadata asset node that may be initially associated with a new cluster may be a unique "unknown" or "unverified" identity. For example, when a new library 105 of MCPs 305 may be accessed by system 1, cluster data 500 indicative of any suitable number of clusters and media content indicator metadata 350 indicative of any suitable number of FVs of the clusters may be determined based on analysis of the MCIs 310 of those MCPs 305, and each cluster may be initially associated with an unverified person identity metadata asset node (e.g., person identity metadata asset node 430 of network 107n may be defined to represent person identity metadata indicative of a third identity (e.g., the first unknown person) that may be associated with third cluster 506). When a particular person identity (or any other suitable entity identity other than a person) represented by a particular unverified person identity metadata asset node may be verified as a particular identity (e.g., as "John Doe"), such as by using any suitable implicit user metadata 340 and/or any suitable derived domain metadata 332 and/or the like, the unverified person identity metadata asset node may be updated to verified. For example, as shown in FIG. 5, person identity metadata asset node 426 associated with first cluster 502 may be updated to represent person identity metadata indicative of the first verified identity (e.g., John Doe), person identity metadata asset node 428 associated with second cluster 504 may be updated to represent person identity metadata indicative of the second verified identity (e.g., Jane Doe), and person identity metadata asset node 456 associated with fourth cluster 506 (and also fifth cluster 510, as described below in more detail) may be updated to represent person identity metadata indicative of the third verified identity (e.g., Jenn Doe), while person identity metadata asset node 430 associated with third cluster 506 may still represent person identity metadata indicative of a first unverified identity (e.g., the first unknown person) and while person identity metadata asset node 466 associated with sixth cluster 512 may still represent person identity metadata indicative of a second unverified identity (e.g., the second unknown person).

System 1 may be operative to manage one or more networks in order to associate different clusters with different identity nodes, to associate different FVs of different clusters with different MCIs, and to associated different MCIs with additional nodes. For example, as shown in FIG. 6, system 1 may include a media management system 610 that may be provided to manage media of system 1, such as, for example, to (i) generate metadata network 107n, (ii) relate and/or present at least two MCIs 310 based on metadata network 107n, (iii) determine and/or present interesting MCIs 310 of library 105 based on metadata network 107n and predetermined criterion, (iv) select and/or present representative MCIs 310 to summarize a collection (e.g., a moment) of media content items based on input specifying the representative group's size, and/or (v) use metadata network 107n to reduce a number of unverified persons detected in media content 310. Media management system 610 may include library management module 620 and media content analysis module 630. Library management module 620 may be operative to access library 105 of one or more MCPs MCPs 305-1 through 305-N, which may include respective MCIs 310-1 through 310-N and respective associated metadata 311-1 through 311-N), where an MCI 310 of each MCP 305 of library 105 and/or any suitable captured metadata 315 of metadata 311 for an associated MCI 310 may be provided by any suitable capture component circuitry 602 (e.g., camera input component 108h, any suitable memory or remote server operative to provide MCIs to library management module 630, etc.). Library management module 620 may be operative to process library 105 to determine any suitable metadata 311 and/or define any suitable nodes and/or correlations of metadata network 107n of MCP management system 107. For example, library management module 620 may request, with any suitable contextual data request data 625, from any suitable contextual data source(s) 604 (e.g., any suitable social media applications, calendar applications, map applications, etc.), any suitable contextual data 627, which may be used to determine any suitable metadata 311 (e.g., any suitable post capture metadata 320). Additionally or alternatively, library management module 620 may request, with any suitable UI request data 621, and/or passively receive, at any user interface circuitry 606 (e.g., any suitable I/O component circuitry 109, etc.), any suitable UI response data 623, which may be used to determine any suitable metadata 311 (e.g., any suitable user metadata 330, any suitable user metadata 340, etc.). Additionally or alternatively, library management module 620 may be operative to obtain or determine or generate any suitable metadata 311, such as metadata 320, metadata 332, and/or metadata 340 through any suitable processing techniques on any suitable data available to library management module 620. Additionally or alternatively, library management module 620 may request, with any suitable media content analysis request data 631 that may include any suitable MCI data 310, at media content analysis module 630 (e.g., any suitable module operative to analyze MCI data (e.g., pixel image data) to detect any suitable attributes and/or any suitable indicators of any suitable types of features and/or entities), any suitable media content analysis response data 633, which may include any suitable log data 500 and any suitable metadata 335, 345, and/or 350 for association (e.g., as metadata 311) with the appropriate MCIs of library 105. Library management module 620 may be operative to process media content analysis response data 633 to define any suitable portion of identity network 111n to associate defined clusters with entity identity metadata nodes and manage such associations (e.g., based on any suitable implicit user metadata 340 (e.g., for verifying certain entity identities) and/or any suitable knowledge of metadata network 107n (e.g., correlations between certain metadata asset nodes that may be associated with certain clusters), and/or the like.

As mentioned, system 1 (e.g., library management module 620) may be operative to use metadata network 107n to reduce a number of unverified persons detected in media content 310. For example, library management module 620 of system 1 may be configured to reduce the number of entity identity metadata asset nodes that may be defined to represent entity identity metadata indicative of unverified or unknown entities (e.g., unverified entity or person identity metadata asset nodes 430 and/or 466 of metadata network 107n, which may be associated (e.g., by identity network 111n or within metadata network 107n) with respective clusters and respective FVs and respective MCIs). System 1 may be operative to use any suitable cluster data (e.g., cluster data 500) associated with an unverified entity identity in combination with any suitable metadata network data (e.g., any suitable nodes and/or correlations of metadata network 107n) associated with the unverified entity in order to determine the identity of the unverified entity (e.g., to determine with a certain confidence that the unverified entity is the same as a verified entity) or to combine the unverified entity with another unverified entity (e.g., to determine with a certain confidence that the unverified entity is the same as another verified entity).

Figure 7:
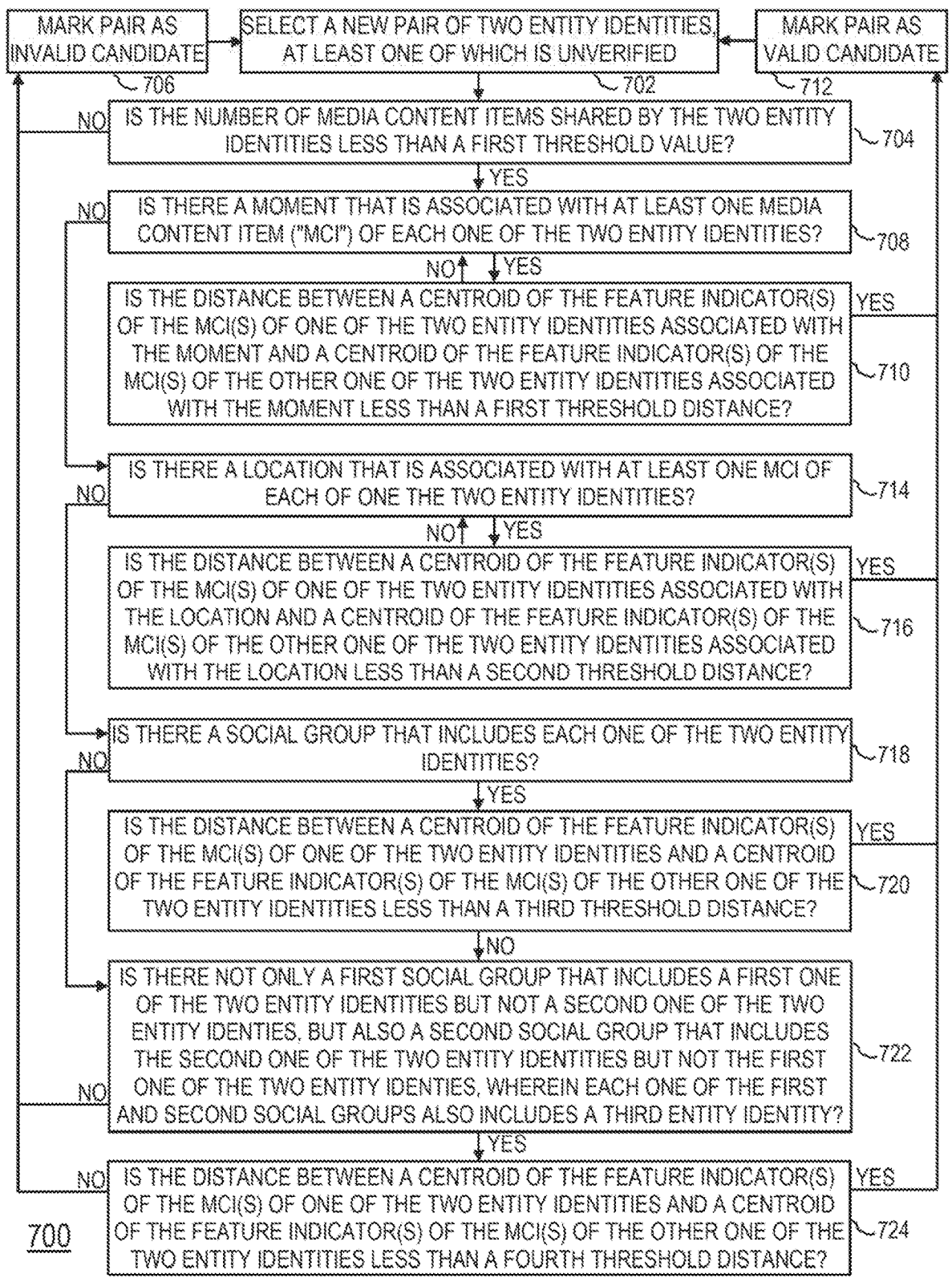

FIG. 7 is a flowchart of an illustrative process 700 for operating system 1 (e.g., a process that may be performed by library management module 620) for reducing the number of unverified entity identities detected in a media library. Process 700 may include selecting an unverified entity identity associated with at least one cluster of one or more FVs of one or more MCPs of a media library (e.g., one of the first unverified entity identity of person identity metadata asset node 430 and the second unverified entity identity of person identity metadata asset node 466 of metadata network 107n) and then comparing that selected unverified entity identity with any other entity identity that may be associated with at least one other cluster of one or more other FVs of one or more MCPs of the media library using any suitable processing techniques in order to determine with a certain confidence that the selected unverified entity identity is the same as the other entity identity. A majority or the entirety of process 700 may be carried out without any user interaction (e.g., transparent to a user of system 1), which, for example, may reduce the cognitive burden on a user and/or avoid any tedious classification of media by a user, thereby creating a more efficient human-machine interface.

At operation 702 of process 700, one or more processors of the system may select a new pair of two entity identities associated with a media library, where at least one of the two identities is an unverified entity identity. For example, with respect to the example of FIGS. 4 and 5, the first unverified entity identity of person identity metadata asset node 430 may be selected in conjunction with the John Doe verified entity identity of person identity metadata asset node 426 as a first pair to be analyzed. Next, at operation 704 of process 700, one or more processors of the system may determine the number of media content items shared by the two selected entity identities (e.g., determine how many media content items of the media library include not only a representation of an entity defined by a feature vector associated with a first entity identity of the selected pair but also a representation of an entity defined by a feature vector associated with a second entity identity of the selected pair), and then may determine whether that determined number is less than a first threshold value. For example, with respect to the example of FIGS. 4 and 5 and the selected pair being the identities of person identity metadata asset node 426 and person identity metadata asset node 430, it may be determined that at least one MCI is shared by the two selected entity identities, in that MCI 310-1 is associated with FV 350-1 of person identity metadata asset node 426 and FV 350-7 of person identity metadata asset node 430, although there may be others not shown. If that determined number is not less than a first threshold value, then process 700 may advance to operation 706. Alternatively if that determined number is less than the first threshold value, then process 700 may advance to operation 708. The threshold value that may be used at operation 704 may be any suitable value operative to prevent any further analysis of the selected pair of entity identities by process 700 when the selected pair of entity identities overlap in more than a certain amount of MCIs that would prevent confidence in the two entity identities being the same entity identity. For example, there are limited reasons as to why a single entity identity should be detected more than once in a single MCI, including, but not limited to, an image capturing an entity and a reflection of that entity (e.g., a reflection from a mirror), an image that is a collage of two or more distinct images that each capture the same entity, and/or the like. Therefore, the threshold value of operation 704 may be defined to withstand a certain frequency of such overlapping instances but reject more than a certain acceptable amount. For example, in some embodiments, the threshold value of operation 704 may be 2. Alternatively, in some embodiments, the threshold value of operation 704 may be any suitable percentage of the total number of FV's associated with one of the selected entity identities (e.g., a percentage of the smallest one of the total number of FVs associated with the first entity identity of the selected pair and the total number of FVs associated with the second entity identity of the selected pair). For example, as shown in the limited example of FIG. 5, 3 FVs (FVs 350-1, 350-2, and 350-3) may be associated with identity metadata asset node 426 and 2 FVs (FVs 350-7 and 350-8) may be associated with identity metadata asset node 430, such that the smallest of those two numbers may be 2. Although it is to be understood that in many situations, these numbers will be far greater (e.g., for larger MCP libraries). As just one specific example, the threshold value of operation 704 may be the largest of the following two values: (i) 2 and (ii) a percentage (e.g., 3%) of the smallest of the following two values: (iia) the total number of FVs associated with the first entity identity of the selected pair and (iib) the total number of FVs associated with the second entity identity of the selected pair. In some other embodiments, operation 704 may not be included in process 700 and process 700 may advance from operation 702 to operation 706.

When operation 702 or operation 704 advances to operation 706 of process 700 for a selected pair of entity identities, one or more processors of the system may mark that pair of entity identities as an invalid candidate (e.g., an invalid candidate pair for potentially merging the entity identities of that pair into a single entity identity) and may then return to operation 702 where a new different pair of two entity identities may be selected (e.g., any pair that has not been marked as an invalid candidate (e.g., at operation 706) and that has not been marked as a valid candidate (e.g., at operation 712) but that includes at least one unverified entity identity). For example, assuming, for sake of explanation, that operation 702 or operation 704 advances to operation 706 when the selected pair of entity identities includes the first unverified entity identity of person identity metadata asset node 430 and the John Doe verified entity identity of person identity metadata asset node 426, system 1 may be operative to store any suitable data indicative of that pair failing to result in a confidence level adequate enough to potentially merge the two entity identities of that pair (e.g., such that the pair will not be evaluated again (e.g., at least until library 105 has been updated with one or more additional MCIs and/or until additional metadata 311 has been defined for library 105)). In such an example, operation 702 of process 700 may be repeated, but in such a second iteration may now select a new pair of entity identities to be analyzed that may still include the first unverified entity identity of person identity metadata asset node 430 but may now include the Jane Doe verified entity identity of person identity metadata asset node 428. Next, at optional operation 704 of process 700, one or more processors of the system may determine the number of media content items shared by those two selected entity identities and then may determine whether that determined number is less than the first threshold value, where it is to be understood that the threshold value for this second iteration of operation 704 may be different than the threshold value for the first iteration of operation 704 when the determination of the threshold value may be defined based on one or more characteristics of one or more of the selected entity identities of the pair (e.g., when the threshold value may be defined based on a percentage of the total number of MCIs associated with one of the entity identities of the currently selected pair).

When the requirement(s) of optional operation 704 have been satisfied for a particular pair of entity identities, or when any pair on entity identities have been selected at operation 702, one or more defined associations between metadata associated with the media library (e.g., as defined by metadata network 107n or otherwise) may be used to determine whether the particular pair of entity identities may be merged together into a single entity identity. For example, operations 708 and 710 may be operative to identify and analyze at least one moment that may be associated with FVs from each entity identity cluster, operations 714 and 716 may be operative to identify and analyze at least one location that may be associated with FVs from each entity identity cluster, operations 718 and 720 may be operative to identify and analyze at least one social group that may be associated with FVs from each entity identity cluster, and operations 722 and 724 may be operative to identify and analyze two social groups that differ (e.g., only differ) based on different ones of the two social groups being associated with FVs of different ones of the entity identity clusters of the pair of entity identities. By leveraging the power of system 1 (e.g., metadata network 107*n*) to correlate certain MCIs together in any suitable manner (e.g., by moment, location, social group, etc.), such correlations may be used to enable loosening of certain threshold distances previously used to cluster entity identities (e.g., a clustering threshold) in order to attempt to reduce the number of entity identities associated with a media library by merging two entity identities.

When operation 702 or optional operation 704 advances to operation 708 of process 700 for a selected pair of entity identities, one or more processors of the system may determine if there is a moment that is associated with at least one MCI that is associated with the first entity identity of the selected pair and with at least one MCI that is associated with the second entity identity of the selected pair and, if so, process 700 may advance to operation 710, otherwise process 700 may advance to operation 714. For example, with respect to the example of FIGS. 4 and 5 and continuing with the currently selected pair being the identity of second person identity metadata asset node 428 and the identity of third person identity metadata asset node 430, it may be determined at operation 708 that the first moment of first moment node 402 is associated not only with at least MCI 310-2 that is associated with second person identity metadata asset node 428 of the selected pair (e.g., via FV 350-4 and cluster 504) but also with at least MCI 310-1 and MCI 310-2 that are associated with third person identity metadata asset node 430 of the selected pair (e.g., via FV 350-7 and cluster 506, and FV 350-8 and cluster 506, respectively), such that process 700 may advance from operation 708 to operation 710.

Figure 5A:
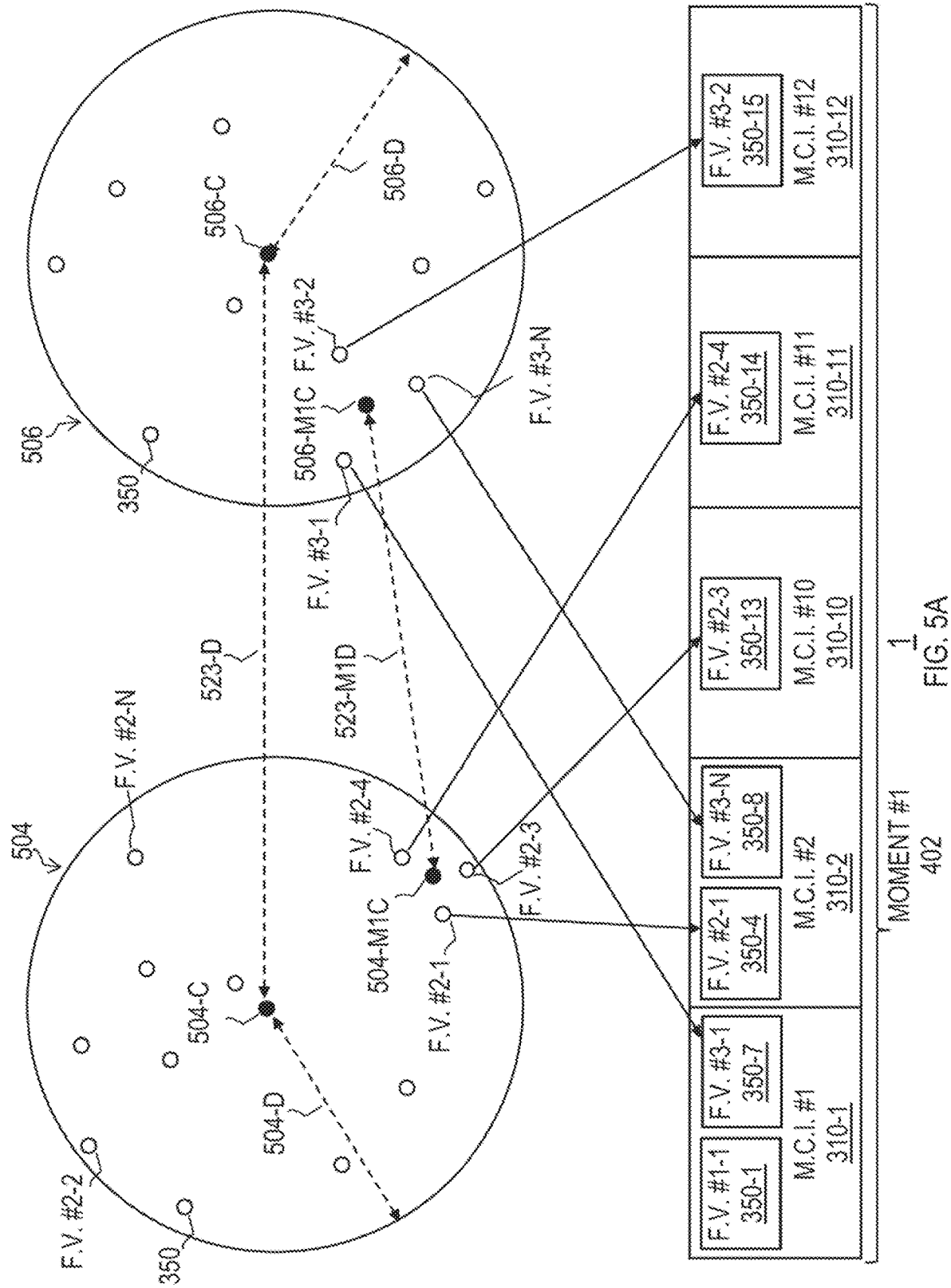
FIG. 5A is an exemplary diagram of cluster data being used with respect to a moment of the metadata network of FIGS. 4 and 5.

When operation 708 advances to operation 710 of process 700 for a selected pair of entity identities, one or more processors of the system may determine if the distance between a centroid of the feature indicator(s) (or feature vector(s)) of the MCI(s) of one of the two entity identities associated with the moment and a centroid of the feature indicator(s) (or feature vector(s)) of the MCI(s) of the other one of the two entity identities associated with the moment is less than a first threshold distance. This may determine how similar the following two groups of FVs are to one another: (i) the subset of all FVs associated with the first entity identity of the selected pair of operation 702 that are also associated with the moment identified at operation 708; and (ii) the subset of all FVs associated with the second entity identity of the selected pair of operation 702 that are also associated with the moment identified at operation 708. For example, with respect to the example of FIGS. 4 and 5 and continuing with the currently selected pair being the identity of second person identity metadata asset node 428 and the identity of third person identity metadata asset node 430, at operation 710, a first centroid may be determined for the FVs that are associated with both second person identity metadata asset node 428 and first moment node 402, a second centroid may be determined for the FVs that are associated with both third person identity metadata asset node 430 and first moment node 402, a distance between those first and second centroids may be determined, and that determined distance may be compared to a first threshold distance. Continuing with this example, FIG. 5A may show an exemplary diagram of at least a portion of cluster data 500 associated with selected identity metadata asset nodes 428 and 430 being used with respect to first moment node 402 in order to make the determination for operation 710. As shown in FIG. 5A, first moment node 402 may be associated with MCIs 310-1, 310-2, 310-10, 310-11, and 310-12 (e.g., as only partially shown by FIG. 5). Moreover, as shown in FIG. 5A, for example, second cluster data of cluster data 500 may be indicative of second feature vector cluster 504 and twelve FVs 350, including FV #2-1 (FV 350-4), FV #2-2 (FV 350-5), FV #2-3 (FV 350-13), FV #2-4 (FV 350-14), and FV #2-N (FV 350-6), as well as a centroid 504-C of cluster 504 based on the twelve total FVs 350 of cluster 504, as well as a clustering threshold distance 504-D used to define cluster 504 (e.g., each FV 350 of cluster 504 may be within clustering threshold distance 504-D of centroid 504-C of cluster 504). Moreover, as shown in FIG. 5A, for example, third cluster data of cluster data 500 may be indicative of third feature vector cluster 506 and ten FVs 350, including FV #3-1 (FV 350-7), FV #3-2 (FV 350-15), and FV #3-N (FV 350-8), as well as a centroid 506-C of cluster 506 based on the ten total FVs 350 of cluster 506, as well as a clustering threshold distance 506-D used to define cluster 506 (e.g., each FV 350 of cluster 506 may be within clustering threshold distance 506-D of centroid 506-C of cluster 506), while a distance 523-D may separate centroid 504-C from centroid 506-C. Moreover, as shown in FIG. 5A, for example, a subset of three of the twelve total FVs 350 of cluster 504 associated with second person identity metadata asset node 428 is also associated with first moment 402 (i.e., FV #2-1 (FV 350-4) of MCI #2 (MCI 310-2) of moment 402, FV #2-3 (FV 350-13) of MCI #10 (MCI 310-10) of moment 402, and FV #2-4 (FV 350-14) of MCI #11 (MCI 310-11) of moment 402) and that subset of FVs may have a centroid 504-M1C, while a subset of three of the ten total FVs 350 of cluster 506 associated with third person identity metadata asset node 430 is also associated with first moment 402 (i.e., FV #3-1 (FV 350-7) of MCI #1 (MCI 310-1) of moment 402, FV #3-2 (FV 350-15) of MCI #12 (MCI 310-12) of moment 402, and FV #3-N (FV 350-8) of MCI #2 (MCI 310-2) of moment 402) and that subset of FVs may have a centroid 506-M1C, while a distance 523-M1D may separate centroid 504-M1C from centroid 506-M1C, and while a distance 523-D may separate centroid 504-C from centroid 506-C. In some embodiments, certain data, such as distance 523-M1D and/or centroid 504-M1C and/or centroid 506-M1C, may not be provided by initial cluster data 500 but, instead, may be specifically requested when needed (e.g., from media content analysis module 630 by library management module 620 when needed (e.g., at an instance of operation 710), such as by generating specific request data 631 (e.g., using any suitable application program interface ("API"))). Distance 523-M1D separating determined centroid 504-M1C of the subset of FVs of cluster 504 associated with moment node 402 and determined centroid 506-M1C of the subset of FVs of cluster 506 associated with moment node 402 may be indicative of how similar the two subsets of FVs are to one another.

Then, also at operation 710, a first threshold distance may be compared to the determined distance 523-M1D separating determined centroid 504-M1C of the subset of FVs of cluster 504 associated with moment node 402 and determined centroid 506-M1C of the subset of FVs of cluster 506 associated with moment node 402. If determined distance 523-M1D is not less than the first threshold distance, then process 700 may advance from operation 710 to operation 708 in order to identify whether there is another moment that meets the requirements of operation 708 (e.g., due to the difference between the subsets of clusters 504 and 506 associated with moment 402 not meeting the confidence threshold associated with operation 710). Alternatively, if determined distance 523-M1D is less than the first threshold distance, then process 700 may advance from operation 710 to operation 712 in order to mark the selected pair of entity identities as a valid candidate (e.g., a valid candidate pair for potentially merging the entity identities of that pair into a single entity identity) (e.g., due to the difference between the subsets of clusters 504 and 506 associated with moment 402 meeting a confidence threshold associated with operation 710). The first threshold distance that may be used at operation 710 may be any suitable threshold distance operative to prevent any further analysis of the currently selected pair of entity identities with respect to the particular moment of interest when the difference between the subsets of FVs of each of the two clusters associated with the two entity identities that are also associated with the particular moment is more than a certain amount that would prevent confidence in the two entity identities being the same entity identity. However, if the difference between the subsets of FVs of each of the two clusters associated with the two entity identities that are also associated with the particular moment is not more than the first threshold distance, then process 700 may be provided with enough confidence in the two entity identities being the same entity identity. The processing that facilitated the determination of the first moment of moment node 402 and its associated MCIs may be utilized to at least partially enable such confidence. Therefore, the threshold distance of operation 710 may be defined to withstand a certain distance between the centroids of the moment's FVs from clusters 504 and 506, where that difference may, in some embodiments, be larger than the clustering threshold distance 504-D used to define cluster 504 and/or larger than the clustering threshold distance 506-D used to define cluster 506. For example, in some embodiments, the threshold distance of operation 710 may be defined to be any suitable percentage of clustering threshold distance 504-D used to define cluster 504 and/or any suitable percentage of clustering threshold distance 506-D used to define cluster 506 and/or any suitable percentage of any combination of such clustering threshold distances (e.g., 200% or 175% or 150% or 125% of the largest clustering threshold distance of the clustering threshold distances used to cluster the clusters of operation 710, 200% or 175% or 150% or 125% of the smallest clustering threshold distance of the clustering threshold distances used to cluster the clusters of operation 710, 200% or 175% or 150% or 125% of the average clustering threshold distance of the clustering threshold distances used to cluster the clusters of operation 710, or the like). As a specific example, the threshold distance of operation 710 may be 200% of the smallest clustering threshold distance used to define either one of the clusters of operation 710. Alternatively, in some embodiments, the threshold distance of operation 710 may be defined to be any suitable percentage of distance 523-D between the centroid of the entirety of cluster 504 and the centroid of the entirety of cluster 506 (e.g., 200% or 175% or 150% or 125% or 100% or 75% or 50% or 25% or the like of distance 523-D).

In some embodiments, the threshold distance of operation 710 may vary based on the total number of FVs associated with one of the selected entity identities (e.g., based on the smallest one of the total number of FVs associated with the first entity identity of the selected pair and the total number of FVs associated with the second entity identity of the selected pair), where, for example, the threshold distance of operation 710 may be reduced if the smallest one of the total number of FVs associated with the first entity identity of the selected pair and the total number of FVs associated with the second entity identity of the selected pair is less than a particular number, such as 10. For example, as shown in the limited example of FIG. 5A, 12 FVs 350 may be provided by cluster 504 and associated with identity metadata asset node 428 and 10 FVs 350 may be provided by cluster 506 associated with identity metadata asset node 430, such that the smallest of those two numbers may be 10, such that a larger threshold distance of operation 710 may be used (e.g., 200% of the smallest clustering threshold distance used to define either one of the clusters of operation 710), yet if that number had been less than 10 then a smaller threshold distance of operation 710 may be used (e.g., 150% of the smallest clustering threshold distance used to define either one of the clusters of operation 710), and yet if both clusters (not just one) of the selected pair includes less than the threshold number then an even smaller threshold distance of operation 710 may be used (e.g., 125% of the smallest clustering threshold distance used to define either one of the clusters of operation 710). The shorter the threshold distance of operation 710, the less benefit of the doubt is given by process 700. Therefore, if at least one of the entity identities of the selected pair is not associated with a significant amount of FVs (e.g., at least 10 FVs), then process 700 may be configured to be less confident in relying on the data available to system 1 with respect to analyzing that entity identity and may therefore use a lower threshold distance at operation 710. However, in some embodiments, an exception to such lowering of the threshold distance of operation 710 may be applicable in order to maintain a higher threshold distance of operation 710 despite one of the entity identities being associated with less than a threshold number of FVs. For example, operation 710 may use a higher threshold distance (e.g., maintain a higher confidence) if at least a certain number of the limited number of FVs for that entity identity occur within a certain amount of time (e.g., within 5 seconds) within the applicable moment of operation 710. For example, even if, for example, only a limited number of FVs 350 (e.g., 7 Vs) may be provided by cluster 506 associated with identity metadata asset node 430 (i.e., a number less than a threshold number for enabling a high confidence threshold distance to be used at operation 710), a high confidence threshold distance may be used at operation 710 if at least a certain percentage of that limited number of FVs (e.g., 50%) are associated with MCIs within a particular duration of time within the moment being analyzed at operation 710 (e.g., if at least a certain percentage of those limited FVs are part of a burst of MCIs captured during the moment (e.g., at least 50% of the limited FVs are within a 5 second span of time within moment #1)). Therefore, as just one specific example, the threshold distance of operation 710 may be 200% of the clustering threshold distance used to cluster a cluster of operation 710 when each cluster of operation 710 includes at least 10 FVs, while the threshold distance of operation 710 may be 150% of the clustering threshold distance used to cluster a cluster of operation 710 when at least one cluster of operation 710 includes less than 10 FVs, while the threshold distance of operation 710 may be 125% of the clustering threshold distance used to cluster a cluster of operation 710 when each cluster of operation 710 includes less than 10 FVs, unless at least 50% of those FVs occur within a span of 5 seconds within the moment of operation 710, in which case the threshold distance of operation 710 may be 200% of the clustering threshold distance used to cluster a cluster of operation 710. When at least a certain percentage of FVs of different clusters occur within a particular limited range of time (e.g., 5 seconds), a similarity between the MCIs containing the FVs may be processed (e.g., a distance identity between the pixels of the different MCIs) and if the similarity between the MCIs are at least a certain threshold, then the higher confidence threshold percentage (e.g., 200%) may be used for operation 710.

When operation 710 advances to operation 712 of process 700 for a selected pair of entity identities, one or more processors of the system may mark that pair of entity identities as a valid candidate (e.g., a valid candidate pair for potentially merging the entity identities of that pair into a single entity identity) and may then return to operation 702 where a new different pair of two entity identities may be selected (e.g., any pair that has not been marked as an invalid candidate (e.g., at operation 706) and that has not been marked as a valid candidate (e.g., at operation 712) but that includes at least one unverified entity identity). For example, assuming, for sake of explanation, that operation 710 advances to operation 712 when the selected pair of entity identities includes the first unverified entity identity of person identity metadata asset node 430 and the Jane Doe verified entity identity of person identity metadata asset node 428, system 1 may be operative to store any suitable data indicative of that pair resulting in a confidence level adequate enough to potentially merge the two entity identities of that pair (e.g., due to the analysis at operation 710). In some embodiments, such an indication of a valid candidate for the pair may be presented in any suitable manner to a user of system 1 (e.g., as any suitable UI request data 621) in order to request that the user confirm that the entity identity associated with one identity of the selected pair is the same as the entity identity associated with the other identity of the selected pair (e.g., by presenting (e.g., with display output component 110*a*) at least one FV of the first entity identity and at least one FV of the second entity identity and requesting verification that each presented FV is a single entity identity). In response to such a request, a user may confirm that the two entity identities of the pair are the same identity by interacting with device 100 in any suitable way (e.g., by generating any suitable UI response data 623 (e.g., by selecting any suitable option on touch screen I/O component 109*a*)). In response to receiving such a confirmation, system 1 may be operative to combine the two entity identities of the pair (e.g., at operation 712). For example, in such embodiments, the first unverified entity identity of person identity metadata asset node 430 and the Jane Doe verified entity identity of person identity metadata asset node 428 may be combined by removing person identity metadata asset node 430 and replacing any correlations between other nodes and that node 430 with correlations to person identity metadata asset node 428 (e.g., by correlating cluster 506 with person identity metadata asset node 428 (e.g., similarly to as shown in FIG. 5 where cluster 508 and cluster 510 may both be associated with person identity metadata asset node 456)). Alternatively, rather than requesting user confirmation of a valid candidate, system 1 may be operative to automatically combine two entity identities at operation 712. In some embodiments, system 1 may be configured to automatically combine entity identities when an analysis results in a significant amount of confidence (e.g., when the distance determined at operation 710 is significantly less than the appropriate first threshold distance of operation 710 (e.g., less by at least a certain percentage of the threshold distance (e.g., by at least 50%))), while system 1 may be configured to request user confirmation before combining entity identities when an analysis results in less than a significant amount of confidence (e.g., when the distance determined at operation 710 is not significantly less than the appropriate first threshold distance of operation 710 (e.g., less by lee than a certain percentage of the threshold distance (e.g., by less than 50%))). Alternatively, in some embodiments, no entity identities may be combined without user confirmation of an identified valid candidate. Therefore, operation 710 may be operative to analyze portions of different clusters that are associated with a particular moment (e.g., as may be defined by metadata network 107*n* or any other suitable data available to system 1) in order to determine if those portions are similar enough to warrant potentially combining the two clusters into a single entity identity. By leveraging the power of any suitable metadata and/or contextual data available to system 1 to correlate certain MCIs together in any suitable manner (e.g., moment, location, social group, etc.), such correlations may be used to enable loosening of certain threshold distances previously used to cluster entity identities (e.g., a clustering threshold) in order to attempt to reduce the number of entity identities associated with a media library.

When operation 710 advances to operation 708 of process 700, it may be determined if there is another moment that satisfies the requirement(s) of operation 708 and, if so, operation 708 may once again advance to operation 710, which may be repeated for that new moment, and, if not, operation 708 may advance to operation 714. Therefore, if a first moment associated with the two entity identities of a selected pair fails to enable sufficient confidence to be realized at operation 710, another moment that may be associated with the same two entity identities of the selected pair may be identified at operation 708 and evaluated at another instance of operation 710. Otherwise, process 700 may advance from operation 708 to operation 714.

When operation 708 advances to operation 714 of process 700 for a selected pair of entity identities, one or more processors of the system may determine if there is a location that is associated with at least one MCI that is associated with the first entity identity of the selected pair and with at least one MCI that is associated with the second entity identity of the selected pair and, if so, process 700 may advance from operation 714 to operation 716, otherwise process 700 may advance from operation 714 to operation 718. For example, with respect to the example of FIGS. 4 and 5 and continuing with the currently selected pair being the identity of second person identity metadata asset node 428 and the identity of third person identity metadata asset node 430 (e.g., assuming the entity identities of that pair did not meet the confidence test of operation 710 for any shared moment), it may be determined at operation 714 that the address location of location address metadata asset node 408 (e.g., as associated with moment node 402 of network 107*n*) is associated not only with at least MCI 310-2 that is associated with second person identity metadata asset node 428 of the selected pair (e.g., via FV 350-4 and cluster 504) but also with at least MCI 310-1 and MCI 310-2 that are associated with third person identity metadata asset node 430 of the selected pair (e.g., via FV 350-7 and cluster 506, and FV 350-8 and cluster 506, respectively), such that process 700 may advance from operation 714 to operation 716.

Figure 5B:
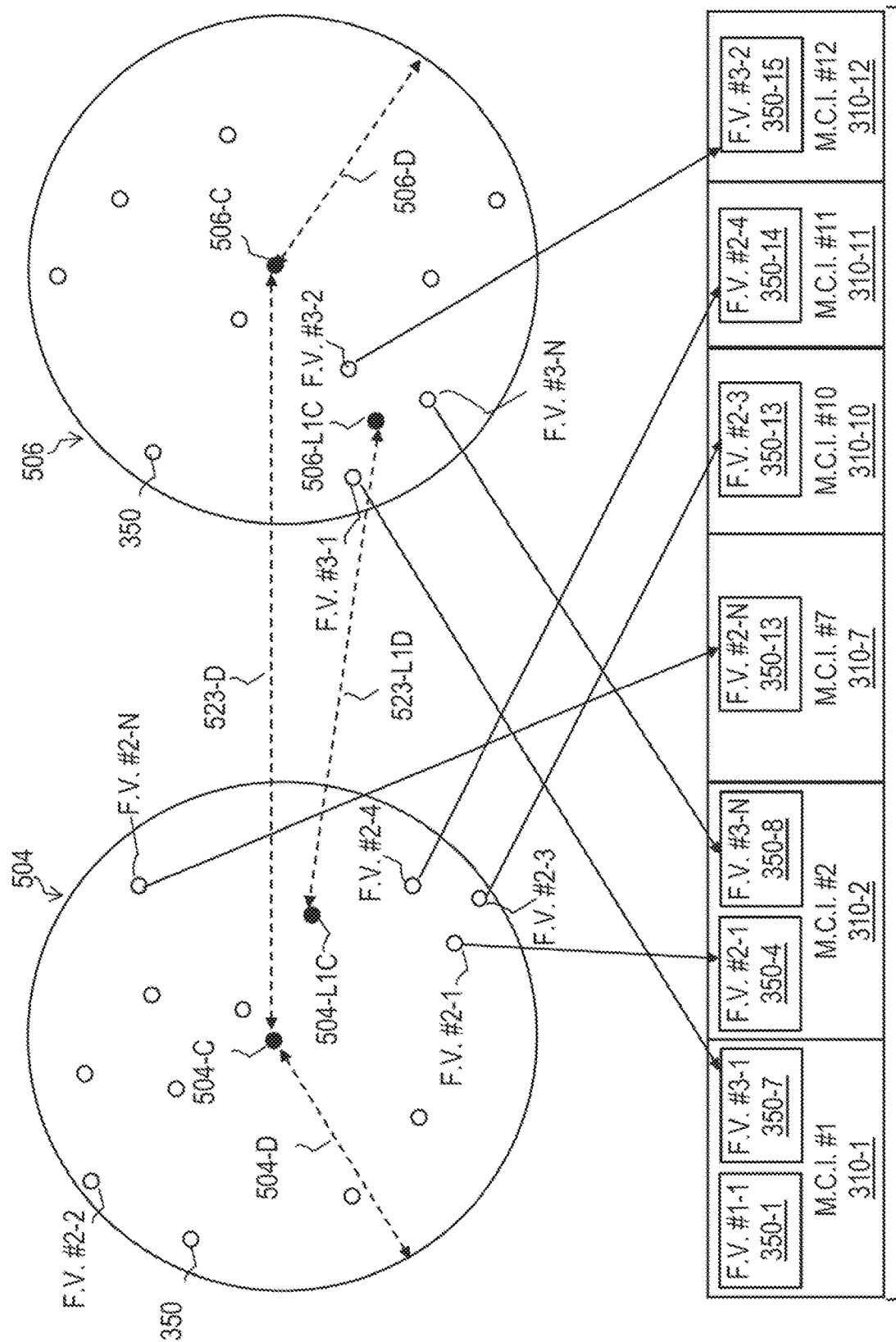
FIG. 5B is an exemplary diagram of cluster data being used with respect to a location of the metadata network of FIGS. 4 and 5.

When operation 714 advances to operation 716 of process 700 for a selected pair of entity identities, one or more processors of the system may determine if the distance between a centroid of the feature indicator(s) (or feature vector(s)) of the MCI(s) of one of the two entity identities associated with the location and a centroid of the feature indicator(s) (or feature vector(s)) of the MCI(s) of the other one of the two entity identities associated with the location is less than a second threshold distance. This may determine how similar the following two groups of FVs are to one another: (i) the subset of all FVs associated with the first entity identity of the selected pair of operation 702 that are also associated with the location identified at operation 714; and (ii) the subset of all FVs associated with the second entity identity of the selected pair of operation 702 that are also associated with the location identified at operation 714. For example, with respect to the example of FIGS. 4 and 5 and continuing with the currently selected pair being the identity of second person identity metadata asset node 428 and the identity of third person identity metadata asset node 430, at operation 716, a first centroid may be determined for the FVs that are associated with both second person identity metadata asset node 428 and first location node 408, a second centroid may be determined for the FVs that are associated with both third person identity metadata asset node 430 and first location node 408, a distance between those first and second centroids may be determined, and that determined distance may be compared to a second threshold distance. Continuing with this example, FIG. 5B may show an exemplary diagram of at least a portion of cluster data 500 associated with selected identity metadata asset nodes 428 and 430 being used with respect to first location node 408 in order to make the determination for operation 716. As shown in FIG. 5B, first location node 408 may be associated with MCIs 310-1, 310-2, 310-7, 310-10, 310-11, and 310-12 (e.g., as only partially shown by FIGS. 4 and 5). Moreover, as shown in FIG. 5B, for example, second cluster data of cluster data 500 may be indicative of second feature vector cluster 504 and twelve FVs 350, including FV #2-1 (FV 350-4), FV #2-2 (FV 350-5), FV #2-3 (FV 350-13), FV #2-4 (FV 350-14), and FV #2-N (FV 350-6), as well as a centroid 504-C of cluster 504 based on the twelve total FVs 350 of cluster 504, as well as a clustering threshold distance 504-D used to define cluster 504 (e.g., each FV 350 of cluster 504 may be within clustering threshold distance 504-D of centroid 504-C of cluster 504). Moreover, as shown in FIG. 5B, for example, third cluster data of cluster data 500 may be indicative of third feature vector cluster 506 and ten FVs 350, including FV #3-1 (FV 350-7), FV #3-2 (FV 350-15), and FV #3-N (FV 350-8), as well as a centroid 506-C of cluster 506 based on the ten total FVs 350 of cluster 506, as well as a clustering threshold distance 506-D used to define cluster 506 (e.g., each FV 350 of cluster 506 may be within clustering threshold distance 506-D of centroid 506-C of cluster 506), while a distance 523-D may separate centroid 504-C from centroid 506-C. Moreover, as shown in FIG. 5B, for example, a subset of four of the twelve total FVs 350 of cluster 504 associated with second person identity metadata asset node 428 is also associated with first location 408 (i.e., FV #2-1 (FV 350-4) of MCI #2 (MCI 310-2) of location 408, FV #2-3 (FV 350-13) of MCI #10 (MCI 310-10) of location 408, and FV #2-4 (FV 350-14) of MCI #11 (MCI 310-11) of location 408, each of which are also of first moment 402 of FIGS. 4-5A, as well as FV #2-N (FV 350-13) of MCI #7 (MCI 310-7) of location 408, which may also be of third moment 470 of FIGS. 4 and 5 (although a correlation between location node 408 and moment 470 may not be shown in FIG. 4 and although a correlation between person identity node 428 and moment 470 may not be shown in FIG. 4)) and that subset of FVs may have a centroid 504-L1C, while a subset of three of the ten total FVs 350 of cluster 506 associated with third person identity metadata asset node 430 is also associated with first location 408 (i.e., FV 43-1 (FV 350-7) of MCI #1 (MCI 310-1) of location 408, FV #3-2 (FV 350-15) of MCI #12 (MCI 310-12) of location 408, and FV #3-N (FV 350-8) of MCI #2 (MCI 310-2) of location 408, each of which are also of first moment 402 of FIGS. 4-5A) and that subset of FVs may have a centroid 506-L1C, while a distance 523-L1D may separate centroid 504-L1C from centroid 506-L1C, and while a distance 523-D may separate centroid 504-C from centroid 506-C. In some embodiments, certain data, such as distance 523-L1D and/or centroid 504-L1C and/or centroid 506-L1C, may not be provided by initial cluster data 500 but, instead, may be specifically requested when needed (e.g., from media content analysis module 630 by library management module 620 when needed (e.g., at an instance of operation 716), such as by generating specific request data 631 (e.g., using any suitable application program interface ("API"))). Distance 523-L1D separating determined centroid 504-L1C of the subset of FVs of cluster 504 associated with location node 408 and determined centroid 506-L1C of the subset of FVs of cluster 506 associated with location node 408 may be indicative of how similar the two subsets of FVs are to one another. As may be realized by comparing FIGS. 5A and 5B, the MCIs associated with first location 408 of FIG. 5B may be the same as the MCIs associated with first moment 402 of FIG. 5A except for the addition of MCI 310-7, which may be due to cluster 504 including FV #2-N (FV 350-13) of MCI #7 (MCI 310-7) that may not be associated with first moment 402 but that may be associated with third moment 470 and/or that may be associated with first location 408 (despite such a correlation not being shown in metadata network 107*n* of FIG. 4). Therefore, although the same subset of FVs of third cluster 506 may be associated with both first location 408 (e.g., as shown in FIG. SB) and first moment 402 (e.g., as shown in FIG. 5A) such that centroid 506-L1C may be the same as centroid 506-M1C, a different (e.g., expanded) subset of FVs of second cluster 504 may be associated with first location 408 (e.g., as shown in FIG. 5B) than may be associated with first moment 402 (e.g., as shown in FIG. 5A) such that centroid 504-L1C may be different than centroid 504-M1C, and such that distance 523-L1D may be different than distance 523-M1D. An expanded set of FVs may often be associated with a particular location as compared to a particular moment due to a moment generally being limited to MCIs associated with both a location (e.g., a specific location or a specific range of related locations) and a period of time, while a location is not limited to MCIs associated with any specific period of time and may therefore be associated with FVs of MCIs captured at a location at any time (e.g., across multiple moments).

Then, also at operation 716, a second threshold distance may be compared to the determined distance 523-L1D separating determined centroid 504-L1C of the subset of FVs of cluster 504 associated with location node 408 and determined centroid 506-L1C of the subset of FVs of cluster 506 associated with location node 408. If determined distance 523-L1D is not less than the second threshold distance, then process 700 may advance from operation 716 to operation 714 in order to identify whether there is another location that meets the requirements of operation 714 (e.g., due to the difference between the subsets of clusters 504 and 506 associated with location 408 not meeting the confidence threshold associated with operation 716). Alternatively, if determined distance 523-L1D is less than the second threshold distance, then process 700 may advance from operation 716 to operation 712 in order to mark the selected pair of entity identities as a valid candidate (e.g., a valid candidate pair for potentially merging the entity identities of that pair into a single entity identity) (e.g., due to the difference between the subsets of clusters 504 and 506 associated with location 408 meeting a confidence threshold associated with operation 716). The second threshold distance that may be used at operation 716 may be any suitable threshold distance operative to prevent any further analysis of the currently selected pair of entity identities with respect to the particular location of interest when the difference between the subsets of FVs of each of the two clusters associated with the two entity identities that are also associated with the particular location is more than a certain amount that would prevent confidence in the two entity identities being the same entity identity. However, if the difference between the subsets of FVs of each of the two clusters associated with the two entity identities that are also associated with the particular location is not more than the second threshold distance, then process 700 may be provided with enough confidence in the two entity identities being the same entity identity. The processing that facilitated the determination of the first location of location node 408 and its associated MCIs may be utilized to at least partially enable such confidence. Therefore, the threshold distance of operation 716 may be defined to withstand a certain distance between the centroids of the location's FVs from clusters 504 and 506, where that difference may, in some embodiments, be larger than the clustering threshold distance 504-D used to define cluster 504 and/or larger than the clustering threshold distance 506-D used to define cluster 506. For example, in some embodiments, the threshold distance of operation 716 may be defined to be any suitable percentage of clustering threshold distance 504-D used to define cluster 504 and/or any suitable percentage of clustering threshold distance 506-D used to define cluster 506 and/or any suitable percentage of any combination of such clustering threshold distances (e.g., 200% or 175% or 150% or 125% of the largest clustering threshold distance of the clustering threshold distances used to cluster the clusters of operation 716, 200% or 175% or 150% or 125% of the smallest clustering threshold distance of the clustering threshold distances used to cluster the clusters of operation 716, 200% or 175% or 150% or 125% of the average clustering threshold distance of the clustering threshold distances used to cluster the clusters of operation 716, or the like). As a specific example, the threshold distance of operation 716 may be 200% of the smallest clustering threshold distance used to define either one of the clusters of operation 716. Alternatively, in some embodiments, the threshold distance of operation 716 may be defined to be any suitable percentage of distance 523-D between the centroid of the entirety of cluster 504 and the centroid of the entirety of cluster 506 (e.g., 200% or 175% or 150% or 125% of distance 523-D).

In some embodiments, the threshold distance of operation 716 may vary based on the total number of FVs associated with one of the selected entity identities (e.g., based on the smallest one of the total number of FVs associated with the first entity identity of the selected pair and the total number of FVs associated with the second entity identity of the selected pair), where, for example, the threshold distance of operation 716 may be reduced if the smallest one of the total number of FVs associated with the first entity identity of the selected pair and the total number of FVs associated with the second entity identity of the selected pair is less than a particular number, such as 10. For example, as shown in the limited example of FIG. 5B, 12 FVs 350 may be provided by cluster 504 and associated with identity metadata asset node 428 and 10 FVs 350 may be provided by cluster 506 associated with identity metadata asset node 430, such that the smallest of those two numbers may be 10, such that a larger threshold distance of operation 716 may be used (e.g., 200% of the smallest clustering threshold distance used to define either one of the clusters of operation 716), yet if that number had been less than 10 then a smaller threshold distance of operation 716 may be used (e.g., 150% of the smallest clustering threshold distance used to define either one of the clusters of operation 716), and yet if both clusters (not just one) of the selected pair includes less than the threshold number then an even smaller threshold distance of operation 716 may be used (e.g., 125% of the smallest clustering threshold distance used to define either one of the clusters of operation 716). The shorter the threshold distance of operation 716, the less benefit of the doubt is given by process 700. Therefore, if one of the entity identities of the selected pair is not associated with a significant amount of FVs (e.g., at least 10 FVs), then process 700 may be configured to be less confident in relying on the data available to system 1 with respect to analyzing that entity identity and may therefore use a lower threshold distance at operation 716. Therefore, as just one specific example, the threshold distance of operation 716 may be 200% of the clustering threshold distance used to cluster a cluster of operation 716 when each cluster of operation 716 includes at least 10 FVs, while the threshold distance of operation 716 may be 150% of the clustering threshold distance used to cluster a cluster of operation 716 when one cluster of operation 716 includes less than 10 FVs, while the threshold distance of operation 716 may be 125% of the clustering threshold distance used to cluster a cluster of operation 716 when each cluster of operation 716 includes less than 10 FVs.

When operation 716 advances to operation 712 of process 700 for a selected pair of entity identities, one or more processors of the system may mark that pair of entity identities as a valid candidate (e.g., a valid candidate pair for potentially merging the entity identities of that pair into a single entity identity) and may then return to operation 702 where a new different pair of two entity identities may be selected (e.g., any pair that has not been marked as an invalid candidate (e.g., at operation 706) and that has not been marked as a valid candidate (e.g., at operation 712) but that includes at least one unverified entity identity). Therefore, operation 716 may be operative to analyze portions of different clusters that are associated with a particular location (e.g., as may be defined by metadata network 107n or any other suitable data available to system 1) in order to determine if those portions are similar enough to warrant potentially combining the two clusters into a single entity identity. By leveraging the power of any suitable metadata and/or contextual data available to system 1 to correlate certain MCIs together in any suitable manner (e.g., moment, location, social group, etc.), such correlations may be used to enable loosening of certain threshold distances previously used to cluster entity identities (e.g., a clustering threshold) in order to attempt to reduce the number of entity identities associated with a media library.

When operation 716 advances to operation 714 of process 700, it may be determined if there is another location that satisfies the requirement(s) of operation 714 and, if so, operation 714 may once again advance to operation 716, which may be repeated for that new location, and, if not, operation 714 may advance to operation 718. Therefore, if a first location associated with the two entity identities of a selected pair fails to enable sufficient confidence to be realized at operation 716, another location that may be associated with the same two entity identities of the selected pair may be identified at operation 714 and evaluated at another instance of operation 716. Otherwise, process 700 may advance from operation 714 to operation 718. In some embodiments, any location that may be identified at operation 714 may be limited to any location that has been identified as a certain type of location, such as an important type of location. For example, a location identified by operation 714 may also have to be a residence or office or vacation location of one of the entity identities of the current selected pair (e.g., location 408 may be identified as the residence of the Jane Doe identity of identity node 428 of cluster 504 (e.g., as may be defined by location home node 434 and its associated correlations of metadata network 107n of FIG. 4). Additionally or alternatively, a location identified by operation 714 may also have to be associated with a particular number of MCIs that are associated with FVs of at least one of the entity identities of the selected pair being analyzed. In some embodiments, a location identified by operation 714 may be any kind of location that may be identified based on repartition of MCIs and/or moments being above a certain threshold for a particular location (e.g., a particular latitude/longitude).

When operation 714 advances to operation 718 of process 700 for a selected pair of entity identities, one or more processors of the system may determine if there is a social group that is associated with the first entity identity of the selected pair (e.g., with at least one MCI that is associated with the first entity identity) and with the second entity identity of the selected pair (e.g., with at least one MCI that is associated with the second entity identity) and, if so, process 700 may advance from operation 718 to operation 720, otherwise process 700 may advance from operation 718 to operation 722. For example, with respect to the example of FIGS. 4 and 5 and continuing with the currently selected pair being the identity of second person identity metadata asset node 428 and the identity of third person identity metadata asset node 430 (e.g., assuming the entity identities of that pair did not meet the confidence test of operation 710 for any shared moment and assuming the entity identities of that pair did not meet the confidence test of operation 716 for any shared location), it may be determined at operation 718 that the social group of social group metadata asset node 432 (e.g., as associated with moment node 402 of network 107n) is associated not only with second person identity metadata asset node 428 of the selected pair but also with third person identity metadata asset node 430 of the selected pair, such that process 700 may advance from operation 718 to operation 720. In some embodiments, however, it may be understood that a social group may not be associated with two or more entity identities unless those two or more entity identities are determined to be associated (e.g., present) in more than one moment, or that operation 718 may be configured to only identify a social group that is associated with each of the entity identities of the selected pair if that social group is determined to be associated with more than one moment (e.g., correlated to more than one moment in metadata network 107n). In some embodiments, operation 718 may be operative to only utilize a social group that is associated with at least a certain number of moments (e.g., at least 2 moments, or at least three moments, etc.).

When operation 718 advances to operation 720 of process 700 for a selected pair of entity identities, one or more processors of the system may determine if the distance between a centroid of all of the feature indicator(s) (or feature vector(s)) of the MCI(s) of one of the two entity identities associated with (e.g., belonging to) the social group and a centroid of all of the feature indicator(s) (or feature vector(s)) of the MCI(s) of the other one of the two entity identities associated with (e.g., belonging to) the social group is less than a third threshold distance. This may determine how similar the following two groups of FVs are to one another: (i) all FVs associated with the first entity identity of the selected pair of operation 702 that is also associated with the social group identified at operation 718; and (ii) all FVs associated with the second entity identity of the selected pair of operation 702 that is also associated with the social group identified at operation 718. For example, with respect to the example of FIGS. 4 and 5 and continuing with the currently selected pair being the identity of second person identity metadata asset node 428 and the identity of third person identity metadata asset node 430, at operation 720, a first centroid may be determined for all the FVs that are associated with second person identity metadata asset node 428 (e.g., centroid 504-C of cluster 504 of FIG. 5A), a second centroid may be determined for all the FVs that are associated with third person identity metadata asset node 430 (e.g., centroid 506-C of cluster 506 of FIG. 5A), a distance between those first and second centroids may be determined (e.g., distance 523-D of FIG. 5A), and that determined distance may be compared to a third threshold distance. In some embodiments, certain data, such as distance 523-D, may not be provided by initial cluster data 500 but, instead, may be specifically requested when needed (e.g., from media content analysis module 630 by library management module 620 when needed (e.g., at an instance of operation 720), such as by generating specific request data 631 (e.g., using any suitable application program interface ("API"))). Distance 523-D separating determined centroid 504-C of the FVs of cluster 504 associated with social group node 432 and determined centroid 506-C of the FVs of cluster 506 associated with social group 432 may be indicative of how similar the two clusters of FVs are to one another. An entire cluster of FVs (e.g., rather than a subset) may be associated with an entity identity that may be associated with (e.g., determined to belong) a social group, as a social group may be defined based on the belonging an entity identity in its entirety, unlike a moment or location that may only be associated with the subset of FVs of an entity identity that is associated with that particular moment or location.

Then, also at operation 720, a third threshold distance may be compared to the determined distance 523-D separating determined centroid 504-C of the FVs of cluster 504 associated with social group node 432 and determined centroid 506-C of the FVs of cluster 506 associated with social group node 432. If determined distance 523-D is not less than the third threshold distance, then process 700 may advance from operation 720 to operation 722. Alternatively, if determined distance 523-D is less than the third threshold distance, then process 700 may advance from operation 720 to operation 712 in order to mark the selected pair of entity identities as a valid candidate (e.g., a valid candidate pair for potentially merging the entity identities of that pair into a single entity identity) (e.g., due to the difference between the clusters 504 and 506 associated with social group 432 meeting a confidence threshold associated with operation 720). The third threshold distance that may be used at operation 720 may be any suitable threshold distance operative to prevent any further analysis of the currently selected pair of entity identities with respect to the particular social group of interest when the difference between the FVs of the two clusters associated with the two entity identities that are also associated with the particular social group is more than a certain amount that would prevent confidence in the two entity identities being the same entity identity. However, if the difference between the FVs of the two clusters associated with the two entity identities that are also associated with the particular social group is not more than the third threshold distance, then process 700 may be provided with enough confidence in the two entity identities being the same entity identity. The processing that facilitated the determination of the first social group node 432 and its association with identity nodes 428 and 430 may be utilized to at least partially enable such confidence. Therefore, the threshold distance of operation 720 may be defined to withstand a certain distance between the centroids of the FVs from clusters 504 and 506, where that difference may, in some embodiments, be larger than the clustering threshold distance 504-D used to define cluster 504 and/or larger than the clustering threshold distance 506-D used to define cluster 506. For example, in some embodiments, the threshold distance of operation 720 may be defined to be any suitable percentage of clustering threshold distance 504-D used to define cluster 504 and/or any suitable percentage of clustering threshold distance 506-D used to define cluster 506 and/or any suitable percentage of any combination of such clustering threshold distances (e.g., 200% or 175% or 150% or 125% of the largest clustering threshold distance of the clustering threshold distances used to cluster the clusters of operation 720, 200% or 175% or 150% or 125% of the smallest clustering threshold distance of the clustering threshold distances used to cluster the clusters of operation 720, 200% or 175% or 150% or 125% of the average clustering threshold distance of the clustering threshold distances used to cluster the clusters of operation 720, or the like). As a specific example, the threshold distance of operation 720 may be 150% of the smallest clustering threshold distance used to define either one of the clusters of operation 720. In some embodiments, as described with respect to the threshold of operation 710 and/or the threshold of operation 716, the threshold distance of operation 720 may vary based on the total number of FVs associated with one of the selected entity identities. Therefore, as just one specific example, the threshold distance of operation 720 may be 150% of the clustering threshold distance used to cluster a cluster of operation 720 when each cluster of operation 720 includes at least 10 FVs, while the threshold distance of operation 720 may be 125% of the clustering threshold distance used to cluster a cluster of operation 720 when one cluster of operation 720 includes less than 10 FVs.

When operation 720 advances to operation 712 of process 700 for a selected pair of entity identities, one or more processors of the system may mark that pair of entity identities as a valid candidate (e.g., a valid candidate pair for potentially merging the entity identities of that pair into a single entity identity) and may then return to operation 702 where a new different pair of two entity identities may be selected (e.g., any pair that has not been marked as an invalid candidate (e.g., at operation 706) and that has not been marked as a valid candidate (e.g., at operation 712) but that includes at least one unverified entity identity). Therefore, operation 720 may be operative to analyze different clusters that are associated with a particular social group (e.g., as may be defined by metadata network 107n or any other suitable data available to system 1) in order to determine if those clusters are similar enough to warrant potentially combining the two clusters into a single entity identity. By leveraging the power of any suitable metadata and/or contextual data available to system 1 to correlate certain MCIs together in any suitable manner (e.g., moment, location, social group, etc.), such correlations may be used to enable loosening of certain threshold distances previously used to cluster entity identities (e.g., a clustering threshold) in order to attempt to reduce the number of entity identities associated with a media library.

When operation 720 advances to operation 722 of process 700 for a selected pair of entity identities, one or more processors of the system may determine if (i) there is a first social group that is associated with the first entity identity of the selected pair (e.g., with at least one MCI that is associated with the first entity identity) but that is not associated with the second entity identity of the selected pair and if (ii) there is also a second social group that is associated with the second entity identity of the selected pair (e.g., with at least one MCI that is associated with the second entity identity) but that is not associated with the first entity identity of the selected pair and if (iii) each one of the first and second social groups shares at least a third entity identity as a common member (e.g., where each one of the first and second social groups is associated with at least one MCI that is also associated with a third entity identity), and, if so, process 700 may advance from operation 722 to operation 724, otherwise process 700 may advance from operation 722 to operation 706. For example, with respect to the example of FIG. 4, when the currently selected pair of entity identities for operation 722 are Jane Doe second person identity metadata asset node 428 and second unverified person identity metadata asset node 466, social group node 458 may be identified as a first social group of operation 722 and social group node 468 may be identified as a second social group of operation 722, because social group node 458 may be associated with a first entity identity node of the selected pair (identity node 428) but not with a second entity identity node of the selected pair (identity node 466) and because social group node 468 may be associated with a second entity identity node of the selected pair (identity node 466) but not with a first entity identity node of the selected pair (identity node 428) and because each one of social group nodes 458 and 468 is associated with a shared third entity identity node 456 (e.g., entity identity node 456 is not an entity identity of the currently selected pair but is associated with each one of the first and second social groups 458 and 468 identified by operation 722).

In some embodiments, however, the requirements of operation 722 may also require that the first and second social groups be associated with distinct periods of time (e.g., not associated with any of the same moments and/or not associated with any same time). For example, if such a requirement may be applied to operation 722, when the currently selected pair of entity identities for operation 722 are Jane Doe second person identity metadata asset node 428 and second unverified person identity metadata asset node 466, social group node 458 and social group node 468 may not be identified as adequate social groups of operation 722 because those social groups are both associated with the same moment 404. However, if such a requirement may be applied to operation 722, when the currently selected pair of entity identities for operation 722 are first unverified person identity metadata asset node 430 and Jenn Doe fourth person identity metadata asset node 456, social group node 432 may be identified as a first social group of operation 722 and social group node 458 may be identified as a second social group of operation 722, because social group node 432 may be associated with a first entity identity node of the selected pair (identity node 430) but not with a second entity identity node of the selected pair (identity node 456) and because social group node 458 may be associated with a second entity identity node of the selected pair (identity node 456) but not with a first entity identity node of the selected pair (identity node 430) and because each one of social group nodes 432 and 458 is associated with at least one shared entity identity node (e.g., each one of entity identity nodes 426 and 428 is not an entity identity of the currently selected pair but is associated with each one of the first and second social groups 432 and 458 identified by operation 722) and because social groups 432 and 458 do not overlap in time (e.g., groups 432 and 458 may be associated with different moments 402 and 404, respectively, which do not overlap in time). Just one particular example of when such a situation may be of particular interest for analyzing whether the selected pair of identities may be combined as a single identity may be when the first and second social groups may have two adult person identities in common (e.g., John Doe identity node 426 and Jane Doe identity node 428) and when at least one of the identities of the selected pair may be an unverified child, as such a situation may be indicative of the first social group and the second social group being the same social group, such as a family social group with a father, a mother, and a child, where the child identity is represented by the FVs of each one of the first and second identities of the selected pair under analysis. Especially when the two social groups identified at operation 722 do not time overlap, such a situation may arise when the FVs of the first identity of the selected pair are representative of MCIs of a child at a first stage of childhood development and when the FVs of the second identity of the selected pair are representative of MCIs of that same child but at a second stage of childhood development.

When operation 722 advances to operation 724 of process 700 for a selected pair of entity identities (e.g., selected at operation 702) and a selected pair of first and second social groups (e.g., selected at operation 722), one or more processors of the system may determine if the distance between a centroid of all of the feature indicator(s) (or feature vector(s)) of the MCI(s) of a first of the two entity identities associated with (e.g., belonging to) the first social group and a centroid of all of the feature indicator(s) (or feature vector(s)) of the MCI(s) of the other one of the two entity identities associated with (e.g., belonging to) the second social group is less than a fourth threshold distance. This may determine how similar the following two groups of FVs are to one another: (i) all FVs associated with the first entity identity of the selected pair of operation 702 that is also associated with the first social group identified at operation 722; and (ii) all FVs associated with the second entity identity of the selected pair of operation 702 that is also associated with the second social group identified at operation 722. As described with respect to operation 720, such a distance between centroids of entire clusters may be determined from any suitable cluster data 500 associated with the clusters that are associated with the entity identities of the selected pair. In the particular example where third person identity metadata asset node 430 and fourth person identity metadata asset node 456 may be the two entity identities of the currently selected pair of identities under analysis at operation 724, the centroid distance determined at operation 724 may be the distance between the centroid of all of the FVs of cluster 506, which is the only cluster currently associated with identity node 430 as shown in FIG. 5, and the centroid of all of the FVs of clusters 508 and 510, which are the two clusters currently associated with identity node 456 as shown in FIG. 5. In some embodiments, certain data, such as a centroid of all the FVs of two or more combined clusters (e.g., the centroid of all the FVs of each one of clusters 508 and 510) or the distance between such a centroid and the centroid of another cluster, may not be provided by initial cluster data 500 but, instead, may be specifically requested when needed (e.g., from media content analysis module 630 by library management module 620 when needed (e.g., at an instance of operation 720), such as by generating specific request data 631 (e.g., using any suitable application program interface ("API"))). Such a centroid distance between the centroid of all FVs of cluster 506 and the centroid of all FVs of clusters 508 and 510 may be indicative of how similar cluster 506 may be to a combination of clusters 508 and 510.

Then, also at operation 724, a fourth threshold distance may be compared to the determined centroid distance separating the centroid of all FVs of cluster 506 and the centroid of all FVs of a combination of cluster 508 and 510. If determined centroid distance is not less than the fourth threshold distance, then process 700 may advance from operation 724 to operation 706 in order to mark the currently selected pair of entity identities as an invalid candidate. Alternatively, if the determined centroid distance is less than the fourth threshold distance, then process 700 may advance from operation 724 to operation 712 in order to mark the selected pair of entity identities as a valid candidate (e.g., a valid candidate pair for potentially merging the entity identities of that pair into a single entity identity) (e.g., due to the difference between cluster 506 and the combination of clusters 508 and 510 meeting a confidence threshold associated with operation 724). The fourth threshold distance that may be used at operation 724 may be any suitable threshold distance operative to prevent any further analysis of the currently selected pair of entity identities with respect to the particular social groups of interest when the difference between the analyzed clusters is more than a certain amount that would prevent confidence in the two entity identities being the same entity identity. However, if the difference between the FVs of the analyzed clusters is not more than the fourth threshold distance, then process 700 may be provided with enough confidence in the two entity identities being the same entity identity. The processing that facilitated the determination of the first social group node 432 and its association with identity node 430 and identity node 426 but not with identity node 456 and that facilitated the determination of the second social group node 458 and its association with identity node 456 and identity node 426 but not with identity node 430 (and, potentially that facilitated the determination that first social group node 432 and second social group node 458 do not time overlap (if operation 722 is configured to have such an additional requirement)) may be utilized to at least partially enable such confidence. Therefore, the threshold distance of operation 724 may be defined to withstand a certain distance between the centroids of the analyzed clusters, where that difference may, in some embodiments, be larger than the smallest or largest clustering threshold distance used to define any of the clusters. For example, in some embodiments, the threshold distance of operation 724 may be defined to be any suitable percentage of any suitable clustering threshold used to define one of the clusters of the analysis (e.g., 200% or 175% or 150% or 125% of the largest clustering threshold distance of the clustering threshold distances used to cluster the clusters of operation 724, 200% or 175% or 150% or 125% of the smallest clustering threshold distance of the clustering threshold distances used to cluster the clusters of operation 724, 200% or 175% or 150% or 125% of the average clustering threshold distance of the clustering threshold distances used to cluster the clusters of operation 724, or the like). As a specific example, the threshold distance of operation 724 may be 175% of the smallest clustering threshold distance used to define any one of the clusters of operation 724. In some embodiments, as described with respect to the threshold of operation 710 and/or the threshold of operation 716, and/or the threshold distance of operation 720, the threshold distance of operation 724 may vary based on the total number of FVs associated with one of the selected entity identities. Therefore, as just one specific example, the threshold distance of operation 724 may be 175% of a clustering threshold distance used to cluster a cluster of operation 724 when each cluster of operation 724 includes at least 10 FVs, while the threshold distance of operation 724 may be 150% or 125% of a clustering threshold distance used to cluster a cluster of operation 724 when one cluster of operation 724 includes less than 10 FVs.

When operation 724 advances to operation 712 of process 700 for a selected pair of entity identities, one or more processors of the system may mark that pair of entity identities as a valid candidate (e.g., a valid candidate pair for potentially merging the entity identities of that pair into a single entity identity) and may then return to operation 702 where a new different pair of two entity identities may be selected (e.g., any pair that has not been marked as an invalid candidate (e.g., at operation 706) and that has not been marked as a valid candidate (e.g., at operation 712) but that includes at least one unverified entity identity). Therefore, operation 724 may be operative to analyze different clusters that are associated with different particular social groups (e.g., as may be defined by metadata network 107*n* or any other suitable data available to system 1) in order to determine if those clusters are similar enough to warrant potentially combining the two (or more) clusters into a single entity identity. By leveraging the power of any suitable metadata and/or contextual data available to system 1 to correlate certain MCIs together in any suitable manner (e.g., moment, location, social group, etc.), such correlations may be used to enable loosening of certain threshold distances previously used to cluster entity identities (e.g., a clustering threshold) in order to attempt to reduce the number of entity identities associated with a media library. In some embodiments, the various threshold distances of operations 710, 716, 720, and 724 (e.g., the first, second, third, and fourth threshold distances, respectively) may be defined differently based on the different metadata network correlation types that may be used by those operations. For example, first threshold distance of moment-based operation 710 may generally be configured to be a relatively large (e.g., high confidence) threshold due to a moment being constrained to a specific time and location, while second threshold distance of location-based operation 714 may generally be configured to be a relatively large (e.g., high confidence) or a relatively medium (e.g., medium confidence) threshold due to a location being constrained to a specific location, while third threshold distance of single social group-based operation 720 may generally be configured to be a relatively small (e.g., small confidence) threshold due to a single social group potentially including family members who may look similar to one another, and/or while fourth threshold distance of double social group-based operation 724 may generally be configured to be a relatively medium (e.g., medium confidence) threshold due to different social groups being less likely to be different groups family members.

Process 700 may be configured to start each time a particular application (e.g., a photos application or any other suitable media library application) is launched. Additionally or alternatively, process may be configured to start each time a particular application is running and one or more new MCPs are received. For instance, in some embodiments, the application may execute on a mobile device that has a camera that captures pictures and videos (e.g., device 100) and, in such embodiments, process 700 may start each time the device captures one or more new photos or videos. These or other embodiments can also start the process whenever a new set of MCPs become available on a remote storage (e.g., server 50). In other embodiments, process 700 may be performed periodically (e.g., every hour, 6 hours, 12 hours, 24 hours, etc.) and/or based on user request. Process 700 may be configured to end when a particular application is closed and/or when no new pair of appropriate entity identities may be identified and selected at operation 702.

It is understood that the operations shown in process 700 of FIG. 7 are only illustrative and that existing operations may be modified or omitted, additional operations may be added, and the order of certain operations may be altered. For example, in some embodiments, operation 704 may be omitted or may only be provided before certain operation(s) (e.g., after operation 710 but before operation 716, or after operation 716 but before operation 720, or after operation 720 but before operation 724, etc.). As another example, in some embodiments, operations 714 and 716 may be performed before operations 708 and 710, and/or operations 718 and 720 may be performed before operations 708 and 710 and/or before operations 714 and 716, and/or operations 722 and 724 may be performed before operations 708 and 710 and/or before operations 714 and 716 and/or before operations 718 and 720. While process 700 may be described with respect to a selected pair of entity identities of which only one is unverified, it is to be understood that two unverified entity identities (e.g., the first unverified identity associated with identity node 430 and the second unverified identity associated with identity node 466) may be the two entity identities of the pair selected at operation 702 for analysis by process 700 (e.g., to merge the two unverified entity identities into a single unverified entity identity). In some embodiments, system 1 may be configured to generate a dedicated metadata network for only a portion of the library and/or for only a certain type or a subset of certain types of metadata (e.g., only moments and/or only time and/or only social groups) based on the requirements of a particular portion of process 700.

FIG. 8 is a flowchart of an illustrative process 800 for combining feature vector clusters on an electronic device. At operation 802 of process 800, the electronic device may obtain cluster data that includes first cluster data indicative of a first feature vector cluster including a plurality of first feature vectors determined to be similar to one another, and second cluster data indicative of a second feature vector cluster including a plurality of second feature vectors determined to be similar to one another, wherein each feature vector of each one of the plurality of first feature vectors and the plurality of second feature vectors is representative of a face of a digital asset of a plurality of digital assets. At operation 804 of process 800, the electronic device may identify a first collection of digital assets of the plurality of digital assets, wherein the first collection of digital assets includes each digital asset of the plurality of digital assets that is associated with at least one of geographical metadata indicative of a geographic location within a first geographic range and temporal metadata indicative of a time within a first time range. At operation 806 of process 800, the electronic device may analyze the first collection of digital assets, wherein the analysis includes (i) determining that each one of a number of first feature vectors of the plurality of first feature vectors is representative of a face of a digital asset of the first collection of digital assets, (ii) determining that each one of a number of second feature vectors of the plurality of second feature vectors is representative of a face of a digital asset of the first collection of digital assets, and (iii) determining that a distance between a centroid of the number of first feature vectors of the plurality of first feature vectors and a centroid of the number of second feature vectors of the plurality of second feature vectors is not greater than a confidence threshold distance. At operation 808 of process 800, the electronic device may group the plurality of first feature vectors and the plurality of second feature vectors in a bundle of feature vectors based on the analysis (e.g., two entity identities may be merged based on location- or moment-based analysis of the two entity identities).

It is understood that the operations shown in process 800 of FIG. 8 are only illustrative and that existing operations may be modified or omitted, additional operations may be added, and the order of certain operations may be altered.

FIG. 9 is a flowchart of an illustrative process 900 for combining feature vector clusters on an electronic device. At operation 902 of process 900, the electronic device may obtain cluster data that includes first cluster data indicative of a first feature vector cluster including a plurality of first feature vectors determined to be similar to one another and second cluster data indicative of a second feature vector cluster including a plurality of second feature vectors determined to be similar to one another, wherein each feature vector of each one of the plurality of first feature vectors and the plurality of second feature vectors is representative of a face of a digital asset of a plurality of digital assets. At operation 904 of process 900, the electronic device may obtain a metadata network associated with the plurality of digital assets, wherein the metadata network includes a plurality of metadata assets, each metadata asset of the plurality of metadata assets describes a characteristic associated with at least one digital asset of the plurality of digital assets, and two metadata assets of the plurality of metadata assets are correlated when a correlation between the two metadata assets includes a correlation weight greater than a correlation weight threshold. At operation 906 of process 900, the electronic device may analyze the obtained metadata network, wherein the analysis includes (i) determining that a first metadata asset of the plurality of metadata assets describes a first moment associated with each digital asset of a first subset of digital assets of the plurality of digital assets, wherein the first moment describes a first time range, (ii) determining that a second metadata asset of the plurality of metadata assets describes a second moment associated with each digital asset of a second subset of digital assets of the plurality of digital assets, wherein the second moment describes a second time range distinct from the first time range, and (iii) determining that a third metadata asset of the plurality of metadata assets is correlated with each one of the first metadata asset and the second metadata asset, wherein the third metadata asset describes a social group including a first person associated with the first feature vector cluster and a second person associated with the second feature vector cluster. At operation 908 of process 900, the electronic device may group the plurality of first feature vectors and the plurality of second feature vectors in a bundle of feature vectors based on the analysis (e.g., two entity identities may be merged based on a single social group-based analysis of the two entity identities).

It is understood that the operations shown in process 900 of FIG. 9 are only illustrative and that existing operations may be modified or omitted, additional operations may be added, and the order of certain operations may be altered.

FIG. 10 is a flowchart of an illustrative process 1000 for combining feature vector clusters on an electronic device. At operation 1002 of process 1000, the electronic device may obtain cluster data that includes first cluster data indicative of a first feature vector cluster including a plurality of first feature vectors determined to be similar to one another, second cluster data indicative of a second feature vector cluster including a plurality of second feature vectors determined to be similar to one another, and third cluster data indicative of a third feature vector cluster including a plurality of third feature vectors determined to be similar to one another, wherein each feature vector of each one of the plurality of first feature vectors and the plurality of second feature vectors and the plurality of third feature vectors is representative of a face of a digital asset of a plurality of digital assets. At operation 1004 of process 1000, the electronic device may obtain a metadata network associated with the plurality of digital assets, wherein the metadata network includes a plurality of metadata assets, each metadata asset of the plurality of metadata assets describes a characteristic associated with at least one digital asset of the plurality of digital assets, and two metadata assets of the plurality of metadata assets are correlated when a correlation between the two metadata assets includes a correlation weight greater than a correlation weight threshold. At operation 1006 of process 100, the electronic device may analyze the obtained metadata network, wherein the analysis includes (i) determining that a first metadata asset of the plurality of metadata assets describes a first moment associated with each digital asset of a first subset of digital assets of the plurality of digital assets, wherein the first moment describes a first time range within a first time span, (ii) determining that a second metadata asset of the plurality of metadata assets describes a second moment associated with each digital asset of a second subset of digital assets of the plurality of digital assets, wherein the second moment describes a second time range within the first time span but distinct from the first time range, (iii) determining that a third metadata asset of the plurality of metadata assets describes a third moment associated with each digital asset of a third subset of digital assets of the plurality of digital assets, wherein the third moment describes a third time range within a second time span distinct from the first time span, (iv) determining that a fourth metadata asset of the plurality of metadata assets describes a fourth moment associated with each digital asset of a fourth subset of digital assets of the plurality of digital assets, wherein the fourth moment describes a fourth time range within the second time span but distinct from the third time range, (v) determining that a fifth metadata asset of the plurality of metadata assets is correlated with each one of the first metadata asset and the second metadata asset, wherein the fifth metadata asset describes a first social group including a first person associated with the first feature vector cluster and a second person associated with the second feature vector cluster, and (vi) determining that a sixth metadata asset of the plurality of metadata assets is correlated with each one of the third metadata asset and the fourth metadata asset, wherein the sixth metadata asset describes a second social group including the first person associated with the first feature vector cluster and a third person associated with the third feature vector cluster. At operation 1008 of process 1000, the electronic device may group, at the electronic device, the plurality of second feature vectors and the plurality of third feature vectors in a bundle of feature vectors based on the analysis (e.g., two entity identities may be merged based on double social group-based analysis of the two entity identities).

It is understood that the operations shown in process 1000 of FIG. 10 are only illustrative and that existing operations may be modified or omitted, additional operations may be added, and the order of certain operations may be altered.

Moreover, one, some, or all of the processes described with respect to FIGS. 1-10 may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of such a non-transitory computer-readable medium (e.g., memory 104 of FIG. 1) may include, but are not limited to, read-only memory, random-access memory, flash memory, CD-ROMs, DVDs, magnetic tape, removable memory cards, optical data storage devices, and the like. The computer-readable medium can also be distributed over network-coupled computer systems so that the computer-readable code is stored and executed in a distributed fashion. For example, the computer-readable medium may be communicated from one electronic device to another electronic device using any suitable communications protocol (e.g., the computer-readable medium may be communicated to electronic device 100 via any suitable communications circuitry 106 (e.g., as at least a portion of application 103)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of media management system 610 may be provided as a software construct, firmware construct, one or more hardware components, or a combination thereof. For example, any or each module of media management system 610 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of media management system 610 are only illustrative, and that the number, configuration, functionality, and interconnection of existing modules may be modified or omitted, additional modules may be added, and the interconnection of certain modules may be altered.

At least a portion of one or more of the modules of media management system 610 may be stored in or otherwise accessible to device 100 in any suitable manner (e.g., in memory 104 of device 100 (e.g., as at least a portion of application 103)) and/or to server 50. Any or each module of media management system 610 may be implemented using any suitable technologies (e.g., as one or more integrated circuit devices), and different modules may or may not be identical in structure, capabilities, and operation. Any or all of the modules or other components of media management system 610 may be mounted on an expansion card, mounted directly on a system motherboard, or integrated into a system chipset component (e.g., into a "north bridge" chip).

Any or each module of media management system 610 may be a dedicated system implemented using one or more expansion cards adapted for various bus standards. For example, all of the modules may be mounted on different interconnected expansion cards or all of the modules may be mounted on one expansion card. With respect to media management system 610, by way of example only, the modules of media management system 610 may interface with a motherboard or processor 102 of device 100 through an expansion slot (e.g., a peripheral component interconnect ("PCI") slot or a PCI express slot). Alternatively, media management system 610 need not be removable but may include one or more dedicated modules that may include memory (e.g., RAM) dedicated to the utilization of the module. In other embodiments, media management system 610 may be at least partially integrated into device 100. For example, a module of media management system 610 may utilize a portion of device memory 104 of device 100. Any or each module of media management system 610 may include its own processing circuitry and/or memory. Alternatively, any or each module of media management system 610 may share processing circuitry and/or memory with any other module of media management system 610 and/or processor 102 and/or memory 104 of device 100. Alternatively, any or each module of media management system 610 may share processing circuitry and/or memory of server 50 remote from device 100.

As described above, one aspect of the present technology is the gathering and use of data available from various sources to reduce a number of unverified persons detected in media content. The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, office addresses, data or records relating to a user's health or level of fitness (e.g., vital signs measurements, medication information, exercise information, etc.), date of birth, or any other identifying or personal information.

The present disclosure recognizes that the use of such personal information data, in the present technology, can be used to the benefit of users. For example, the personal information data can be used to improve the reduction of a number of unverified persons detected in media content with the electronic device. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location detection services, the present technology can be configured to allow users to select to "opt in" or "opt out" of participation in the collection of personal information data during registration for services or anytime thereafter. In addition to providing "opt in" or "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the reduction of a number of unverified persons detected in media content can be made based on non-personal information data or a bare minimum amount of personal information, such as the content being requested by the device associated with a user, other non-personal information available to the device, or publicly available information.

While there have been described systems, methods, and computer-readable media for reducing a number of unverified persons detected in media content, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for combining feature vector clusters on an electronic device, the method comprising:
   obtaining, at the electronic device, cluster data, wherein the cluster data comprises:
      first cluster data indicative of a first feature vector cluster comprising a plurality of first feature vectors determined to be similar to one another; and
      second cluster data indicative of a second feature vector cluster comprising a plurality of second feature vectors determined to be similar to one another, wherein each feature vector of each one of the plurality of first feature vectors and the plurality of second feature vectors is representative of a face of an unverified entity appearing in a digital asset of a plurality of digital assets;
   grouping, at the electronic device, the plurality of first feature vectors and the plurality of second feature vectors in a bundle of feature vectors based on determining that a distance between a centroid of the first feature vectors of the plurality of first feature vectors and a centroid of the second feature vectors of the plurality of second feature vectors is less than a first threshold distance;
   presenting, at the electronic device, a bundle of digital assets representative of each digital asset of the plurality of digital assets that comprises a face represented by a feature vector of the bundle of feature vectors; and
   facilitating, at the electronic device, identity verification of a single identity to every feature vector of the bundle of feature vectors using the presented bundle of digital assets.

2. The method of claim 1, further comprising: identifying, at the electronic device, a first collection of digital assets of the plurality of digital assets, wherein the first collection of digital assets comprises each digital asset of the plurality of digital assets sharing at least a first metadata characteristic.

3. The method of claim 2, wherein the first metadata characteristic comprises at least one of:
   geographical metadata indicative of a geographic location within a first geographic rang; or
   temporal metadata indicative of a time within a first time range.

4. The method of claim 1, further comprising:
   analyzing, at the electronic device, the first collection of digital assets, wherein the grouping is further based, at least in part, on the analyzing of the first collection of digital assets.

5. The method of claim 4, wherein the analyzing of the first collection of digital assets further comprises:
   determining that each one of a number of first feature vectors of the plurality of first feature vectors is representative of a face of a digital asset of the first collection of digital assets; or determining that each one of a number of second feature vectors of the plurality of second feature vectors is representative of a face of a digital asset of the first collection of digital assets.

6. The method of claim 1, wherein the first collection of digital assets comprises each digital asset of the plurality of digital assets that is associated with:

geographical metadata indicative of a geographic location within a first geographic range; or temporal metadata indicative of a time within a first time range.

7. A non-transitory computer-readable medium comprising instructions stored thereon that, when executed, cause one or more processors to perform a method for combining feature vector clusters on an electronic device, the method comprising:

obtaining, at the electronic device, cluster data, wherein the cluster data comprises:

first cluster data indicative of a first feature vector cluster comprising a plurality of first feature vectors determined to be similar to one another; and second cluster data indicative of a second feature vector cluster comprising a plurality of second feature vectors determined to be similar to one another, wherein each feature vector of each one of the plurality of first feature vectors and the plurality of second feature vectors is representative of a face of an unverified entity appearing in a digital asset of a plurality of digital assets;

grouping, at the electronic device, the plurality of first feature vectors and the plurality of second feature vectors in a bundle of feature vectors based on determining that a distance between a centroid of the first feature vectors of the plurality of first feature vectors and a centroid of the second feature vectors of the plurality of second feature vectors is less than a first threshold distance; and identifying, at the electronic device a first collection of digital assets of the plurality of digital assets, wherein the first collection of digital assets comprises each digital asset of the plurality of digital assets sharing at least at least one of:

geographical metadata indicative of a geographic location within a first geographic range; or temporal metadata indicative of a time within a first time range.

8. The non-transitory computer-readable medium of claim 7, wherein the instructions further comprise instructions causing the one or more processors to perform a method further comprising:

analyzing, at the electronic device, the first collection of digital assets, wherein the grouping is further based, at least in part, on the analyzing of the first collection of digital assets.

9. The non-transitory computer-readable medium of claim 8, wherein the instructions causing the one or more processors to analyze of the first collection of digital assets further comprise instructions causing the one or more processors to perform a method further comprising:

determining that each one of a number of first feature vectors of the plurality of first feature vectors is representative of a face of a digital asset of the first collection of digital assets; or determining that each one of a number of second feature vectors of the plurality of second feature vectors is representative of a face of a digital asset of the first collection of digital assets.

10. The non-transitory computer-readable medium of claim 7, wherein the instructions further comprise instructions causing the one or more processors to perform a method further comprising:

presenting, at the electronic device, a bundle of digital assets representative of each digital asset of the plurality of digital assets that comprises a face represented by a feature vector of the bundle of feature vectors; and facilitating, at the electronic device, identity verification of a single identity to every feature vector of the bundle of feature vectors using the presented bundle of digital assets.

11. The non-transitory computer-readable medium of claim 7, wherein the first collection of digital assets comprises each digital asset of the plurality of digital assets that is associated with:

geographical metadata indicative of a geographic location within a first geographic range; or temporal metadata indicative of a time within a first time range.

12. An electronic device, comprising:

a display;

memory;

one or more processors; and a non-transitory computer-readable medium comprising instructions stored thereon that, when executed, cause the one or more processors to perform a method for combining feature vector clusters on the electronic device, the method comprising:

obtaining cluster data, wherein the cluster data comprises:

first cluster data indicative of a first feature vector cluster comprising a plurality of first feature vectors determined to be similar to one another; and second cluster data indicative of a second feature vector cluster comprising a plurality of second feature vectors determined to be similar to one another, wherein each feature vector of each one of the plurality of first feature vectors and the plurality of second feature vectors is representative of a face of an unverified entity appearing in a digital asset of a plurality of digital assets;

grouping the plurality of first feature vectors and the plurality of second feature vectors in a bundle of feature vectors based on determining that a distance between a centroid of the first feature vectors of the plurality of first feature vectors and a centroid first threshold distance; and presenting, on the display of the electronic device, a bundle of digital assets representative of each digital asset of the plurality of digital assets that comprises a face represented by a feature vector of the bundle of feature vectors; and facilitating, at the electronic device, identity verification of a single identity to every feature vector of the bundle of feature vectors using the presented bundle of digital assets.

13. The electronic device of claim 12, wherein the instructions further comprise instructions causing the one or more processors to perform a method further comprising:

identifying, at the electronic device, a first collection of digital assets of the plurality of digital assets, wherein the first collection of digital assets comprises each digital asset of the plurality of digital assets sharing at least a first metadata characteristic.

14. The electronic device of claim 13, wherein the first metadata characteristic comprises at least one of:
geographical metadata indicative of a geographic location within a first geographic range; or
temporal metadata indicative of a time within a first time range.

15. The electronic device of claim 12, wherein the instructions further comprise instructions causing the one or more processors to perform a method further comprising:
analyzing, at the electronic device, the first collection of digital assets, wherein the grouping is further based, at least in part, on the analyzing of the first collection of digital assets.

16. The electronic device of claim 15, wherein the instructions causing the one or more processors to analyze of the first collection of digital assets further comprise instructions causing the one or more processors to perform a method further comprising:
determining that each one of a number of first feature vectors of the plurality of first feature vectors is representative of a face of a digital asset of the first collection of digital assets; or
determining that each one of a number of second feature vectors of the plurality of second feature vectors is representative of a face of a digital asset of the first collection of digital assets.

* * * * *

UNITED STATES PATENT AND TRADEMARK OFFICE
CERTIFICATE OF CORRECTION

PATENT NO. : 10,922,354 B2
APPLICATION NO. : 15/844366
DATED : February 16, 2021
INVENTOR(S) : Eric Circlaeys et al.

Page 1 of 1

It is certified that error appears in the above-identified patent and that said Letters Patent is hereby corrected as shown below:

In the Claims

Claim 3, at Column 62, Line 56, replace "rang" with - range -

Claim 12, at Column 64, Line 51, after - centroid - insert -- of the second vectors of the plurality of second feature vectors is less than a --

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*